US011938625B2

(12) United States Patent
Mizukami et al.

(10) Patent No.: US 11,938,625 B2
(45) Date of Patent: Mar. 26, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Tomoo Mizukami, Tokyo (JP); Mika Nagae, Tokyo (JP); Takuma Morita, Tokyo (JP); Naoya Muramatsu, Tokyo (JP); Eiichiro Morinaga, Tokyo (JP); Katsuhisa Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/880,225

(22) Filed: Aug. 3, 2022

(65) Prior Publication Data

US 2022/0371178 A1 Nov. 24, 2022

Related U.S. Application Data

(63) Continuation of application No. 16/758,567, filed as application No. PCT/JP2018/028193 on Jul. 27, 2018, now Pat. No. 11,446,813.

(30) Foreign Application Priority Data

Oct. 30, 2017 (JP) ................................ 2017-209157

(51) Int. Cl.
*A63H 11/00* (2006.01)
*B25J 9/00* (2006.01)
(Continued)

(52) U.S. Cl.
CPC ........... *B25J 9/0081* (2013.01); *B25J 9/0003* (2013.01); *B25J 9/1638* (2013.01); *B25J 18/002* (2013.01)

(58) Field of Classification Search
CPC ...... B25J 9/0081; B25J 9/0003; B25J 9/1638; B25J 18/002; G06N 20/00; A63H 11/00;
(Continued)

(56) References Cited

U.S. PATENT DOCUMENTS 10,898,999 B1   1/2021   Cohen et al.
10,943,273 B2 * 3/2021   Hoffberg ............... G07F 17/323
(Continued)

FOREIGN PATENT DOCUMENTS

CN        1457287 A       11/2003
CN      105710881 A        6/2016
(Continued)

*Primary Examiner* — Dalena Tran
(74) *Attorney, Agent, or Firm* — Paratus Law Group, PLLC

(57) ABSTRACT

There is provided an information processing apparatus and an information processing method to increase movement patterns of an autonomous mobile body more easily, the information processing apparatus including an operation control unit configured to control an operation of a driving unit. The operation control unit generates, on the basis of a teaching movement, control sequence data for causing a driving unit of an autonomous mobile body to execute an autonomous movement corresponding to the teaching movement, and causes the driving unit to execute the autonomous movement according to the control sequence data, on the basis of an action plan determined by situation estimation. The information processing method includes controlling, by a processor, an operation of a driving unit, and the controlling further includes generating control sequence data, and causing the driving unit to execute an autonomous movement according to the control sequence data.

19 Claims, 39 Drawing Sheets

(51) Int. Cl.
    *B25J 9/16*      (2006.01)
    *B25J 18/00*     (2006.01)
(58) Field of Classification Search
    CPC .............. G05D 1/0221; G05D 1/0088; G05D 2201/0217
    See application file for complete search history.

(56)                References Cited

U.S. PATENT DOCUMENTS

| 2003/0060930 | A1  | 3/2003  | Fujita et al.            |
| 2015/0314454 | A1  | 11/2015 | Breazeal et al.          |
| 2019/0105779 | A1* | 4/2019  | Einav .............. B25J 9/1689 |
| 2019/0261565 | A1* | 8/2019  | Robertson ............. G06T 7/0004 |
| 2020/0077892 | A1* | 3/2020  | Tran ................... G08B 21/0492 |

FOREIGN PATENT DOCUMENTS

| JP | H08-187364 A  | 7/1996  |
| JP | H11-077560 A  | 3/1999  |
| JP | 2002-239960 A | 8/2002  |
| JP | 2003-071763 A | 3/2003  |
| JP | 2005-262378 A | 9/2005  |
| JP | 2011-224662 A | 11/2011 |

* cited by examiner

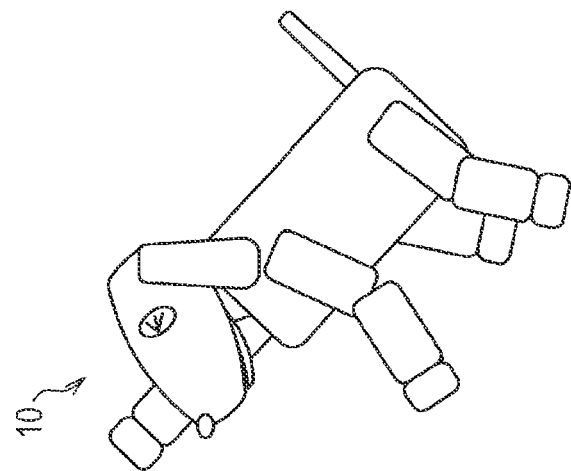
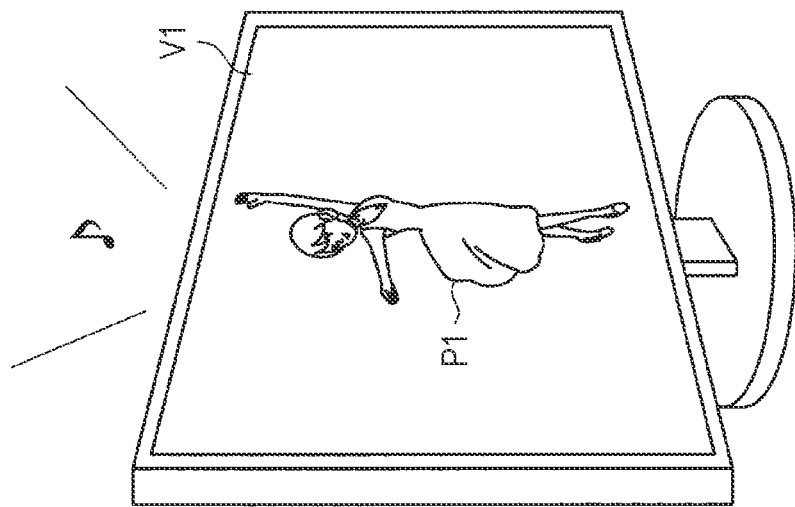
FIG. 12

FIG. 14
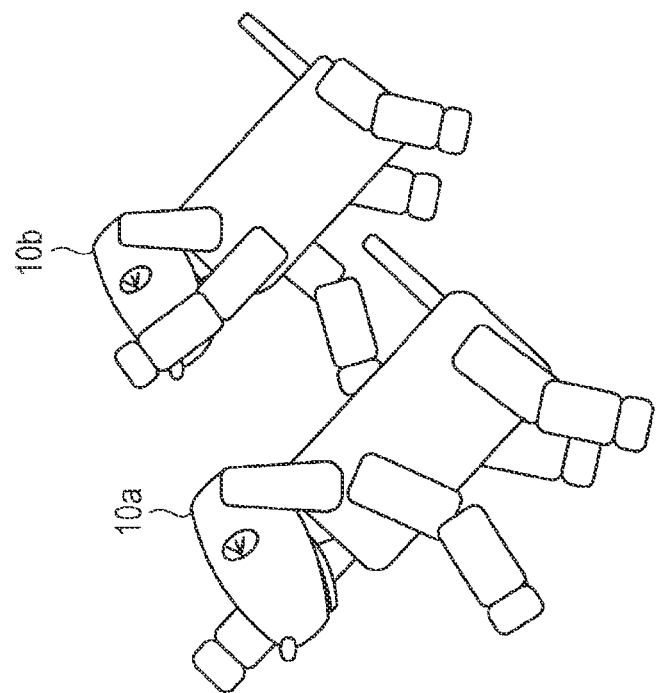
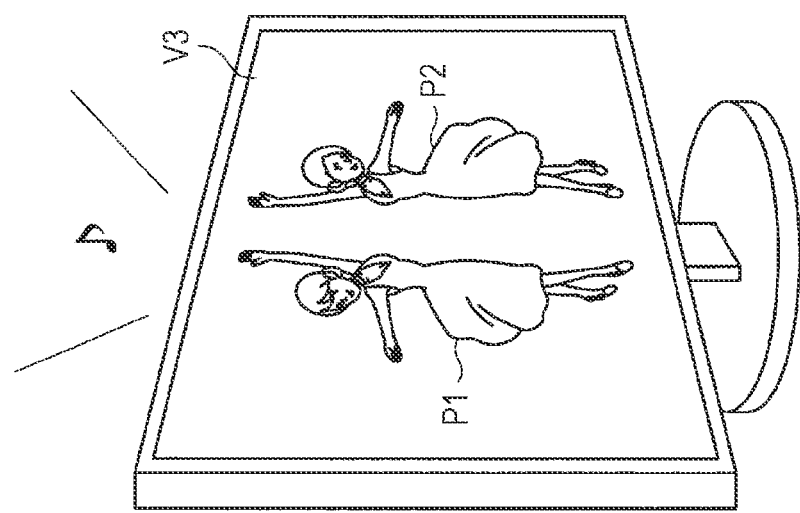

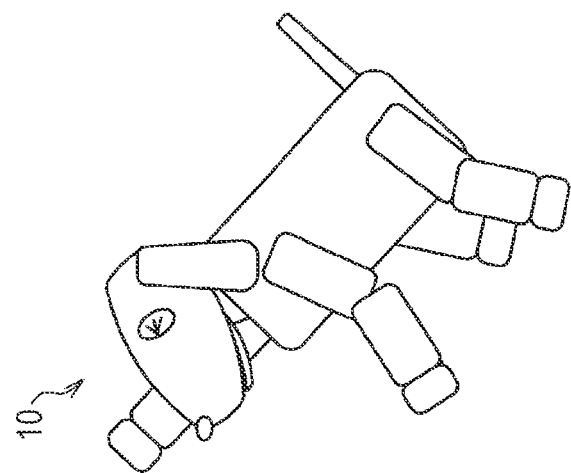
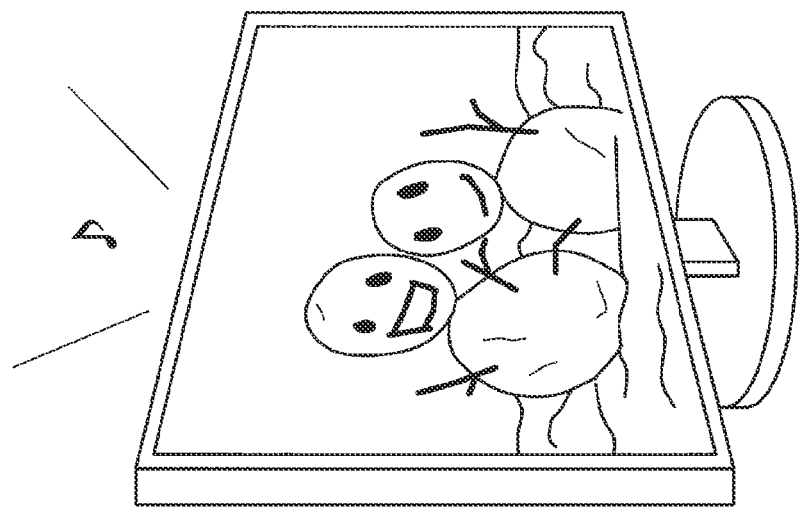
FIG. 16

FIG. 18
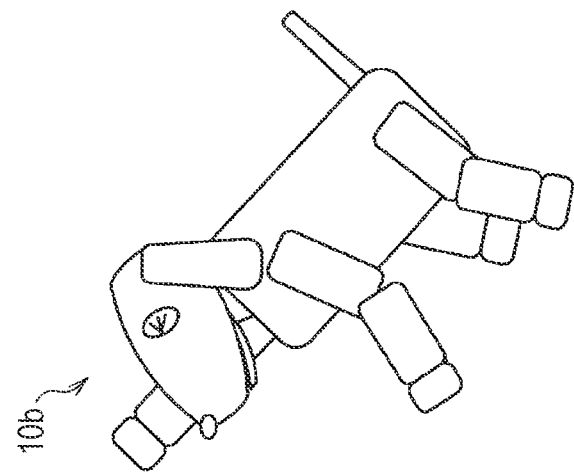
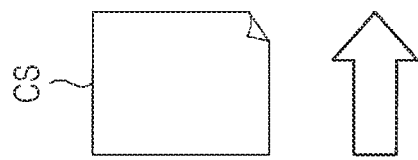
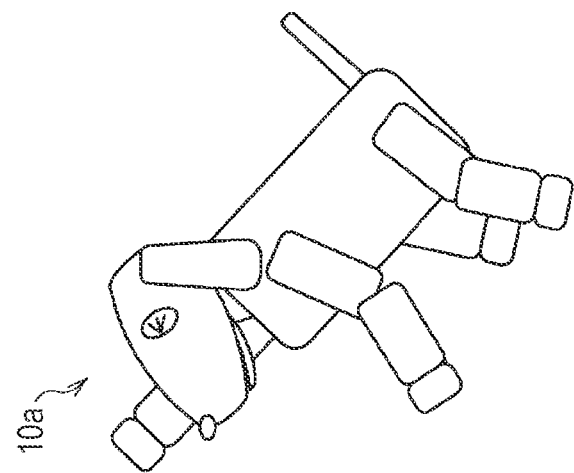

FIG. 21
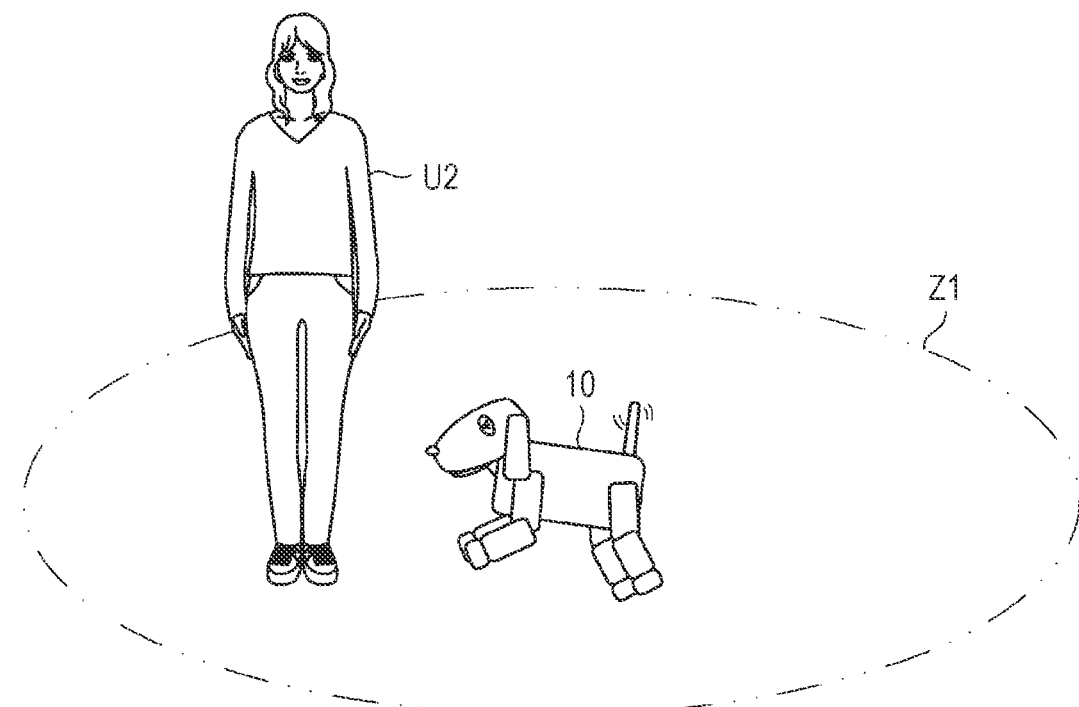
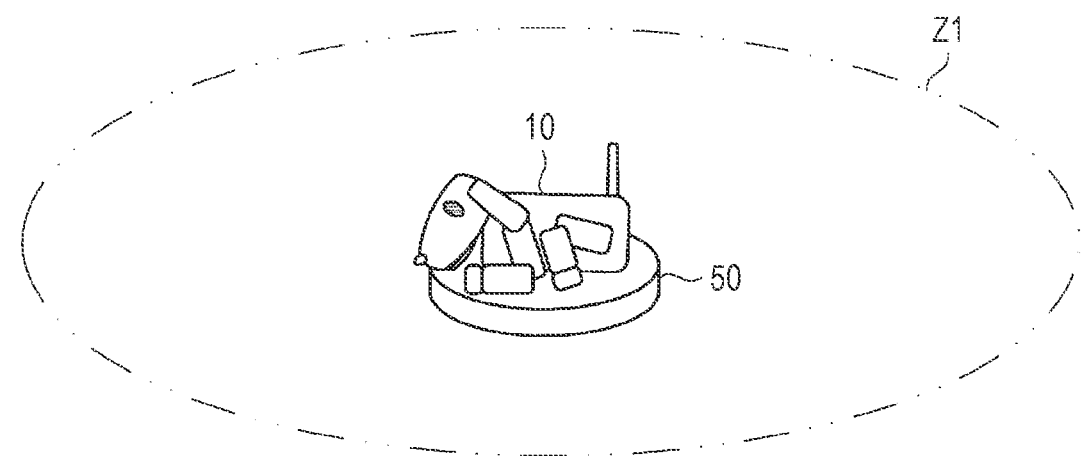

FIG. 28
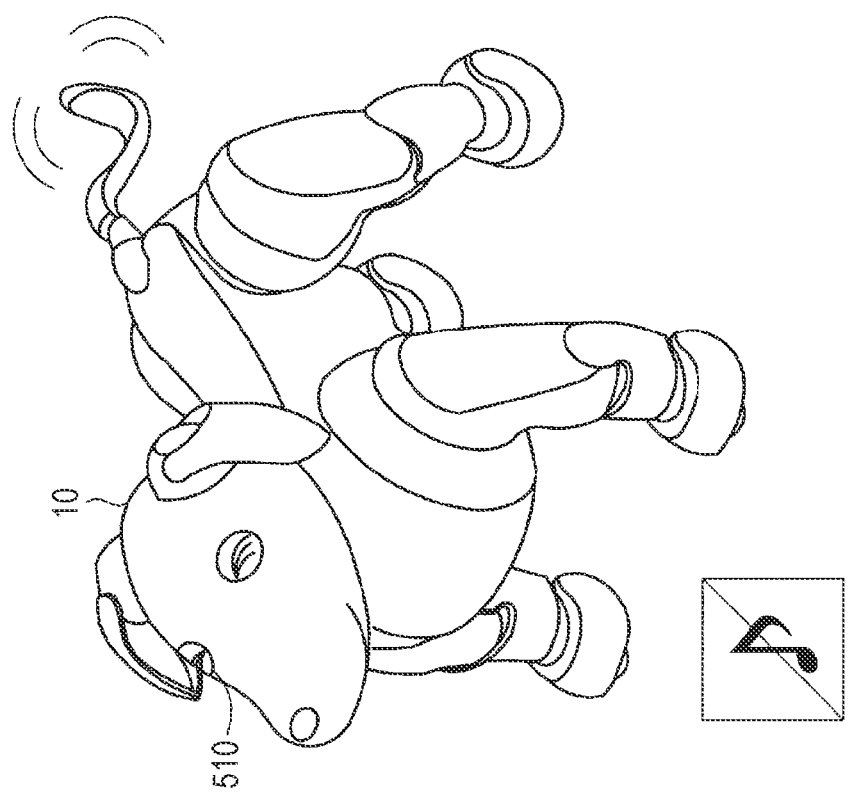
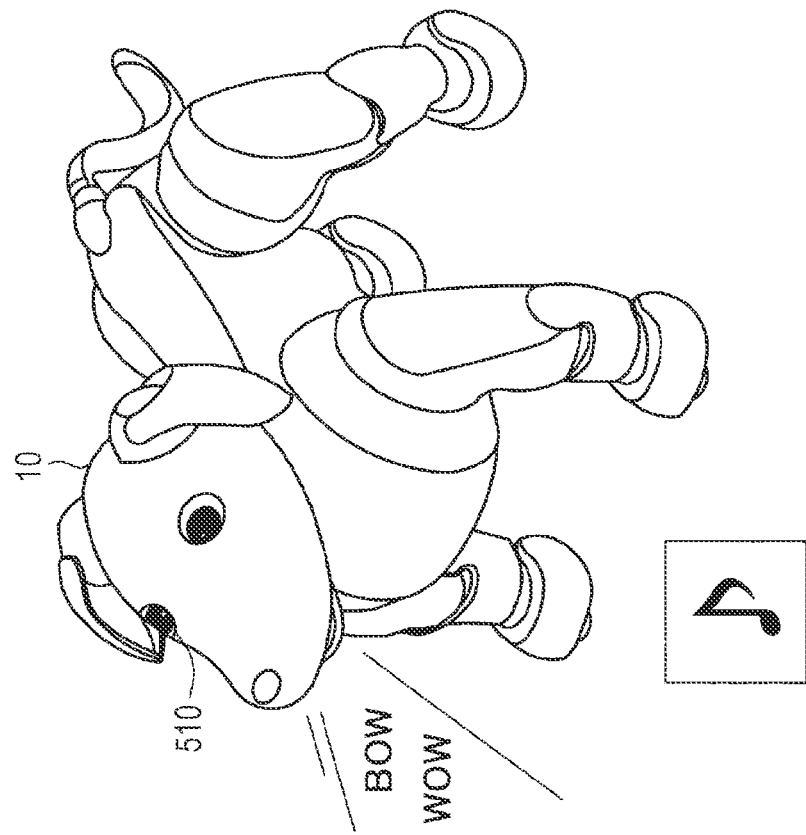

FIG. 32
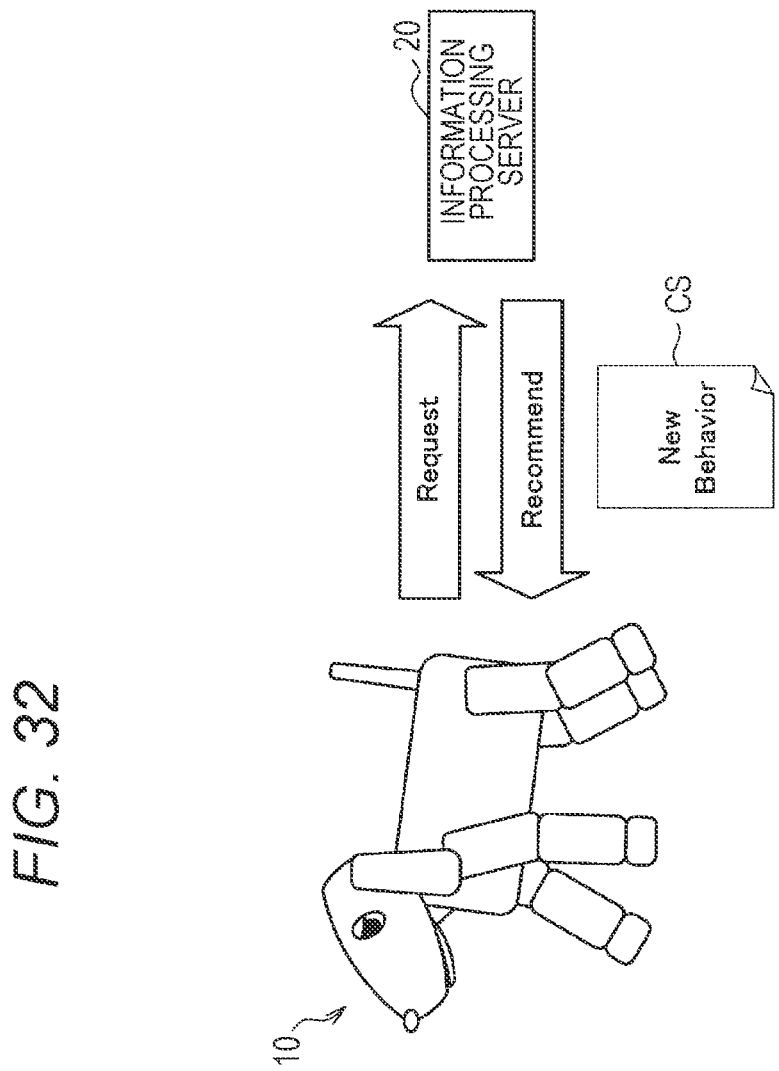
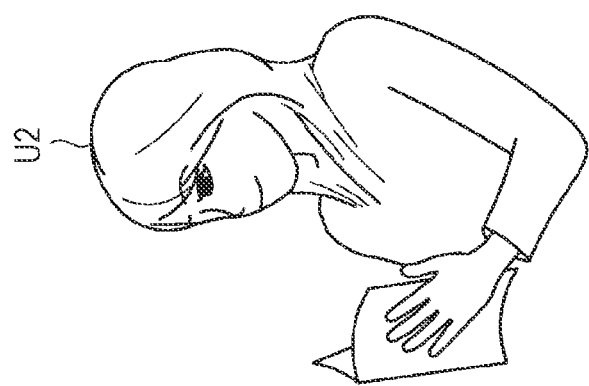

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 16/758,567 (filed on Apr. 23, 2020), which is a National Stage Patent Application of PCT International Patent Application No. PCT/JP2018/028193 (filed on Jul. 27, 2018) under 35 U.S.C. § 371, which claims priority to Japanese Patent Application No. 2017-209157 (filed on Oct. 30, 2017), which are all hereby incorporated by reference in their entirety.

TECHNICAL FIELD

The present disclosure relates to an information processing apparatus, an information processing method, and a program.

BACKGROUND ART

In recent years, various devices having a learning function have been developed. The devices described above include an autonomous mobile body such as a robot that performs an autonomous movement on the basis of an estimated situation. For example, Patent Document 1 discloses a leg type mobile robot that performs autonomous movements and emotional expressions according to a situation.

CITATION LIST

Patent Document

Patent Document 1: Japanese Patent Application Laid-Open No. 2003-71763

SUMMARY OF THE INVENTION

Problems to be Solved by the Invention

Meanwhile, a movement of the autonomous mobile body as described in Patent Document 1 is realized on the basis of control information and the like regarding bending and stretching of a joint part set in advance. Whereas, needs such as a user wanting the autonomous mobile body to learn new movements are also expected, but it is difficult for a user without advanced technical knowledge to design a movement in a case of desiring to make the autonomous mobile body execute complex cooperative movements with multiple joint parts.

Therefore, the present disclosure proposes a new and improved information processing apparatus, information processing method, and program capable of easily increasing a movement pattern of an autonomous mobile body.

Solutions to Problems

According to the present disclosure, there is provided an information processing apparatus including an operation control unit configured to control an operation of a driving unit. The operation control unit generates, on the basis of a teaching movement, control sequence data for causing a driving unit of an autonomous mobile body to execute an autonomous movement corresponding to the teaching movement, and causes the driving unit to execute the autonomous movement according to the control sequence data, on the basis of an action plan determined by situation estimation.

Furthermore, according to the present disclosure, there is provided an information processing method that includes controlling, by a processor, an operation of a driving unit. The controlling further includes generating, on the basis of a teaching movement, control sequence data for causing a driving unit of an autonomous mobile body to execute an autonomous movement corresponding to the teaching movement, and causing the driving unit to execute the autonomous movement according to the control sequence data, on the basis of an action plan determined by situation estimation.

Furthermore, according to the present disclosure, there is provided a program for causing a computer to function as an information processing apparatus including an operation control unit configured to control an operation of a driving unit. The operation control unit generates, on the basis of a teaching movement, control sequence data for causing a driving unit of an autonomous mobile body to execute an autonomous movement corresponding to the teaching movement, and causes the driving unit to execute the autonomous movement according to the control sequence data, on the basis of an action plan determined by situation estimation.

Effects of the Invention

As described above, according to the present disclosure, a movement pattern of the autonomous mobile body can be increased more easily.

Note that the effect above is not necessarily limited, and in addition to the effect above or instead of the effect above, any of the effects described in this specification, or other effects that may be understood from the present specification may be exhibited.

BRIEF DESCRIPTION OF DRAWINGS

FIG. 12 is a view for explaining teaching related to an imaged motion of a mobile body according to the embodiment.

FIG. 14 is a view for explaining teaching in which a relative position related to a plurality of autonomous mobile bodies is specified, according to the embodiment.

FIG. 16 is a view for explaining an incentive situation according to the embodiment.

FIG. 18 is a view for explaining transmission of control sequence data in an autonomous mobile body according to the embodiment.

FIG. 21 is a view for explaining an action plan based on whether or not a user is detected, according to a second embodiment of the present disclosure.

FIG. 28 is a view for explaining an action plan based on a control mode of the autonomous mobile body according to the embodiment.

FIG. 32 is a view for explaining presentation of a recommended action based on a degree of user's enthusiasm according to the embodiment according to the embodiment.

MODE FOR CARRYING OUT THE INVENTION

Figure 1:
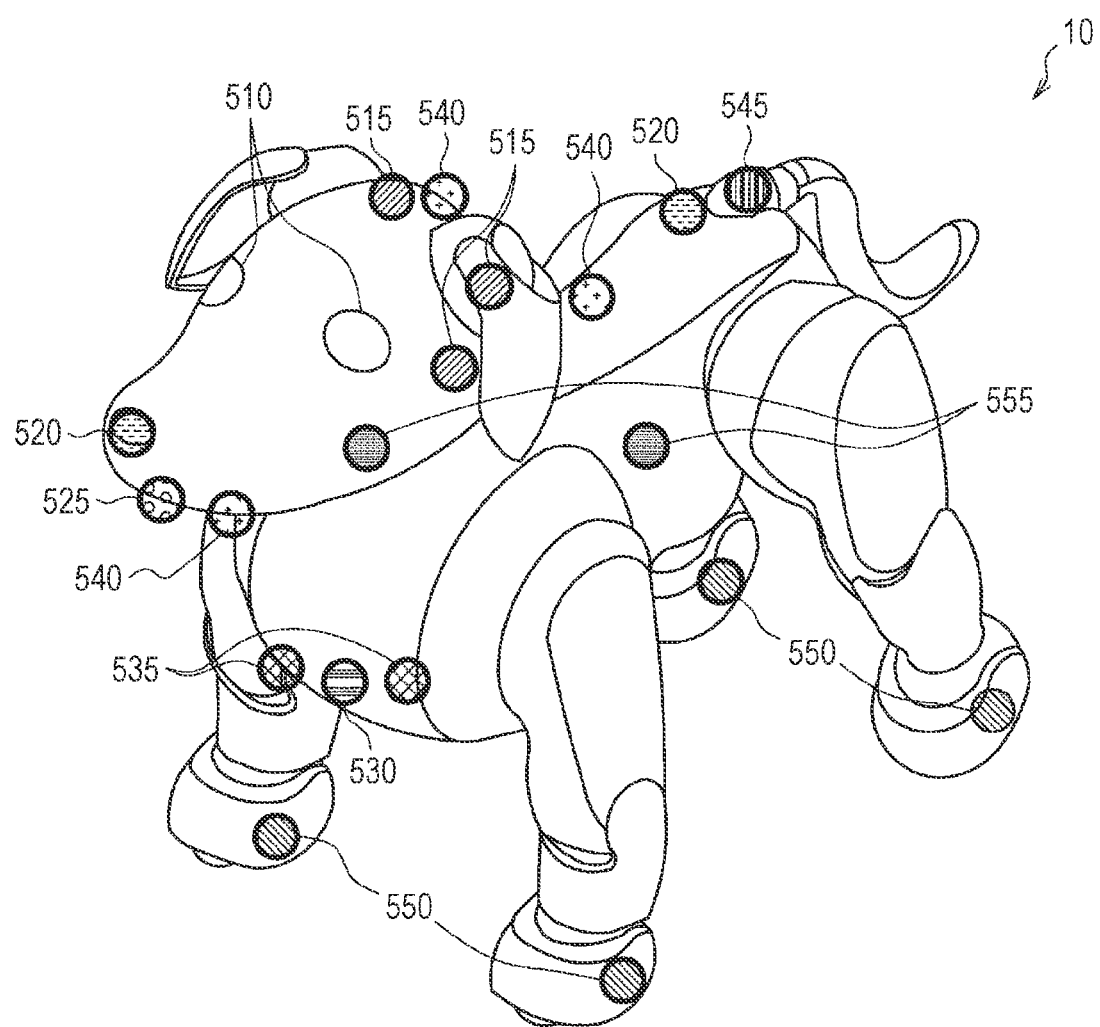
FIG. 1 is a view illustrating a hardware configuration example of an autonomous mobile body according to an embodiment of the present disclosure.

Hereinafter, preferred embodiments of the present disclosure will be described in detail with reference to the accompanying drawings. Note that, in this specification and the drawings, components having substantially the same functional configuration are denoted by the same reference numerals, and redundant explanations are omitted.

Note that the description will be made in the following order.

1. Configuration
1.1. Overview of autonomous mobile body 10
1.2. Hardware configuration example of autonomous mobile body 10
1.3. System configuration example
1.4. Functional configuration example of autonomous mobile body 10
1.5. Functional configuration example of information processing server 20
2. First Embodiment
2.1. Overview
2.2. Generation of control sequence data
2.3. Control flow
3. Second Embodiment
3.1. Overview
3.2. Specific example of action plan
3.3. Control flow
4. Third Embodiment
4.1. Overview
4.2. Presentation of recommended action
4.3. Additional registration to recognition dictionary
4.4. Maintenance recommendation
4.5. Control flow
5. Hardware configuration example
6. Conclusion

1. CONFIGURATION

<<1.1. Overview of Autonomous Mobile Body 10>>

First, an overview of an autonomous mobile body 10 according to an embodiment of the present disclosure will be described. The autonomous mobile body 10 according to an embodiment of the present disclosure is an information processing apparatus that executes situation estimation based on collected sensor information, and autonomously selects and executes various movements according to the situation. One feature of the autonomous mobile body 10 is to autonomously execute a movement estimated to be optimal for every situation, unlike a robot that simply executes a movement according to a user's instruction command.

For this reason, depending on the situation, there is a case where the autonomous mobile body 10 according to an embodiment of the present disclosure intentionally does not execute a movement corresponding to a user's instruction, or executes another behavior different from the movement. The situation described above corresponds to, for example, a case where the safety of a user, the autonomous mobile body 10, or a surrounding environment is impaired in a case where a movement corresponding to a user's instruction is performed, and a case where the autonomous mobile body 10 prioritizes another desire (instinct) such as charging processing, for example.

Furthermore, there is a case where the autonomous mobile body 10 intentionally does not obey a user's instruction to attempt to induce interest of the user, or tries to transmit emotions of itself and hardware status to the user.

Whereas, the autonomous mobile body 10 has a strong desire (instinct) to be loved by the user. For this reason, the autonomous mobile body 10 repeatedly executes a movement corresponding to a user's instruction to please the user, and learns a movement liked by the user and spontaneously executes the movement even in a case where there is no instruction.

As described above, the autonomous mobile body 10 according to an embodiment of the present disclosure determines and executes an autonomous movement by comprehensively determining desires, emotions, surrounding environments, and the like, similarly to animals including humans. In the point described above, the autonomous mobile body 10 is clearly different from a passive device that executes a corresponding movement or processing on the basis of an instruction.

The autonomous mobile body 10 according to an embodiment of the present disclosure may be an autonomous mobile robot that autonomously moves in a space and executes various movements. The autonomous mobile body 10 may be, for example, an autonomous mobile robot having a shape imitating a human or an animal such as a dog and having a movement capability. Furthermore, the autonomous mobile body 10 may be, for example, a vehicle or other device having communication capability with the user. A shape, capability, and a level of desires and the like of the autonomous mobile body 10 according to an embodiment of the present disclosure may be appropriately designed in accordance with the purpose and role.

<<1.2. Hardware Configuration Example of Autonomous Mobile Body 10>>

Next, a hardware configuration example of the autonomous mobile body 10 according to an embodiment of the present disclosure will be described. Note that, hereinafter, a description is given to an example of a case where the autonomous mobile body 10 is a dog-shaped quadruped walking robot.

FIG. 1 is a view illustrating a hardware configuration example of the autonomous mobile body 10 according to an embodiment of the present disclosure. As illustrated in FIG. 1, the autonomous mobile body 10 is a dog-shaped quadruped walking robot having a head, a torso, four legs, and a tail. Furthermore, the autonomous mobile body 10 includes two displays 510 on the head.

Furthermore, the autonomous mobile body 10 includes various sensors. The autonomous mobile body 10 includes, for example, a microphone 515, a camera 520, a time of flight (ToF) sensor 525, a human sensor 530, a distance measurement sensor 535, a touch sensor 540, an illuminance sensor 545, a sole button 550, and an inertial sensor 555.

(Microphone 515)

The microphone 515 has a function of collecting surrounding sounds. The sounds described above include, for example, user's utterance and surrounding environmental sounds. The autonomous mobile body 10 may include, for example, four microphones on the head. Providing a plurality of microphones 515 makes it possible to collect sounds generated in the surroundings with high sensitivity, and realize localization of the sound source.

(Camera 520)

The camera 520 has a function of imaging the user and the surrounding environment. The autonomous mobile body 10 may include, for example, two wide-angle cameras at a tip of the nose and the waist. In this case, the wide-angle camera arranged at the tip of the nose captures an image corresponding to a front visual field of the autonomous mobile body (that is, a visual field of the dog), and the wide-angle camera on the waist captures an image of a surrounding region with an upper part as a center. For example, the autonomous mobile body 10 can extract a feature point and the like of a ceiling on the basis of an image captured by the wide-angle camera arranged on the waist, and can realize simultaneous localization and mapping (SLAM).

(ToF Sensor 525)

The ToF sensor 525 has a function of detecting a distance from an object existing in front of the head. The ToF sensor 525 is provided at a tip of the nose of the head. The ToF sensor 525 makes it possible to detect a distance from various objects with high accuracy, and to realize a movement according to a relative position with respect to an object including the user, an obstacle, and the like.

(Human Sensor 530)

The human sensor 530 has a function of detecting a location of the user, a pet raised by the user, and the like. The human sensor 530 is arranged on the chest, for example. By detecting a mobile body that is present in the front, the human sensor 530 can realize various movements for the mobile body, for example, movements corresponding to emotions such as interest, fear, and surprise.

(Distance Measurement Sensor 535)

The distance measurement sensor 535 has a function of acquiring a situation of a floor surface in front of the autonomous mobile body 10. The distance measurement sensor 535 is arranged on the chest, for example. The distance measurement sensor 535 makes it possible to detect a distance from an object that is present on the floor surface in front of the autonomous mobile body 10 with high accuracy, and to realize a movement corresponding to a relative position with the object.

(Touch Sensor 540)

The touch sensor 540 has a function of detecting contact by the user. The touch sensor 540 is arranged at a site where the user is likely to touch the autonomous mobile body 10, such as the top of the head, under the chin, or the back, for example. The touch sensor 540 may be, for example, an electrostatic capacitance type or pressure sensitive type touch sensor. The touch sensor 540 makes it possible to detect contact actions such as touching, stroking, striking, and pressing by the user, and to perform a movement corresponding to the contact action.

(Illuminance Sensor 545)

The illuminance sensor 545 detects illuminance of a space where the autonomous mobile body 10 is located. For example, the illuminance sensor 545 may be arranged at the base of the tail on the back of the head, and the like. The illuminance sensor 545 makes it possible to detect surrounding brightness, and to execute a movement corresponding to the brightness.

(Sole Button 550)

The sole button 550 has a function of detecting whether or not a leg bottom surface of the autonomous mobile body 10 is in contact with the floor. For this purpose, the sole button 550 is individually arranged at sites corresponding to paws of the four legs. The sole button 550 makes it possible to detect contact or non-contact between the autonomous mobile body 10 and the floor surface, and for example, makes it possible to grasp that the autonomous mobile body 10 is lifted by the user, and the like.

(Inertial Sensor 555)

The inertial sensor 555 is a six-axis sensor that detects physical quantities such as a speed, an acceleration, and rotation of the head and the torso. That is, the inertial sensor 555 detects an acceleration and an angular velocity of an X axis, a Y axis, and a Z axis. The inertial sensor 555 is individually arranged on the head and the torso. The inertial sensor 555 makes it possible to detect motions of the head and the torso of the autonomous mobile body 10 with high accuracy, and to realize movement control according to a situation.

An example of the sensors included in the autonomous mobile body 10 according to an embodiment of the present disclosure has been described above. Note that the above-described configuration described with reference to FIG. 1 is merely an example, and the configuration of the sensors that may be included in the autonomous mobile body 10 is not limited to such an example. In addition to the configuration described above, the autonomous mobile body 10 may further include, for example, various communication devices and the like including a temperature sensor, a geomagnetic sensor, and a global navigation satellite system (GNSS) signal receiver. The configuration of the sensor included in the autonomous mobile body 10 may be flexibly changed in accordance with specifications and operations.

Figure 2:
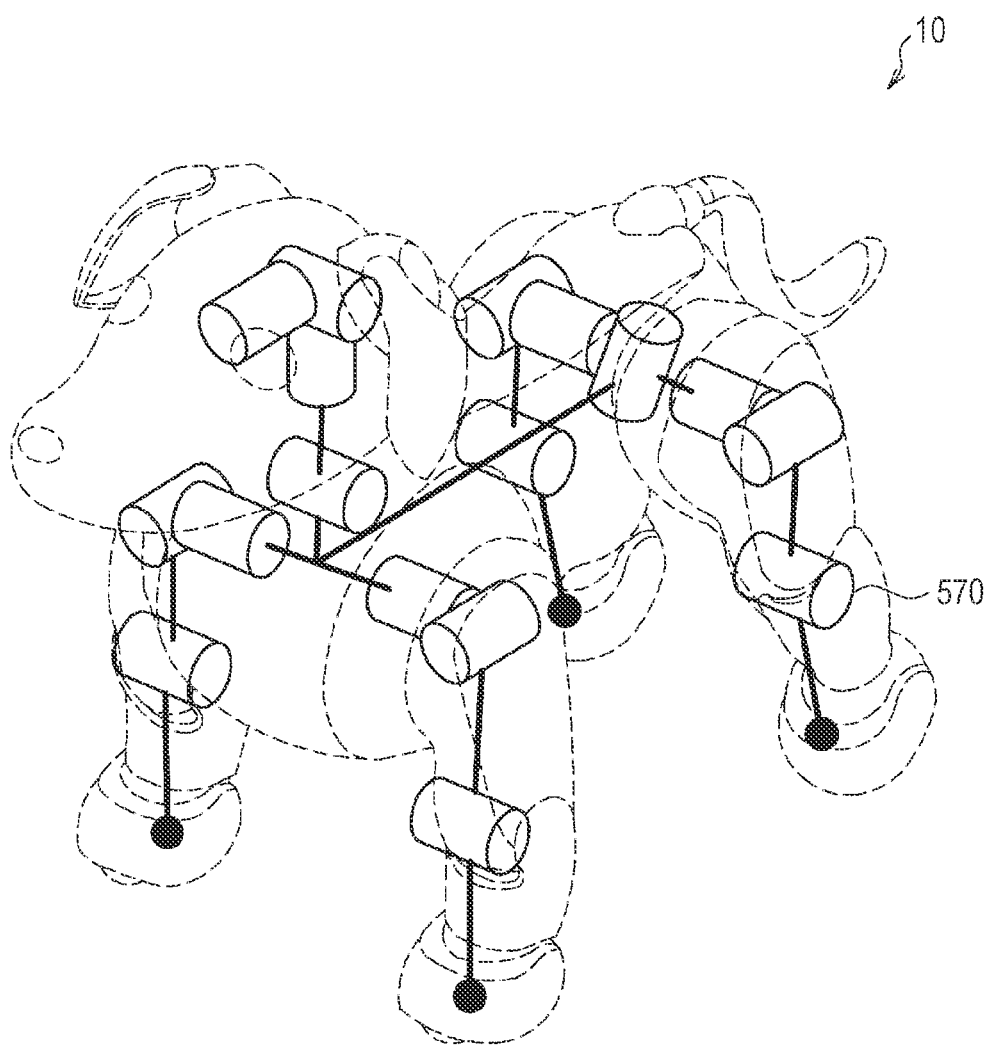
FIG. 2 is a configuration example of an actuator included in an autonomous mobile body according to an embodiment of the present disclosure.

Subsequently, a configuration example of a joint part of the autonomous mobile body 10 according to an embodiment of the present disclosure will be described. FIG. 2 is a configuration example of an actuator 570 included in the autonomous mobile body 10 according to an embodiment of the present disclosure. The autonomous mobile body 10 according to an embodiment of the present disclosure has a total of 22 degrees of rotational freedom, two for each of the ear and the tail, and one for the mouth, in addition to rotation points illustrated in FIG. 2.

For example, the autonomous mobile body 10 can achieve both nodding and a head tilting movement by having three degrees of freedom in the head. Furthermore, the autonomous mobile body 10 can realize a natural and flexible movement closer to a real dog, by reproducing a swing movement of the waist by the actuator 570 provided to the waist.

Note that the autonomous mobile body 10 according to an embodiment of the present disclosure may realize the above-described 22 degrees of rotational freedom by combining, for example, a one-axis actuator and a two-axis actuator. For example, the one-axis actuator may be individually employed for the elbows and the knees in the legs, and the two-axis actuator may be individually employed for the shoulders and the thighs.

Figure 3:
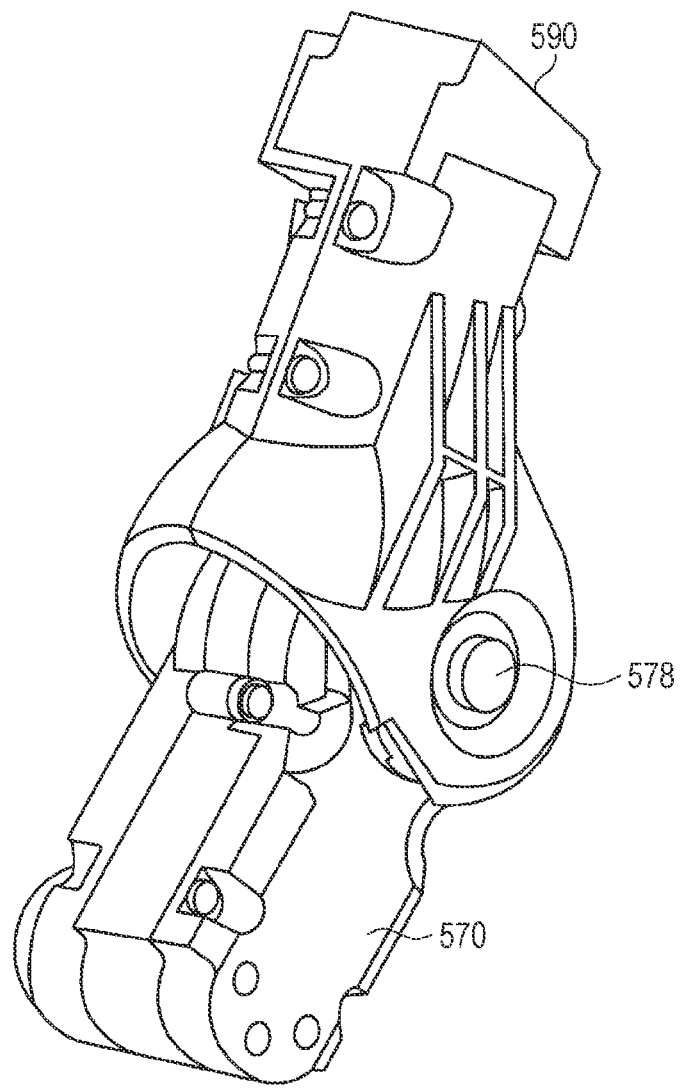
FIG. 3 is a view for explaining an operation of an actuator included in an autonomous mobile body according to an embodiment of the present disclosure.
Figure 4:
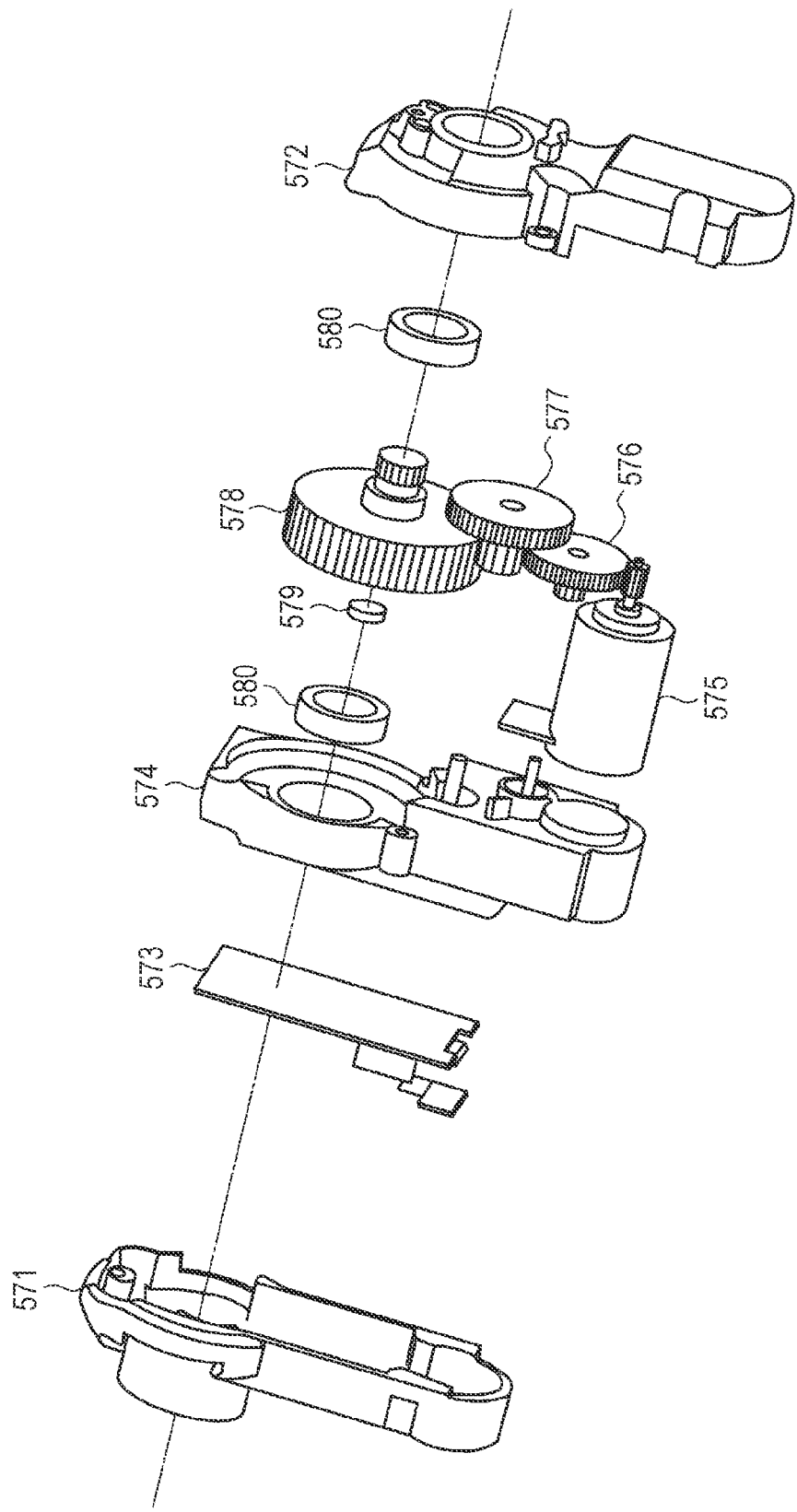
FIG. 4 is a view for explaining an operation of an actuator included in an autonomous mobile body according to an embodiment of the present disclosure.

FIGS. 3 and 4 are views for explaining an operation of the actuator 570 included in the autonomous mobile body 10 according to an embodiment of the present disclosure. Referring to FIG. 3, the actuator 570 can drive a movable arm 590 at any rotational position and rotational speed by rotating an output gear with a motor 575.

Referring to FIG. 4, the actuator 570 according to an embodiment of the present disclosure includes a rear cover 571, a gear BOX cover 572, a control board 573, a gear BOX base 574, the motor 575, a first gear 576, a second gear 577, an output gear 578, a detection magnet 579, and two bearings 580.

The actuator 570 according to an embodiment of the present disclosure may be, for example, a magnetic spin-valve giant magnetoresistive (svGMR). By the control board 573 rotating the motor 575 on the basis of control by a main processor, power is transmitted to the output gear 578 via the first gear 576 and the second gear 577, and the movable arm 590 can be driven.

Furthermore, by detecting, with a position sensor provided on the control board 573, a rotation angle of the detection magnet 579 that rotates in synchronization with the output gear 578, it is possible to detect a rotation angle of the movable arm 590, that is, a rotational position with high accuracy.

Note that the magnetic svGMR is a non-contact type and therefore is excellent in durability, and has an advantage of being less affected by signal fluctuations due to distance fluctuations of the detection magnet 579 and the position sensor, when used in a GMR saturation region.

A configuration example of the actuator 570 included in the autonomous mobile body 10 according to an embodiment of the present disclosure has been described above. According to the configuration described above, it is possible to highly accurately control a bending and stretching movement of a joint part included in the autonomous mobile body 10, and to precisely detect a rotational position of the joint part.

Figure 5:
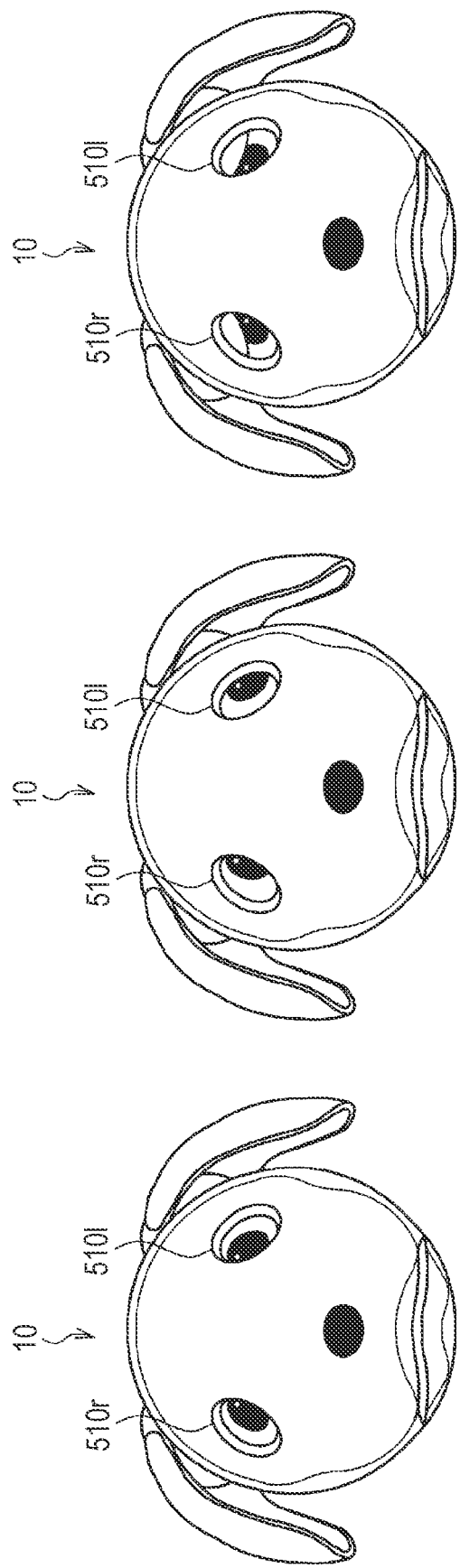
FIG. 5 is a view for explaining a function of a display included in an autonomous mobile body according to an embodiment of the present disclosure.

Subsequently, a function of the display 510 included in the autonomous mobile body 10 according to an embodiment of the present disclosure will be described with reference to FIG. 5. FIG. 5 is a view for explaining a function of the display 510 included in the autonomous mobile body 10 according to an embodiment of the present disclosure.

(Display 510)

The display 510 has a function of visually expressing eye movements and emotions of the autonomous mobile body 10. As illustrated in FIG. 5, the display 510 can express a movement of the eyeball, pupil, and eyelid according to emotions and movements. The display 510 intentionally does not display characters, symbols, images that are not related to eye motions, and the like, which produces natural movements close to a real animal such as a dog.

Furthermore, as illustrated in FIG. 5, the autonomous mobile body 10 includes two displays 510r and 510l corresponding to the right eye and the left eye, respectively. The displays 510r and 510l are realized by, for example, two independent organic light emitting diodes (OLEDs). The OLED enables reproduction of a curved surface of the eyeball, and can realize more natural exterior as compared to a case of expressing a pair of eyes with one flat display, or a case of expressing two eyes with two independent flat displays.

As described above, the displays 510r and 510l make it possible to express line-of-sight and emotions of the autonomous mobile body 10 as illustrated in FIG. 5 with high accuracy and flexibility. Furthermore, the user can intuitively grasp a state of the autonomous mobile body 10 from a movement of the eyeball displayed on the display 510.

Figure 6:
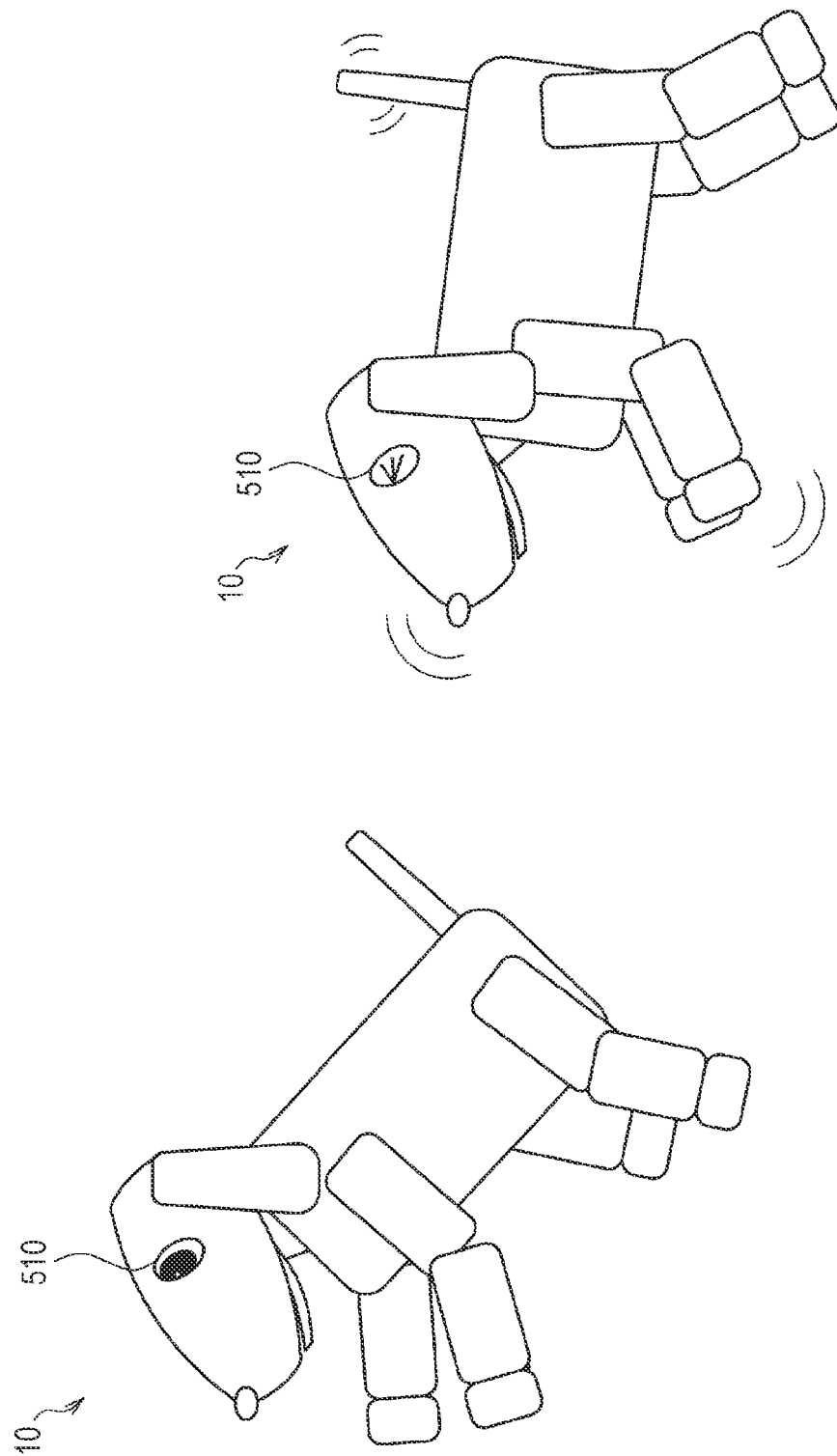
FIG. 6 is a view illustrating a movement example of an autonomous mobile body according to an embodiment of the present disclosure.

A hardware configuration example of the autonomous mobile body 10 according to an embodiment of the present disclosure has been described above. According to the configuration described above, as illustrated in FIG. 6, it is possible to realize movements and emotional expressions closer to real living things, by controlling movements of the joint parts and the eyeballs of the autonomous mobile body 10 with high accuracy and flexibility. Note that, while FIG. 6 is a view illustrating a movement example of the autonomous mobile body 10 according to an embodiment of the present disclosure, FIG. 6 illustrates an external structure of the autonomous mobile body 10 in a simplified manner in order to describe while focusing on movements of the joint parts and the eyeballs of the autonomous mobile body 10. Similarly, the external structure of the autonomous mobile body 10 may be illustrated in a simplified manner in the following description, but the hardware configuration and the exterior of the autonomous mobile body 10 according to an embodiment of the present disclosure are not limited to the examples illustrated in the drawings, and may be appropriately designed.

<<1.3. System Configuration Example>>

Figure 7:
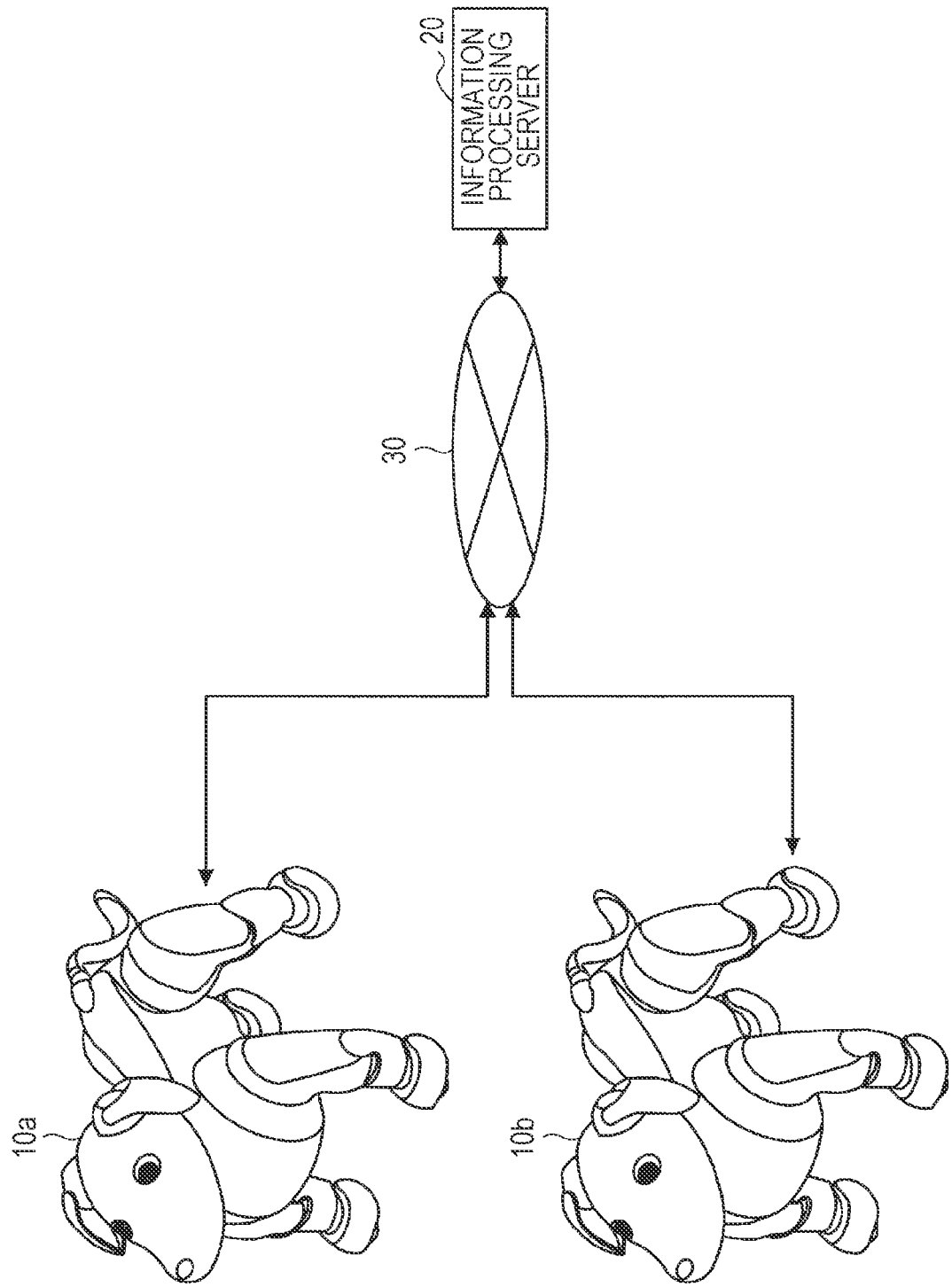
FIG. 7 is a diagram illustrating an example of a system configuration according to an embodiment of the present disclosure.

Next, a system configuration example according to an embodiment of the present disclosure will be described. FIG. 7 is a diagram illustrating an example of a system configuration according to an embodiment of the present disclosure. Referring to FIG. 7, an information processing system according to an embodiment of the present disclosure includes a plurality of autonomous mobile bodies 10 and an information processing server 20. Note that between the autonomous mobile body 10 and the information processing server 20, and between the autonomous mobile bodies 10 are connected so as to enable mutual communication via a network 30.

(Autonomous Mobile Body 10)

The autonomous mobile body 10 according to an embodiment of the present disclosure is an information processing apparatus that executes situation estimation based on collected sensor information, and autonomously selects and executes various movements according to the situation. As described above, the autonomous mobile body 10 according to an embodiment of the present disclosure may be, for example, an autonomous mobile robot having a shape imitating a human or an animal such as a dog and having a movement capability.

(Information Processing Server 20)

The information processing server 20 according to an embodiment of the present disclosure is an information processing apparatus that is connected to a plurality of autonomous mobile bodies 10 and has a function of collecting various types of information from the autonomous mobile bodies 10. For example, the information processing server 20 can perform analysis and the like related to hardware status of the autonomous mobile body 10 and a degree of user's enthusiasm for the autonomous mobile body 10, from sensor information collected by the autonomous mobile body 10.

Furthermore, the information processing server 20 has a function of presenting, on the basis of a situation estimated by the autonomous mobile body 10, a recommended action to be performed by the autonomous mobile body 10 in the situation. At this time, the information processing server 20 may transmit, to the autonomous mobile body 10, control sequence data for causing the autonomous mobile body 10 to realize the recommended action. The function described above provided to the information processing server 20 will be separately described in detail.

(Network 30)

The network 30 has a function of connecting between the autonomous mobile body 10 and the information processing server 20, and between the autonomous mobile bodies 10.

The network 30 may include: a public line network such as the Internet, a telephone line network, and a satellite communication network; various local area networks (LANs) including Ethernet (registered trademark); a wide area network (WAN); and the like. Furthermore, the network 30 may include a dedicated line network such as an Internet protocol-virtual private network (IP-VPN). Furthermore, the network 30 may include a wireless communication network such as Wi-Fi (registered trademark) or Bluetooth (registered trademark).

A system configuration example according to an embodiment of the present disclosure has been described above. Note that the configuration described above with reference to FIG. 7 is merely an example, and the configuration of the information processing system according to an embodiment of the present disclosure is not limited to the example. For example, the autonomous mobile body 10 may further perform information communication with various external devices in addition to the information processing server 20. The external devices described above may include, for example, a server that sends weather, news, and other service information, various information processing terminals owned by the user, home electric appliances, and the like. The system configuration according to an embodiment of the present disclosure may be flexibly modified in accordance with specifications and operations.

<<1.4. Functional Configuration Example of Autonomous Mobile Body 10>>

Figure 8:
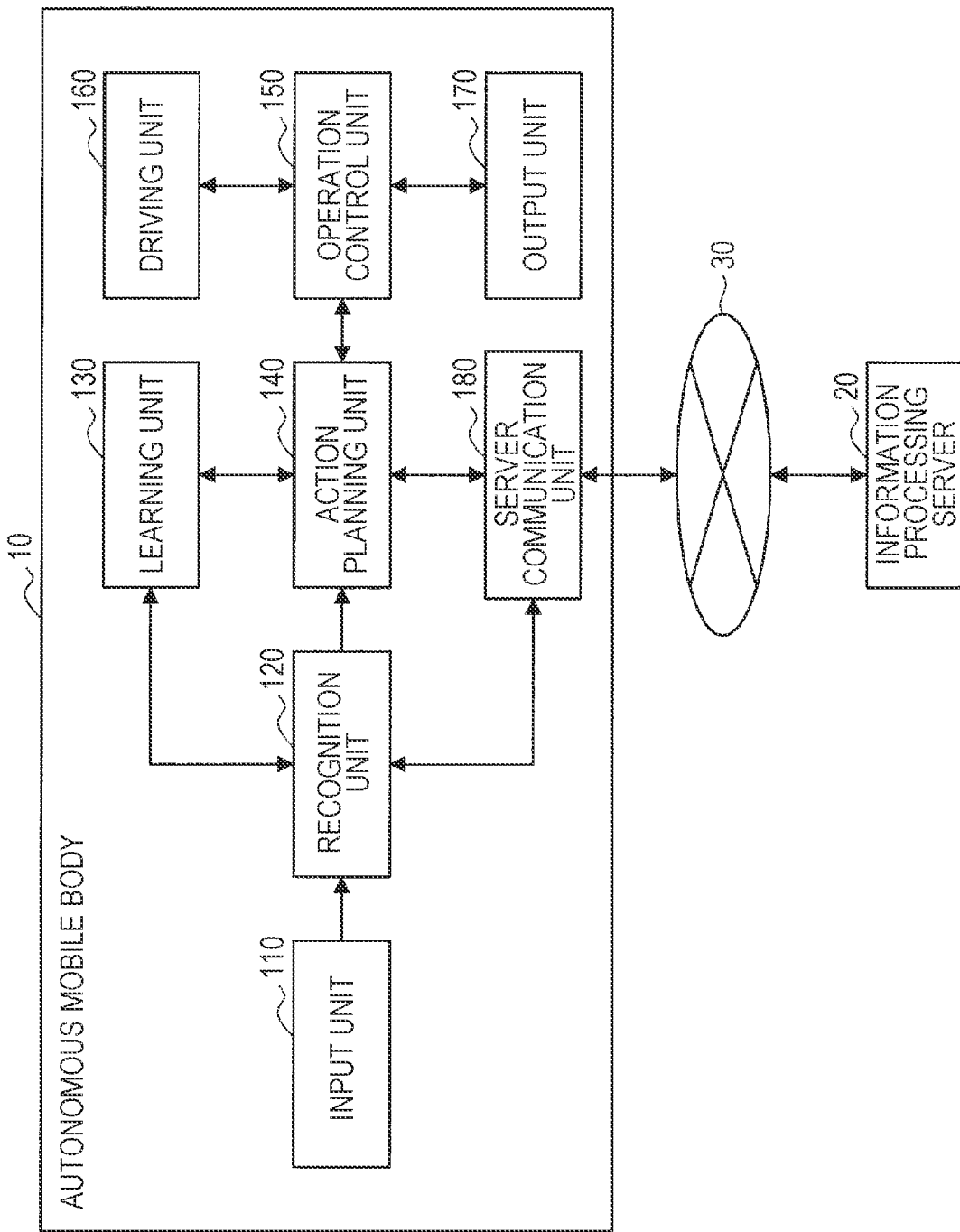
FIG. 8 is a diagram illustrating a functional configuration example of an autonomous mobile body according to an embodiment of the present disclosure.

Next, a functional configuration example of the autonomous mobile body 10 according to an embodiment of the present disclosure will be described. FIG. 8 is a diagram illustrating a functional configuration example of the autonomous mobile body 10 according to an embodiment of the present disclosure. Referring to FIG. 8, the autonomous mobile body 10 according to an embodiment of the present disclosure includes an input unit 110, a recognition unit 120, a learning unit 130, an action planning unit 140, an operation control unit 150, a driving unit 160, an output unit 170, and a server communication unit 180.

(Input Unit 110)

The input unit 110 has a function of collecting various kinds of information regarding a user and a surrounding environment. The input unit 110 collects, for example, user's utterance and environmental sounds generated around the user, image information regarding the user and the surrounding environment, and various kinds of sensor information. For this purpose, the input unit 110 includes various sensors illustrated in FIG. 1.

(Recognition Unit 120)

The recognition unit 120 has a function of performing various kinds of recognition related to the user, a surrounding environment, and a state of the autonomous mobile body 10, on the basis of various kinds of information collected by the input unit 110. As an example, the recognition unit 120 may perform human identification, recognition of facial expression and line-of-sight, object recognition, color recognition, shape recognition, marker recognition, obstacle recognition, step recognition, brightness recognition, and the like.

Furthermore, the recognition unit 120 performs emotion recognition, word understanding, sound source localization, and the like related to user's voice. Furthermore, the recognition unit 120 can recognize contact by the user and the like, surrounding temperature, existence of a mobile body, a posture of the autonomous mobile body 10, and the like.

Moreover, the recognition unit 120 has a function of estimating and understanding a surrounding environment and a situation where the autonomous mobile body 10 is placed, on the basis of the recognized information described above. At this time, the recognition unit 120 may comprehensively perform situation estimation by using environmental knowledge stored in advance.

(Learning Unit 130)

The learning unit 130 has a function of learning an environment (situation) and an action, and an effect of the action on the environment. The learning unit 130 realizes the learning described above by using, for example, a machine learning algorithm such as deep learning. Note that the learning algorithm employed by the learning unit 130 is not limited to the example described above, and can be designed as appropriate.

(Action Planning Unit 140)

The action planning unit 140 has a function of planning an action to be performed by the autonomous mobile body 10, on the basis of a situation estimated by the recognition unit 120 and knowledge learned by the learning unit 130. Details of the function of the action planning unit 140 according to an embodiment of the present disclosure will be separately described later.

(Operation Control Unit 150)

The operation control unit 150 has a function of controlling operations of the driving unit 160 and the output unit 170 on the basis of an action plan by the action planning unit 140. The operation control unit 150 performs rotation control of the actuator 570, display control of the display 510, sound output control of a speaker, and the like, for example, on the basis of the action plan described above. Details of the function of the operation control unit 150 according to an embodiment of the present disclosure will be separately described in detail.

(Driving Unit 160)

The driving unit 160 has a function of bending and stretching a plurality of a joint part included in the autonomous mobile body 10 on the basis of control by the operation control unit 150. More specifically, the driving unit 160 drives the actuator 570 included in each joint part on the basis of control by the operation control unit 150.

(Output Unit 170)

The output unit 170 has a function of outputting visual information and sound information on the basis of control by the operation control unit 150. For this purpose, the output unit 170 includes the display 510 and the speaker.

(Server Communication Unit 180)

The server communication unit 180 has a function of performing information communication with the information processing server 20 and other autonomous mobile bodies 10. For example, the server communication unit 180 transmits information and the like regarding a situation recognized by the recognition unit 120, to the information processing server 20. Furthermore, for example, the server communication unit 180 receives a recommended action and control sequence data related to the recommended action, from the information processing server 20.

A functional configuration example of the autonomous mobile body 10 according to an embodiment of the present disclosure has been described above. Note that the configuration described above with reference to FIG. 8 is merely an example, and the functional configuration of the autonomous mobile body 10 according to an embodiment of the present disclosure is not limited to the example. The functional configuration of the autonomous mobile body 10 according to an embodiment of the present disclosure may be flexibly modified in accordance with specifications and operations.

<<1.5. Functional Configuration Example of Information Processing Server 20>>

Figure 9:
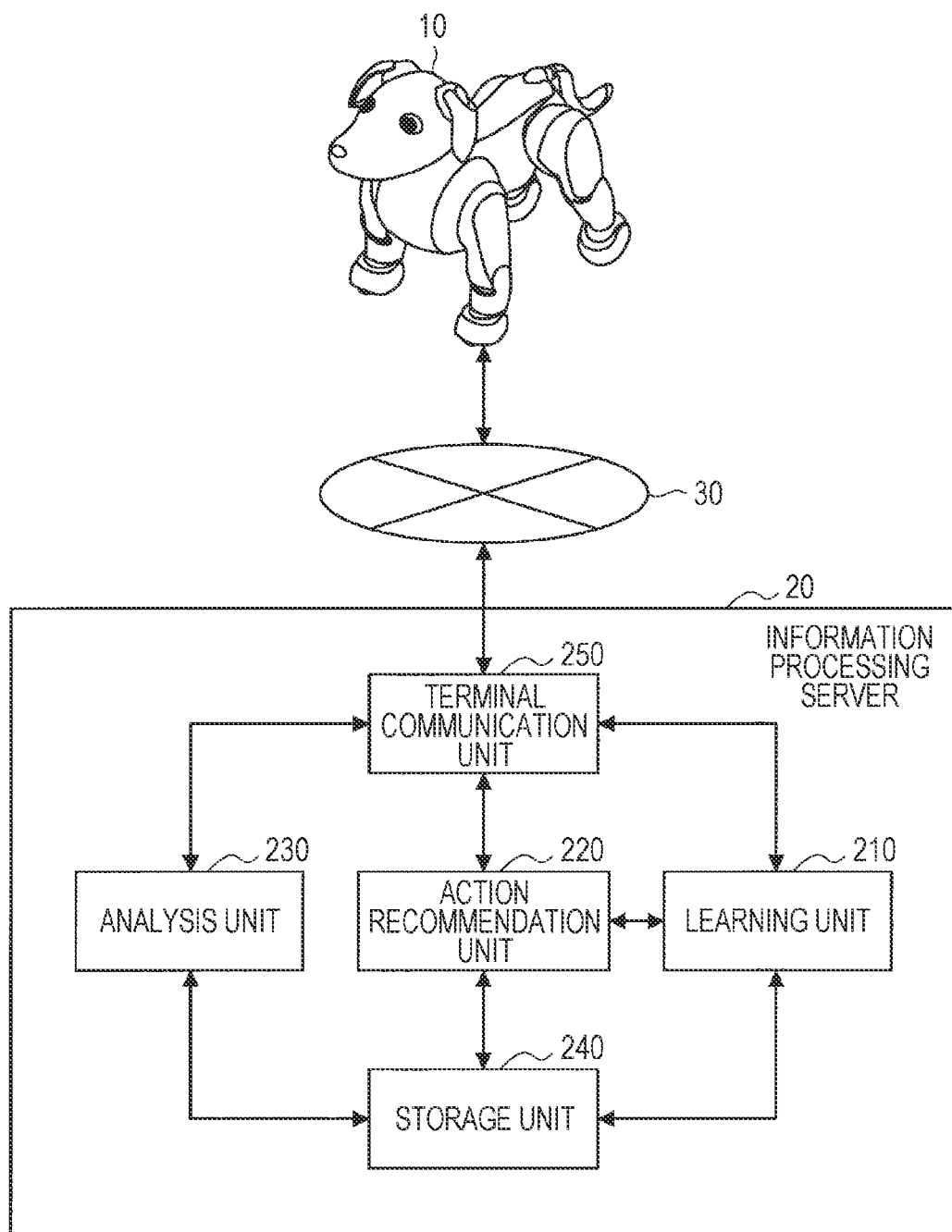
FIG. 9 is a diagram illustrating a functional configuration example of an information processing server according to an embodiment of the present disclosure.

Next, a functional configuration example of the information processing server 20 according to an embodiment of the present disclosure will be described. FIG. 9 is a diagram illustrating a functional configuration example of the information processing server 20 according to an embodiment of the present disclosure. Referring to FIG. 9, the information processing server 20 according to an embodiment of the present disclosure includes a learning unit 210, an action recommendation unit 220, an analysis unit 230, a storage unit 240, and a terminal communication unit 250.

(Learning Unit 210)

The learning unit 130 has a function of learning an environment (situation) and an action, and an effect of the action on the environment. At this time, the learning unit 210 has a feature of learning based on an action history collected from a plurality of autonomous mobile bodies 10. That is, the learning unit 210 can be said to be collective intelligence common to the plurality of autonomous mobile bodies 10.

(Action Recommendation Unit 220)

The action recommendation unit 220 has a function of determining a recommended action recommended for the autonomous mobile body 10, on the basis of information regarding situation estimation received from the autonomous mobile body 10, and on the basis of knowledge as collective intelligence that the learning unit 210 has. Furthermore, one feature of the action recommendation unit 220 is to transmit, to the autonomous mobile body via the terminal communication unit 250, control sequence data for causing the autonomous mobile body 10 to realize the recommended action, together with the recommended action.

Here, the control sequence data described above is information including a change in time series in a rotational position of the joint parts included in the autonomous mobile body 10, eyeball expressions, and a control signal related to sound output. That is, the control sequence data can be said to be setting data for causing the autonomous mobile body 10 to realize any given movement (action).

According to the function described above provided to the action recommendation unit 220 according to an embodiment of the present disclosure, it is possible to add a new action that can be executed by the autonomous mobile body 10 at any time, enabling continuous attraction and the like of user's interest in the autonomous mobile body 10.

(Analysis Unit 230)

The analysis unit 230 has a function of performing various analyses on the basis of information received from the autonomous mobile body 10. The analysis unit 230 can analyze a state of the actuator 570 and the like on the basis of, for example, an action history and an operation state received from the autonomous mobile body 10. Furthermore, the analysis unit 230 can analyze user's interest (degree of enthusiasm) and the like in the autonomous mobile body 10, on the basis of information such as user's contact and reactions received from the autonomous mobile body 10.

(Storage Unit 240)

The storage unit 240 has a function of accumulating information to be used by each configuration of the information processing server 20. For example, the storage unit 240 stores control sequence data received from the autonomous mobile body 10 in association with a situation and a user's reaction. Furthermore, the storage unit 240 stores information to be used by the analysis unit 230 for analysis, and analysis results.

(Terminal Communication Unit 250)

The terminal communication unit 250 has a function of performing information communication with a plurality of autonomous mobile bodies 10 via the network 30. The terminal communication unit 250 receives information regarding situation estimation from the autonomous mobile body 10, for example. Furthermore, for example, the terminal communication unit 250 transmits, to the autonomous mobile body 10, information regarding a recommended action determined by the action recommendation unit 220, and the control sequence data.

A functional configuration example of the information processing server 20 according to an embodiment of the present disclosure has been described above. Note that the configuration described above with reference to FIG. 9 is merely an example, and the functional configuration of the information processing server 20 according to an embodiment of the present disclosure is not limited to the example. The information processing server 20 may have a function of providing the user with various user interfaces described later, for example. Furthermore, various functions provided to the information processing server 20 can be realized by being distributed to a plurality of devices. The functional configuration of the information processing server 20 according to an embodiment of the present disclosure may be flexibly modified in accordance with specifications and operations.

2. FIRST EMBODIMENT

<<2.1. Overview>>

Next, a first embodiment of the present disclosure will be described. As described above, the autonomous mobile body 10 according to an embodiment of the present disclosure can execute various movements (actions) by having the display 510 that expresses movements of a plurality of joint parts and eyeballs.

Whereas, in order for the autonomous mobile body 10 to execute an action, it is required to hold control sequence data corresponding to the action. For this reason, in a case where there is no mechanism for adding new control sequence data to the autonomous mobile body 10, the autonomous mobile body 10 is to execute only an action that has been set at a time of product shipment.

In this case, user's interest in the repeatedly executed action is lost, which may be a factor that deteriorates a degree of enthusiasm for the autonomous mobile body 10. Furthermore, depending on the user, there may be a desire to cause the autonomous mobile body 10 to memorize and execute an original action, like teaching tricks to a real dog.

An autonomous mobile body 10 according to the present embodiment is conceived by focusing on the points described above, and allows a user to easily make the autonomous mobile body 10 learn a new action. Therefore, one feature of the autonomous mobile body 10 according to the present embodiment is to generate, on the basis of a teaching movement, control sequence data for realizing an autonomous movement corresponding to the teaching movement. Furthermore, one feature of the autonomous mobile body 10 according to the present embodiment is to execute an autonomous movement corresponding to control sequence data on the basis of an action plan determined by situation estimation.

According to the above-described features provided to the autonomous mobile body 10 according to the present embodiment, the user can easily make the autonomous mobile body 10 learn a new action, and an effect of maintaining a high degree of user's enthusiasm is expected.

<<2.2. Generation of Control Sequence Data>>

Next, generation of control sequence data according to the present embodiment will be described in detail. The operation control unit 150 of the autonomous mobile body 10 according to the present embodiment has a function of generating, on the basis of a teaching movement, control sequence data for realizing an autonomous movement corresponding to the teaching movement.

More specifically, the operation control unit 150 according to the present embodiment may generate control sequence data including at least information regarding a change in a rotational position of a joint part in time series, on the basis of a teaching movement.

Figure 10:
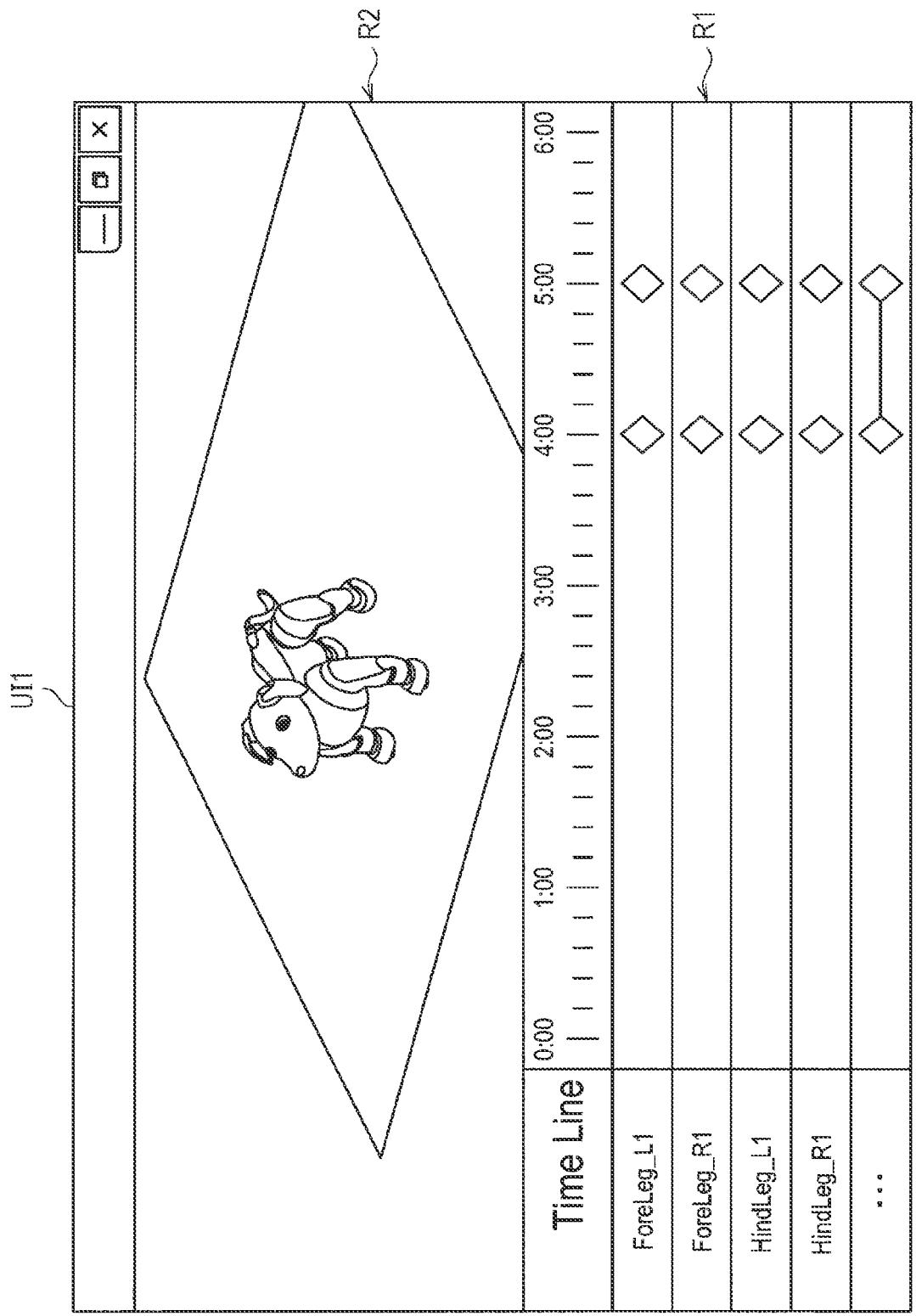
FIG. 10 is a view for explaining teaching of an action with use of a user interface according to a first embodiment of the present disclosure.

At this time, the user can teach, that is, make the autonomous mobile body 10 learn a new action, by using a dedicated user interface, for example. FIG. 10 is a view for explaining teaching of an action with use of a user interface according to the present embodiment.

FIG. 10 illustrates a user interface UI1 for a user to teach a new action to the autonomous mobile body 10. The user can access the user interface UI1 through, for example, a computer, a smartphone, and the like.

Referring to FIG. 10, the user interface UI1 according to the present embodiment has, for example, two regions R1 and R2. The region R1 may be a region for the user to set a movement of a joint part of the autonomous mobile body 10. The user can teach a new action to the autonomous mobile body 10 by specifying a change in a rotational position of each joint part (direction of bending and stretching, magnitude, speed, and the like) in time series in the region R1. At this time, for example, the user may specify a rotation angle and a rotation speed of the joint part by operating a keyboard or a mouse.

Furthermore, the region R2 is a region for displaying a preview of the teaching movement specified by the user in the region R1. For example, the region R2 may display an avatar of the autonomous mobile body 10 that reproduces a movement of the joint part specified by the user in the region R1. Note that, in addition to the overhead view image illustrated in the figure, the region R2 may display an image that reproduces the teaching movement from the front, top, side, rear, and the like of the autonomous mobile body 10.

Furthermore, the user can also teach the action by operating the avatar of the autonomous mobile body 10 displayed in the region R2 with a mouse, a finger, and the like. On the basis of the user operation described above executed in the region R2, the operation control unit 150 according to the present embodiment can store the rotation angle and the rotation speed of the actuator 570 corresponding to each joint part, and reflect on the setting of the region R1.

Furthermore, although not shown, the user can also set, in the user interface U1, a movement of the eyeball of the autonomous mobile body 10 to be displayed on the display 510, animal sound to be outputted to the speaker, and the like.

In this way, the user interface UI1 according to the present embodiment allows the user to teach a new action finely and accurately, and enables the autonomous mobile body to execute a more accurate movement.

Furthermore, the teaching movement according to the present embodiment may include a physical bending and stretching movement of a joint part by the user. The operation control unit 150 according to the present embodiment can generate control sequence data on the basis of the physical bending and stretching movement described above.

Figure 11:
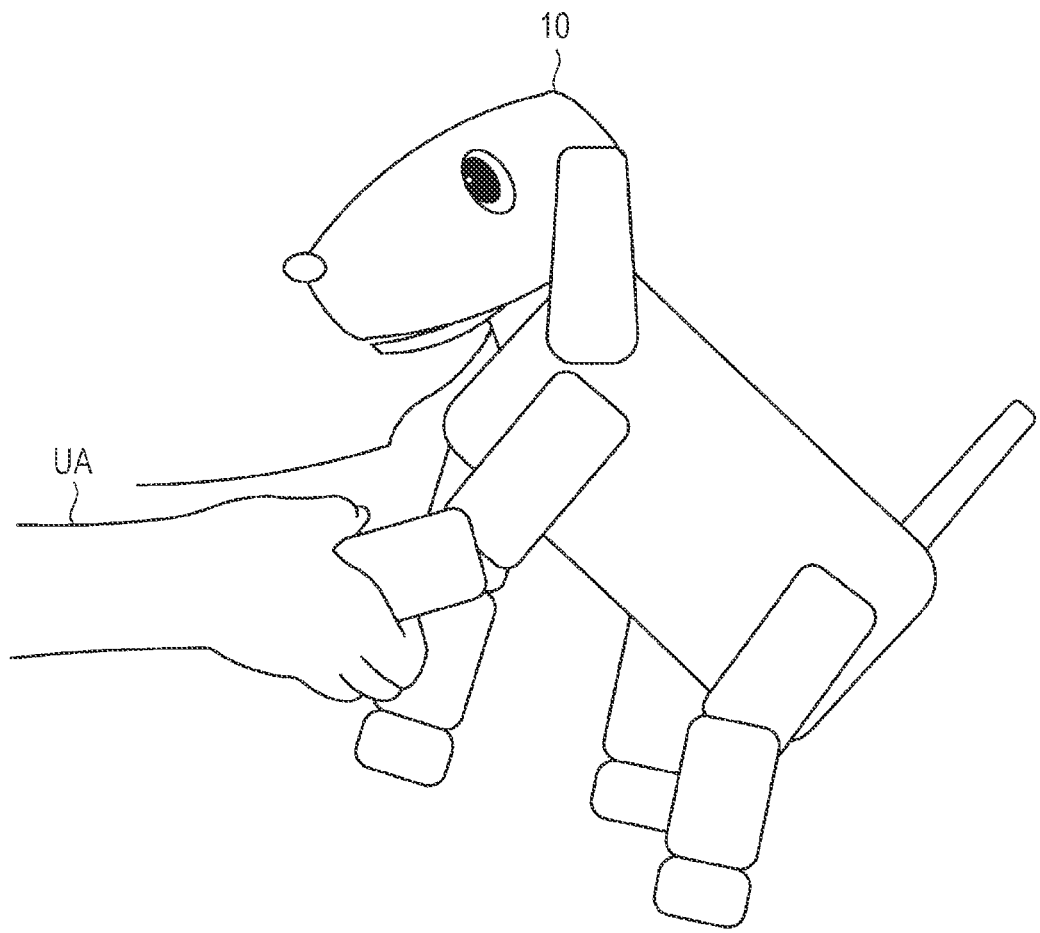
FIG. 11 is a view for explaining teaching by a physical bending and stretching movement of a joint part according to the embodiment.

FIG. 11 is a view for explaining teaching by a physical bending and stretching movement of a joint part according to the present embodiment. As illustrated in FIG. 11, the user can teach a new action by physically bending and stretching a joint part of the autonomous mobile body 10 with, for example, a hand UA and the like.

At this time, first, the user makes the autonomous mobile body 10 recognize that a teaching movement is to be performed, by performing utterance such as "remember", for example. Furthermore, when the recognition unit 120 recognizes that the bending and stretching movement by the user is started, the operation control unit 150 causes the driving unit 160 to execute a relaxation operation of the joint part.

The relaxation operation described above refers to an operation to allow a state where the actuator 570 easily rotates with respect to a force applied from the outside, in order to realize the teaching movement by the user. The actuator 570 according to the present embodiment is configured to be able to optionally adjust a resistance coefficient for a rotational motion, and can realize a state of being easy to rotate or a state of being difficult to rotate with respect to a force applied from outside, for example. The relaxation operation according to the present embodiment allows the user to easily bend and stretch the joint part, and can eliminate the possibility that a force is forcibly applied to damage the actuator 570 and the risk of injury to the user.

Furthermore, when the user starts a bending and stretching movement of a joint part, the operation control unit 150 according to the present embodiment stores a change in a rotational position in time series, on the basis of the rotational position of the joint part detected by a position sensor included in the actuator 570.

As described above, the function described above provided to the operation control unit 150 according to the present embodiment makes it possible to intuitively teach a new action to the autonomous mobile body 10 by directly moving the joint part, even by a user who is not familiar with technical knowledge.

Furthermore, the teaching movement according to the present embodiment may include motion of a mobile body having a joint. The operation control unit 150 according to the present embodiment can also generate control sequence data on the basis of an imaged motion of the mobile body.

FIG. 12 is a view for explaining teaching related to an imaged motion of a mobile body according to the present embodiment. FIG. 12 illustrates visual information V1 related to a motion of a mobile body P1 outputted from a display device, and the autonomous mobile body 10 that visually recognizes the visual information V1.

As illustrated in FIG. 12, the operation control unit 150 according to the present embodiment can generate control sequence data corresponding to a teaching movement, with a motion of the mobile body imaged by the input unit 110 as the teaching movement.

Note that FIG. 12 illustrates a case where the motion of the mobile body P1 is displayed as the visual information V1 by the display device, but the motion of the mobile body according to the present embodiment is not limited to this example. The motion of the mobile body according to the present embodiment widely includes, for example, a real movement by a user, a pet, or another autonomous mobile body, an animation displayed as visual information, and the like.

Furthermore, the operation control unit 150 according to the present embodiment may generate control sequence data based on a motion of the mobile body regardless of the presence or absence of an explicit instruction from the user. That is, even in a case where the user does not give an instruction, the operation control unit 150 according to the present embodiment can autonomously generate control sequence data related to a new action, with a motion of a user or a pet, and visual information displayed by the display device as the teaching movement.

According to the function described above provided to the operation control unit 150 according to the present embodiment, the autonomous mobile body 10 itself can imitate a motion of the user or the pet, and to autonomously learn a trendy dance and the like projected on the display device, which can keep high interest of the user in the autonomous mobile body 10.

First, the operation control unit 150 estimates a position of a joint of the imaged mobile body, and acquires a joint part corresponding to each joint by using a relative joint map or the like. Moreover, the operation control unit 150 calculates magnitude of a bending and stretching motion related to the joint of the mobile body, and converts the bending and stretching motion of the joint into a rotational position of the corresponding joint part, and store.

At this time, the operation control unit 150 according to the present embodiment may appropriately correct the movement of the joint of the mobile body in accordance with a range of motion of the joint part. For example, the operation control unit 150 according to the present embodiment can dynamically trim a part of the bending and stretching motion related to the joint of the mobile body, and record the rotational position of the corresponding joint part. More specifically, in a case where the bending and stretching motion related to the joint of the mobile body exceeds a range of motion of the joint part corresponding to the joint, the operation control unit 150 according to the present embodiment can dynamically trim a part of the bending and stretching motion exceeding the range of motion.

Figure 13:
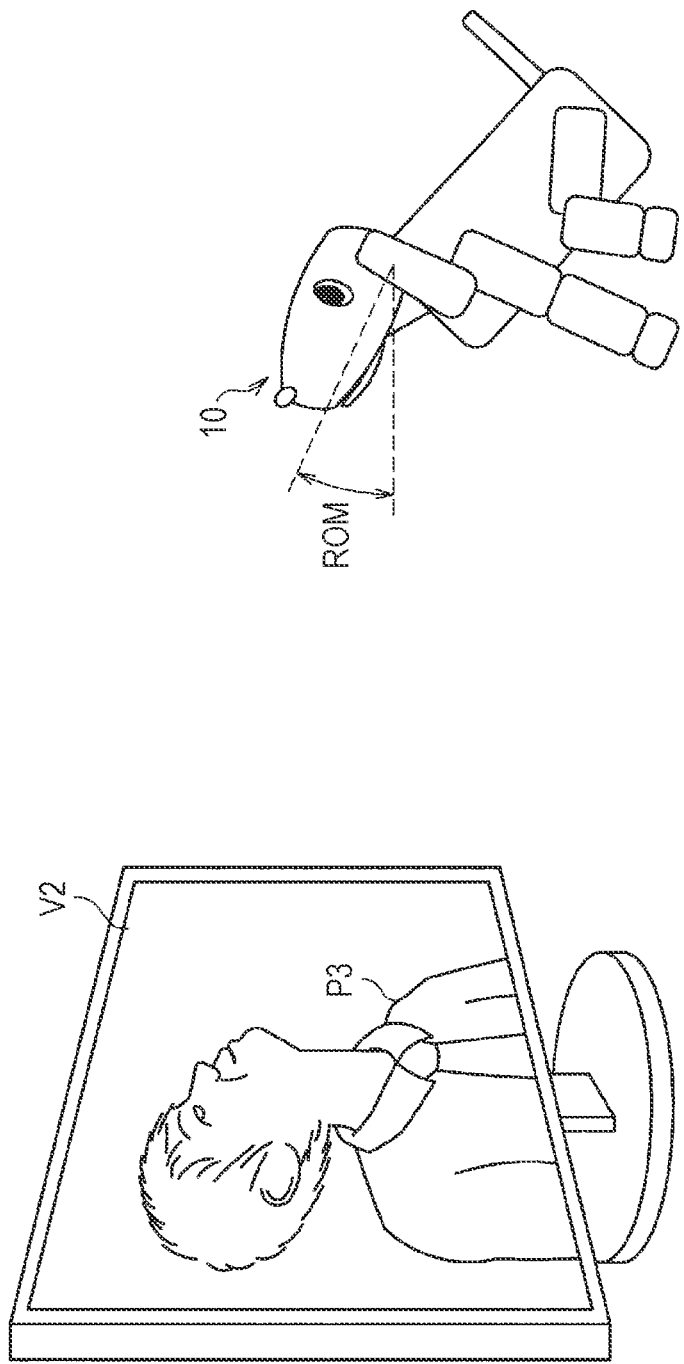
FIG. 13 is a view for explaining trimming based on a range of motion according to the embodiment.

FIG. 13 is a view for explaining trimming based on a range of motion according to the present embodiment. FIG. 13 illustrates a bending and stretching motion of the neck of a mobile body P3 outputted as visual information V2, and the autonomous mobile body 10 that visually recognizes visual information V3.

Note that FIG. 13 illustrates an example of a case where the bending and stretching motion of the neck by the mobile body P3 exceeds a range of motion ROM of the actuator 570 arranged at the neck of the autonomous mobile body 10. At this time, the operation control unit 150 according to the present embodiment may trim the bending and stretching motion of the mobile body P3 exceeding the range of motion ROM, and generate control sequence data so that a rotational position of the joint part falls within the range of motion ROM.

According to the function described above provided to the operation control unit 150 according to the present embodiment, control sequence data can be dynamically generated so that the teaching movement falls within the range of motion of the joint part, and can cause the autonomous mobile body 10 to realize a reasonable natural movement.

Furthermore, the operation control unit 150 according to the present embodiment can also generate control sequence data including position information of the autonomous mobile body 10, for example. Specifically, the operation control unit 150 according to the present embodiment can execute an action in which a position of the autonomous mobile body 10 in a space is specified. According to the function described above provided to the operation control unit 150 according to the present embodiment, the autonomous mobile body can execute, for example, an action in which any given place in the user's home is specified or an action in which a physical distance from the user is specified.

Furthermore, the operation control unit 150 according to the present embodiment can also generate control sequence data including relative position information regarding a plurality of autonomous mobile bodies 10.

FIG. 14 is a view for explaining teaching in which a relative position related to a plurality of autonomous mobile bodies 10 is specified, according to the present embodiment. FIG. 14 illustrates motions of mobile bodies P1 and P2 outputted as visual information V3, and autonomous mobile bodies 10*a* and 10*b* that visually recognize the visual information V3.

Here, the motions of the mobile bodies P1 and P2 illustrated in FIG. 14 may be, for example, a dance and the like in which a relative position is important. At this time, on the basis of the recognized relative position of the mobile bodies P1 and P2, the operation control unit 150 according to the present embodiment can generate control sequence data in which a relative position with respect to another autonomous mobile body 10 is recorded in time series, together with a rotational position of the joint part. For example, the operation control unit 150 can execute an action based on the relative position, by communicating, with another autonomous mobile body 10, information regarding the self-position estimated by the SLAM technology. Furthermore, the operation control unit 150 may execute an action based on the relative position, for example, by recognizing a marker and the like that has been set on the floor by the user.

As described above, the operation control unit 150 according to the present embodiment makes it possible to easily teach a new action to the autonomous mobile body 10 through a physical operation of the joint part and imaging. The function described above provided to the operation control unit 150 according to the present embodiment is expected to provide an effect of maintaining a high degree of user's enthusiasm for the autonomous mobile body 10 without boring the user with a limited action.

Figure 15:
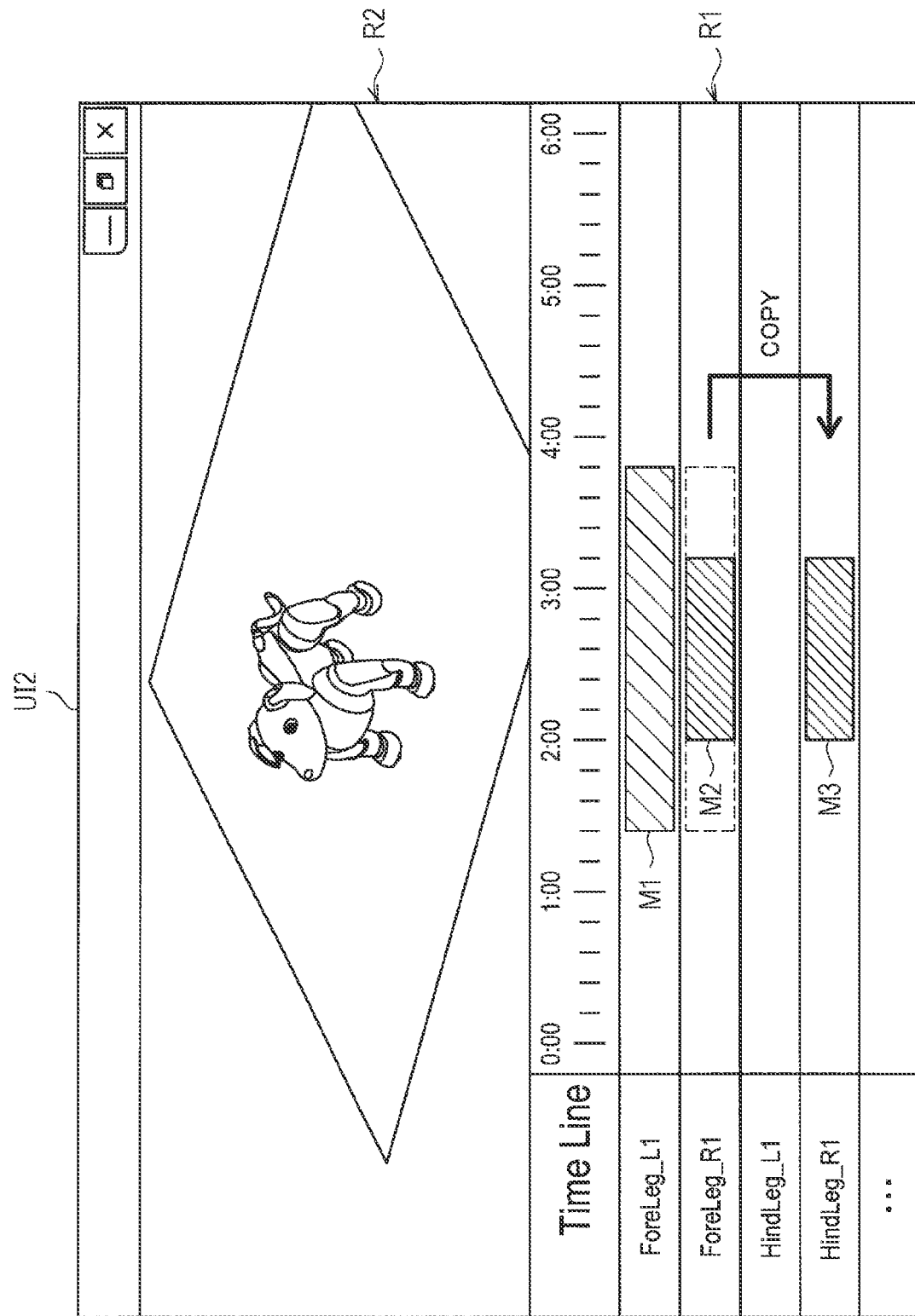
FIG. 15 is a view for explaining editing of control sequence data according to the embodiment.

Furthermore, the user can also edit the taught movement via, for example, a user interface. FIG. 15 is a view for explaining editing of control sequence data according to the present embodiment.

FIG. 15 illustrates a user interface UI2 to be used by the user for editing a teaching movement. As illustrated in FIG. 15, the user interface UI2 has the above-described regions R1 and R2. At this time, unlike the user interface UI1, the region R1 of the user interface UI2 may display, in advance, information of control sequence data taught through a physical operation of the joint part and imaging.

For example, with a mouse, a finger, and the like, the user can more easily edit the teaching movement by moving, copying, magnifying, or reducing motion bars M1 to M3 that specify a movement of each joint part. The user interface UI2 according to the present embodiment makes it possible to, for example, copy a movement of the right front leg taught by a physical operation of the joint part to another leg, and to finely specify a movement timing of each joint, which enables teaching more reflecting an intention of the user.

Furthermore, the operation control unit 150 according to the present embodiment can associate and store generated control sequence data and an incentive situation that induces the autonomous movement corresponding to the control sequence data. Here, the incentive situation described above refers to a situation that may be a trigger to cause the autonomous mobile body 10 to execute an autonomous movement corresponding to the teaching movement. Furthermore, the incentive situation according to the present embodiment includes various situations recognized by the recognition unit 120 on the basis of the sensor information collected by the input unit 110.

Figure 17:
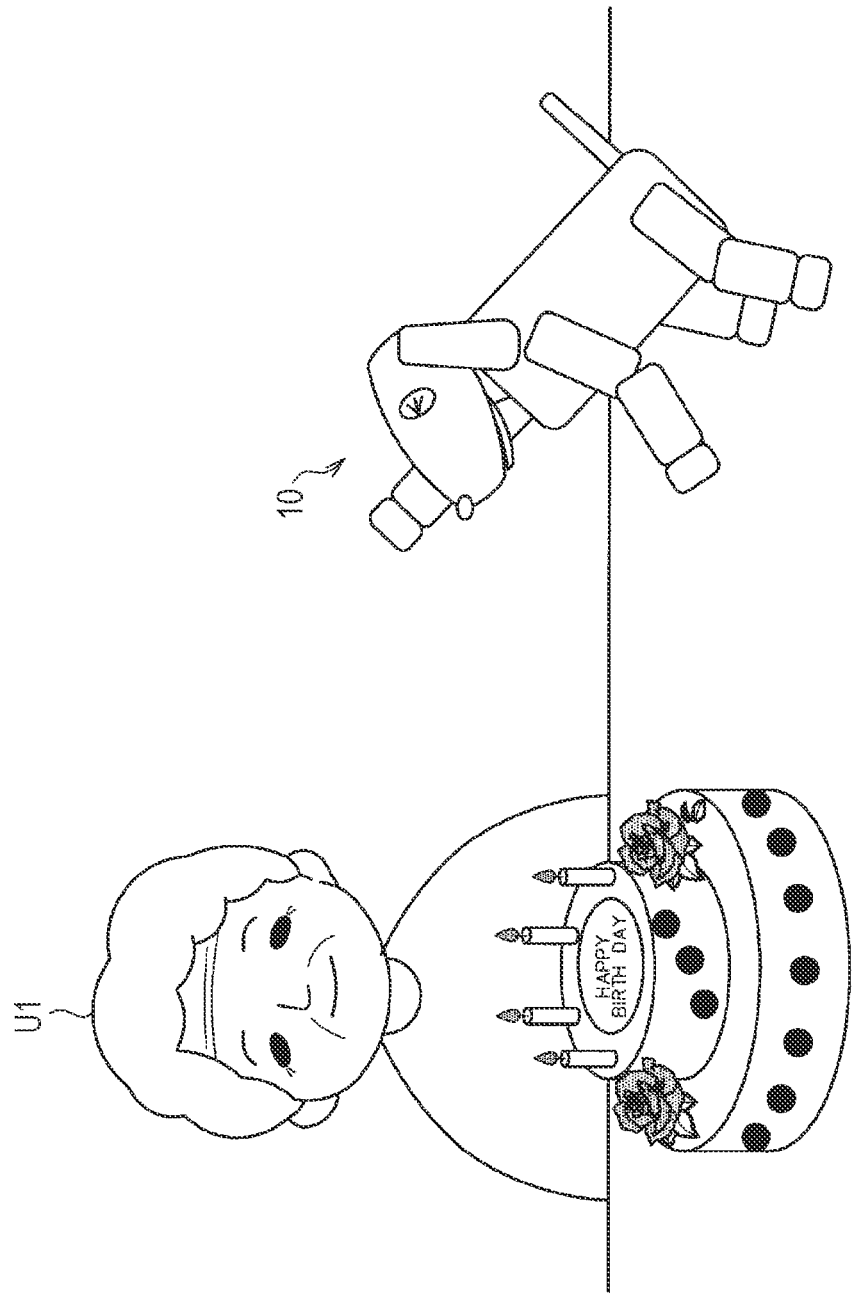
FIG. 17 is a view for explaining an incentive situation according to the embodiment.

FIGS. 16 and 17 are views for explaining an incentive situation according to the present embodiment. FIG. 16 illustrates an example in which the autonomous mobile body 10 executes an autonomous movement corresponding to a teaching movement, with music outputted from the display device as an incentive situation.

In a case of the example illustrated in FIG. 16, the music being played when the teaching movement has been performed is autonomously saved as the incentive situation, and the autonomous mobile body 10 performs the autonomous movement corresponding to the teaching movement when recognizing the same music. As described above, the autonomous mobile body 10 according to the present embodiment can execute an autonomous movement corresponding to the teaching movement on the basis of various incentive situations.

Furthermore, FIG. 17 illustrates an example of a case where the autonomous mobile body 10 executes an autonomous movement corresponding to a teaching movement with recognition of a user U1 as an incentive situation. The incentive situation according to the present embodiment may be specified by the user. For example, the user can set a case where the user U1 is recognized on the birthday of the user U1 as an incentive situation, and prompt the autonomous mobile body 10 to execute the autonomous movement corresponding to the teaching movement only once.

As described above, the autonomous mobile body 10 according to the present embodiment can execute an autonomous movement corresponding to the teaching movement on the basis of the incentive situation stored by itself or the incentive situation specified by the user. This function makes it possible to realize a natural reaction closer to living things and an action more reflecting the user's intention.

Furthermore, the autonomous mobile body 10 according to the present embodiment can transmit the control sequence data generated as described above, to another autonomous mobile body 10. FIG. 18 is a view for explaining transmission of control sequence data between the autonomous mobile bodies 10 according to the present embodiment.

FIG. 18 illustrates an example in which control sequence data CS generated by the autonomous mobile body 10*a* is transmitted to the autonomous mobile body 10*b* by wireless communication. In this way, the autonomous mobile body 10 according to the present embodiment can transmit the generated control sequence data CS to another autonomous mobile bodies 10.

According to the function described above provided to the autonomous mobile body 10 according to the present embodiment, for example, it is possible to realize spreading of the movement without awareness between a plurality of autonomous mobile bodies 10 owned by a same user or between autonomous mobile bodies 10 owned by different users, which makes it possible to keep the high interest of the user and to promote interaction and the like between the users.

<<2.3. Control Flow>>

Figure 19:
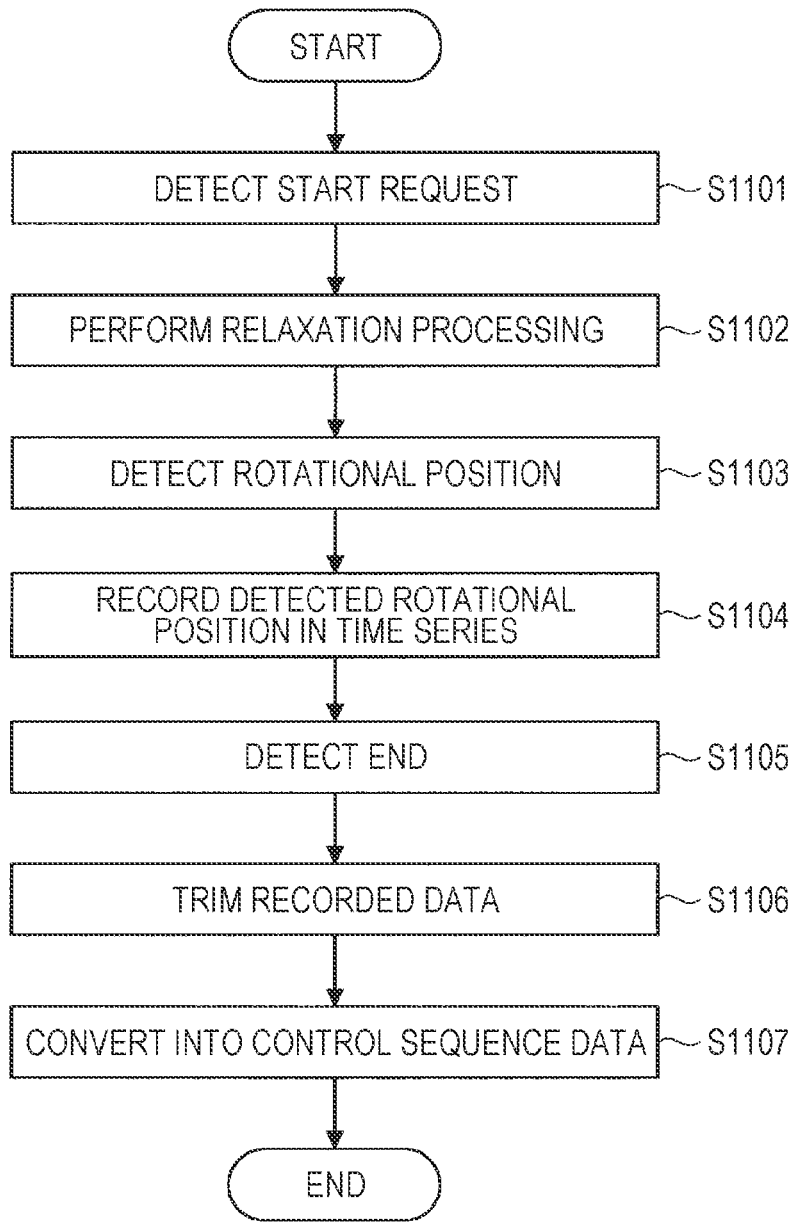
FIG. 19 is a flowchart showing a control flow of an autonomous mobile body 10 related to teaching by a physical bending and stretching movement of a joint part by a user, according to the embodiment.

Next, a control flow of the autonomous mobile body 10 according to the present embodiment will be described in detail. First, a control flow of the autonomous mobile body 10 related to teaching by a physical bending and stretching movement of a joint part by a user will be described. FIG. 19 is a flowchart showing a control flow of the autonomous mobile body 10 related to teaching by a physical bending and stretching movement of a joint part by a user.

Referring to FIG. 19, first, the recognition unit 120 detects a start request for a teaching movement on the basis of user's utterance and the like collected by the input unit 110 (S1101).

Next, the operation control unit 150 causes the driving unit 160 to execute a relaxation operation on the basis of the detection of the start request in step S1101 (S1102).

Subsequently, the operation control unit 150 detects a rotational position of the joint part bent and stretched by the user (S1103).

Furthermore, the operation control unit 150 records the detected rotational position of the joint part in time series (S1104).

Next, the recognition unit 120 detects an end of the teaching movement on the basis of user's utterance and the like (S11105). Note that the recognition unit 120 may detect the end of the teaching movement in a case where the user does not operate the joint part for a predetermined time or more.

Next, the operation control unit 150 trims the recorded data (S1106). At this time, for example, the operation control unit 150 may trim a time period from detection of the start to when the actual operation of the joint part is performed, a time period from the most recent operation of the joint part to detection of the end, and the like.

Subsequently, the operation control unit 150 converts the recorded data into control sequence data (S1107), and ends the processing.

Figure 20:
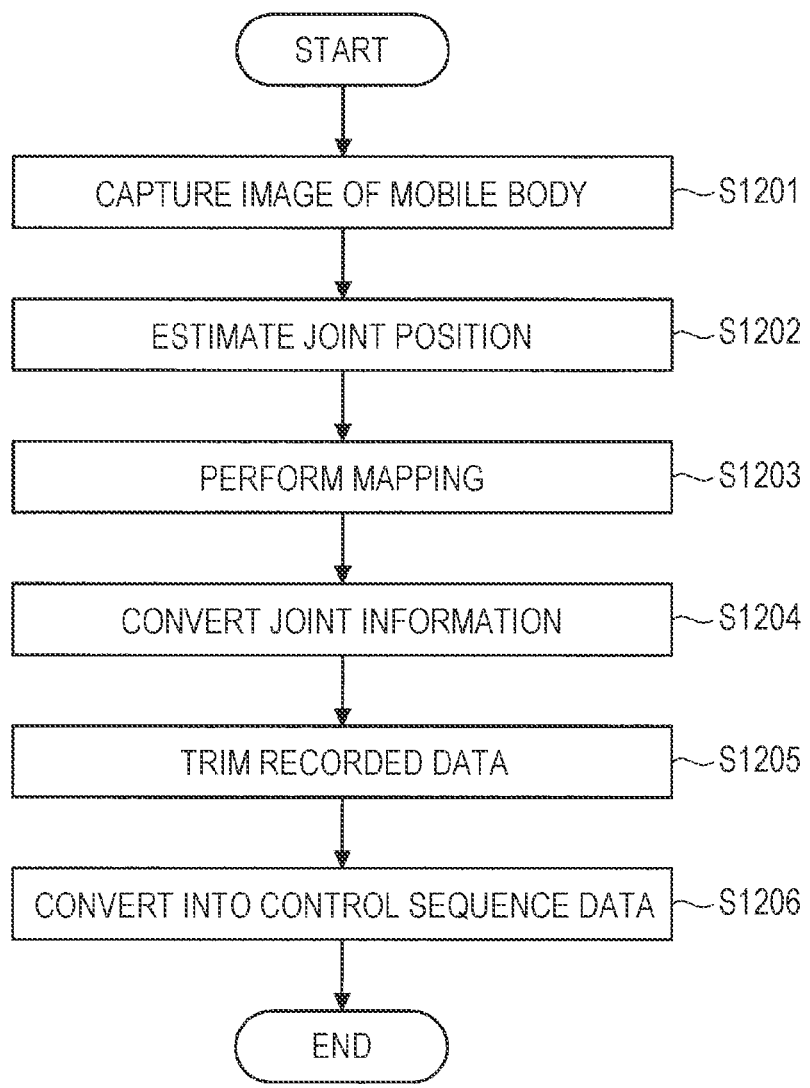
FIG. 20 is a flowchart showing a control flow of the autonomous mobile body with an imaged motion of a mobile body as teaching, according to the embodiment.

Next, the control flow of the autonomous mobile body 10 with an imaged motion of a mobile body as teaching will be described. FIG. 20 is a flowchart showing a control flow of the autonomous mobile body 10 with an imaged motion of a mobile body as teaching.

Referring to FIG. 20, first, a motion of a mobile body is imaged by the input unit 110 (S1201).

Next, the operation control unit 150 executes estimation related to a joint position of the mobile body (S1202).

Subsequently, the operation control unit 150 performs mapping between the joint of the mobile body estimated in step S1202 and a joint part included in the driving unit 160 (S1203).

Next, the operation control unit 150 converts bending and stretching of the joint of the mobile body into a rotational position of the joint part, and records (S1204).

Next, the operation control unit 150 trims the recorded data on the basis of a range of motion and the like of the joint part (S1205).

Subsequently, the operation control unit 150 converts the recorded data into control sequence data (S1206), and ends the processing.

3. SECOND EMBODIMENT

<<3.1. Overview>>

Next, a second embodiment of the present disclosure will be described. In the first embodiment described above, the method for teaching a new action to the autonomous mobile body 10 has been described in detail. In the second embodiment that follows, an action plan relating to various movements including the actions described above will be mainly described.

As described above, an autonomous mobile body 10 according to an embodiment of the present disclosure per- forms a dynamic movement based on an estimated situation, unlike a device that operates passively in accordance with a user's instruction. At this time, one feature of the autonomous mobile body 10 is to perform a comprehensive action plan based on a plurality of conflicting desires, in addition to the estimated situation.

Examples of the plurality of conflicting desires described above include, for example, a self-preservation desire and an approval desire. The self-preservation desire described above is a desire to maintain continuous and safe activities of the autonomous mobile body 10. More specifically, the self-preservation desire according to the present embodiment includes a desire for maintenance or replenishment of charging power of the autonomous mobile body 10. Furthermore, the self-preservation desire includes a desire for function maintenance or function recovery of the autonomous mobile body 10.

Furthermore, the approval desire described above is a desire to be loved, needed, or interested by the user. Therefore, the approval desire according to the present embodiment may widely include a desire to please the user, not to disappoint the user, and the like, in order to achieve the event described above.

The autonomous mobile body 10 according to an embodiment of the present disclosure has both the self-preservation desire and the approval desire described above, and thus can realize various more natural and flexible action patterns closer to a real animal. In the second embodiment of the present disclosure, description will be given in detail to a flexible action plan of the autonomous mobile body 10 based on the above-described desire and situation estimation with a specific example.

<<3.2. Specific Example of Action Plan>>

As described above, the autonomous mobile body 10 according to the present embodiment has a plurality of conflicting desires, that is, the self-preservation desire and the approval desire. Specifically, the autonomous mobile body 10 according to the present embodiment basically has a desire to be loved by the user and to please the user, but simultaneously has a desire to reduce power consumption and to charge the battery, or a desire to not consume component parts.

Therefore, the action planning unit 140 according to the present embodiment may make an action plan that satisfies at least one of the self-preservation desire or the approval desire described above, on the basis of a situation estimated by the recognition unit 120. For example, the action planning unit 140 can make an action plan that prioritizes either the self-preservation desire or the approval desire.

For example, the action planning unit 140 according to the present embodiment may determine a desire to be prioritized depending on whether or not a user is detected. Specifically, the action planning unit 140 according to the present embodiment may make an action plan that prioritizes the approval desire in a case where the user is detected, and make an action plan that prioritizes the self-preservation desire in a case where no user is detected.

FIG. 21 is a view for explaining an action plan based on whether or not a user is detected, according to the present embodiment. An upper part of FIG. 21 shows an example of a case where a user U2 is present in a peripheral region Z1 of the autonomous mobile body 10. At this time, the action planning unit 140 according to the present embodiment makes an action plan that prioritizes the approval desire, on the basis of the recognition unit 120 detecting the user U2 in the peripheral region Z1. For example, the action planning unit 140 may make an action plan such as approaching the user U2 or performing some action for the user U2.

Whereas, a lower part of FIG. 21 shows an example of a case where no user is present in the peripheral region Z1 of the autonomous mobile body 10. At this time, the action planning unit 140 according to the present embodiment may make an action plan that prioritizes the self-preservation desire, on the basis of the recognition unit 120 estimating the absence of the user. Note that the recognition unit 120 may estimate the absence of the user in a case where, for example, the user is not shown in an image captured by the input unit 110, in a case where user's utterance is not detected, and the like. Furthermore, the recognition unit 120 can also estimate the absence of the user on the basis of user's schedule information.

As described above, the self-preservation desire according to the present embodiment includes a desire related to charging power of the autonomous mobile body 10. Therefore, in a case where the user is not detected, the action planning unit 140 may make an action plan that prioritizes maintenance or replenishment of charging power. In a case of the example shown in the lower part of FIG. 21, the action planning unit 140 plans replenishment of charging power, and the operation control unit 150 connects the autonomous mobile body 10 to a charging device 50 on the basis of the plan.

Figure 22:
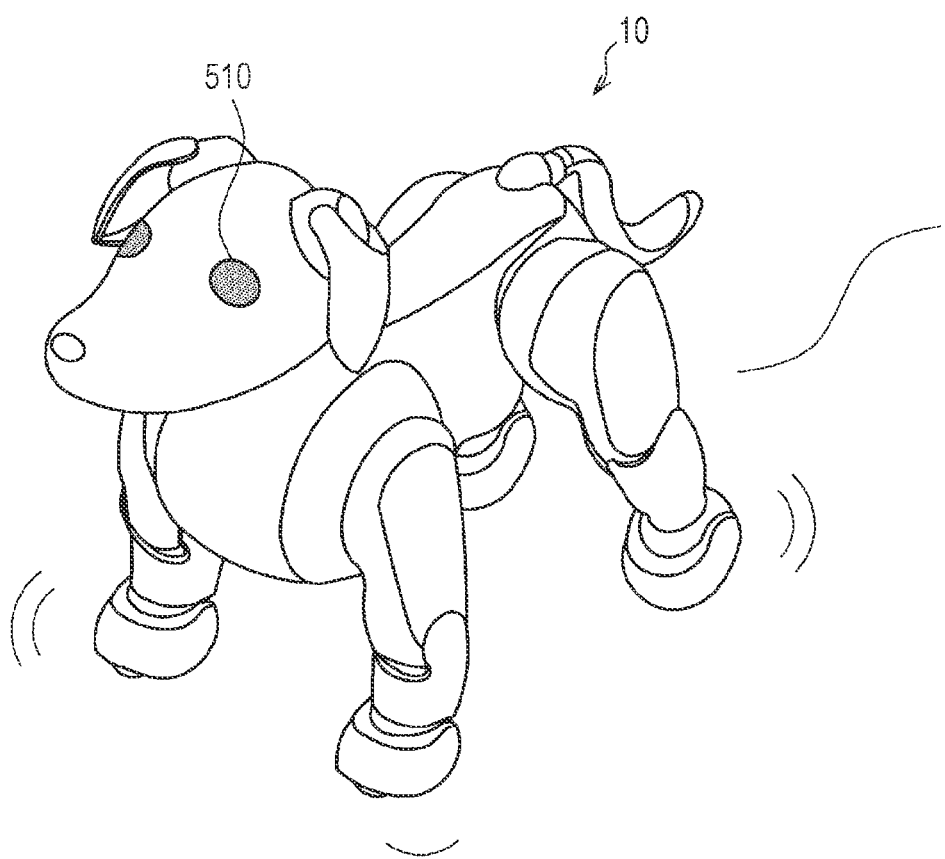
FIG. 22 is a view for explaining an action plan that prioritizes reduction of power consumption, according to the embodiment.

Furthermore, the action planning unit 140 according to the present embodiment may execute various action plans for reducing power consumption in a case where charging is not necessary. FIG. 22 is a view for explaining an action plan that prioritizes reduction of power consumption, according to the present embodiment.

For example, the action planning unit 140 according to the present embodiment may execute a plan for stopping output of visual expression related to an eyeball movement by the display 510, in order to reduce power consumption. Furthermore, similarly, the action planning unit 140 can perform a plan for stopping output of sound by the speaker and data collection by various sensors.

Furthermore, the action planning unit 140 may reduce power consumption by planning to slow movements of joint parts or an action of sleeping on the spot. Furthermore, the action planning unit 140 may plan an action such as turning off a processor or the power.

Furthermore, the self-preservation desire according to the present embodiment includes a desire related to function maintenance of the autonomous mobile body 10. Therefore, an action plan that prioritizes function maintenance and function recovery of the autonomous mobile body 10 according to the present embodiment may be made.

For example, in a case where a malfunction is detected in an operation of the actuator 570, the action planning unit 140 may make an action plan for not operating the corresponding actuator 570 as much as possible so as not to deteriorate the malfunction. Furthermore, for example, the action planning unit 140 may prioritize function maintenance, and may plan execution of calibration related to the display 510 and various sensors.

Note that, in a case where a degree of the self-preservation desire as described above is very large, the action planning unit 140 may make an action plan that prioritizes the self-preservation desire. For example, in a case where charging power is almost exhausted, a case where the actuator 570 is severely damaged, and the like, the action planning unit 140 plans an action that prioritizes the self-preservation desire even in a case where the user is present.

Whereas, in a case where a degree of the self-preservation desire is below a threshold, the action planning unit 140 can cause the autonomous mobile body 10 to realize various movements for meeting user's expectations, by performing an action plan that prioritizes the approval desire.

In this way, the action planning unit 140 according to the present embodiment makes it possible to realize a complex and flexible action pattern close to that of a real animal, by controlling the priority of the self-preservation desire and the approval desire in accordance with the situation.

Furthermore, the action planning unit 140 according to the present embodiment may plan an action that can satisfy both desires at the same time, regardless of a case where the self-preservation desire is prioritized or where the approval desire is prioritized. For example, in a case of having detected the user in the visual field, in a case of being called by the user, and the like, there is also a case where power consumption can be reduced by performing an action according to a user's state and the like, instead of rushing to the user immediately.

Figure 23:
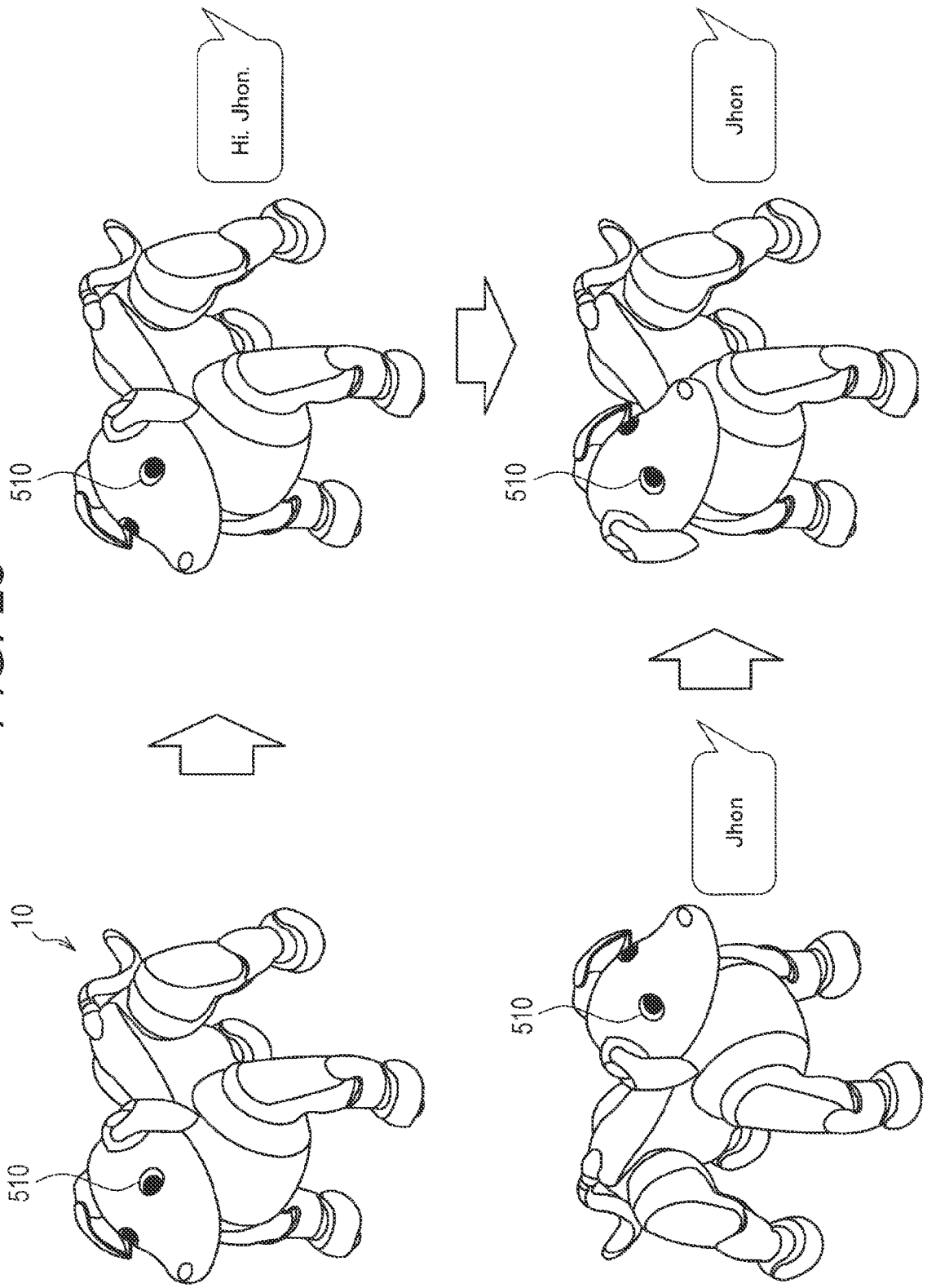
FIG. 23 is a view illustrating an example of an action plan that achieves both a self-preservation desire and an approval desire according to the embodiment.

FIG. 23 is a view illustrating an example of an action plan that achieves both the self-preservation desire and the approval desire according to the present embodiment. Note that FIG. 23 illustrates an example of an action plan when called by the user.

First, when user's utterance is detected by the recognition unit 120, the action planning unit 140 plans an action for directing line-of-sight to be displayed on the display 510 toward the user. The function described above provided to the action planning unit 140 makes possible to realize a quick reaction and to prevent a careless operation of the actuator 570, by firstly controlling only visual information regarding an eyeball movement before operating the actuator 570.

Subsequently, in a case where the recognition unit 120 recognizes that the user is calling toward the autonomous mobile body 10 or that the user's line-of-sight is directed toward the autonomous mobile body 10, the head and the torso are directed toward the user in this order, following the line-of-sight. At this time, by returning the pupil to the center of the display 510 while keeping the line-of-sight at the user, and simultaneously directing the head toward the user, the action planning unit 140 can realize a more natural movement of the autonomous mobile body 10.

Similarly, by planning an action so as to gradually reduce an angle difference between with the torso while keeping the head in the direction of the user, the action planning unit can realize a natural movement and prevent an increase in power consumption due to an abrupt movement.

Figure 24:
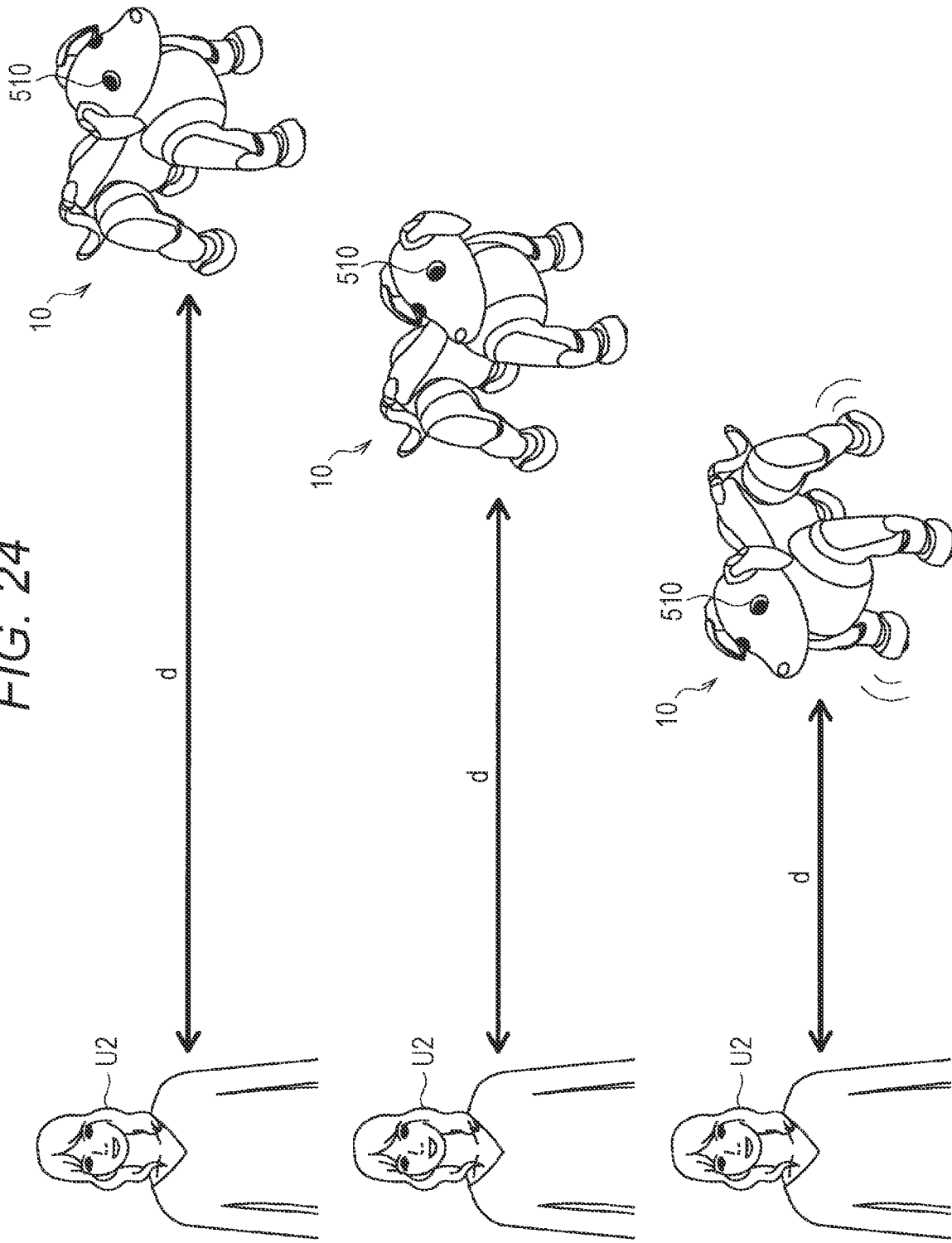
FIG. 24 is a view for explaining an action plan based on a distance between a user and an autonomous mobile body according to the embodiment.

Furthermore, at this time, the action planning unit 140 according to the present embodiment may make an action plan based on a distance between the user and the autonomous mobile body 10. FIG. 24 is a view for explaining an action plan based on a distance between the user and the autonomous mobile body 10 according to the present embodiment.

FIG. 24 illustrates an example of an action to be planned in accordance with a distance from the user U2. Specifically, as shown in an upper stage of FIG. 24, in a case where a distance d between the user U2 and the autonomous mobile body 10 is long, the action planning unit 140 may first plan an action so as to direct only the line-of-sight toward the user.

Whereas, as shown in a middle stage of FIG. 24, in a case where the distance d between the user U2 and the autonomous mobile body 10 is medium, the action planning unit 140 plans an action so as to direct the head toward the user, following the line-of-sight.

Furthermore, as shown in a lower stage of FIG. 24, in a case where the distance d between the user U2 and the autonomous mobile body 10 is short, the action planning unit 140 makes an action plan so as to direct the torso toward the user, following the line-of-sight and the head.

In this way, the action planning unit 140 according to the present embodiment makes it possible to plan a flexible action on the basis of the distance between the user and the autonomous mobile body 10. The function described above provided to the action planning unit 140 enables actions such as, while suppressing power consumption by firstly moving only the line-of-sight, operating the actuator 570 in accordance with a degree of approach of the user thereafter, which makes it possible to efficiently reduce the power consumption while showing a certain reaction to the user.

Note that the action planning unit 140 according to the present embodiment may make the action plan as described above on the basis of a strength of the user's request. After directing the line-of-sight, the action planning unit 140 may plan an action for directing the head and the torso in a case where the user continues to call on the autonomous mobile body 10 or approaches the autonomous mobile body 10.

Furthermore, the action planning unit 140 according to the present embodiment may make an action plan on the basis of a psychological distance from the user, in addition to a physical distance from the user. For example, the action planning unit 140 can plan actions such as running up to the user even in a case of being called from a distance when the usage is sufficiently continued, while just directing the line-of-sight in a case of being called from a distance shortly after the user uses the autonomous mobile body 10.

Furthermore, in addition to the action plan described above, the action planning unit 140 according to the present embodiment can plan various actions based on a change in a surrounding environmental state and a user's state. For example, the action planning unit 140 according to the present embodiment can make a flexible action plan on the basis of a detected change in an illumination environment, and the like.

Figure 25:
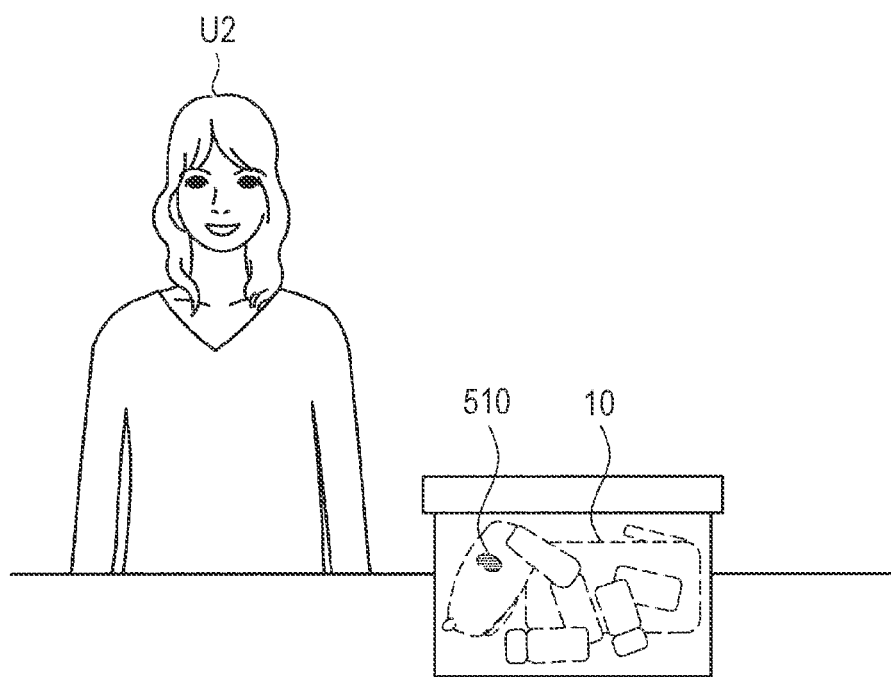
FIG. 25 is a view illustrating an example of an action plan based on a change in an environmental state according to the embodiment.
Figure 26:
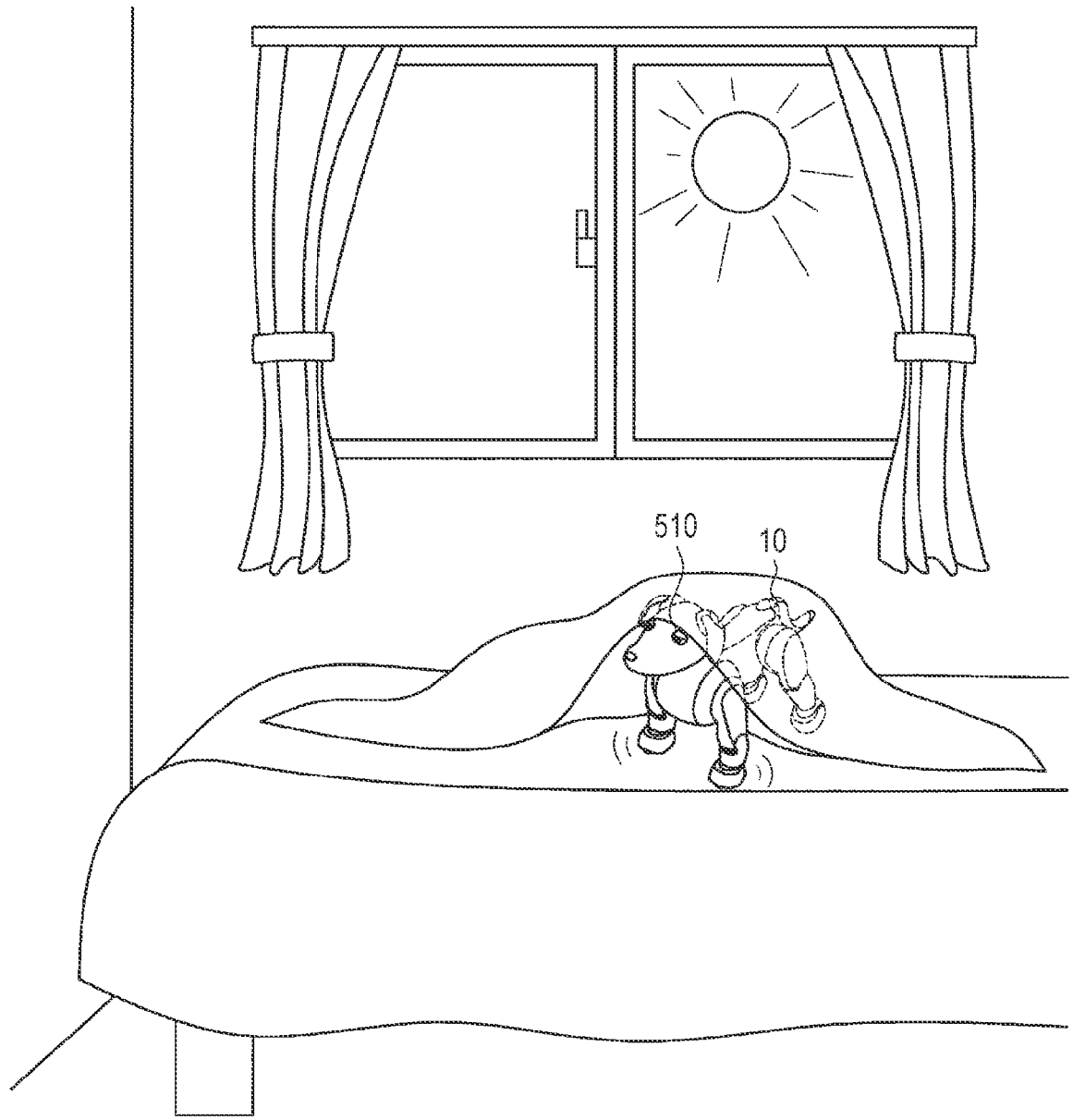
FIG. 26 is a view illustrating an example of an action plan based on a change in an environmental state according to the embodiment.
Figure 27:
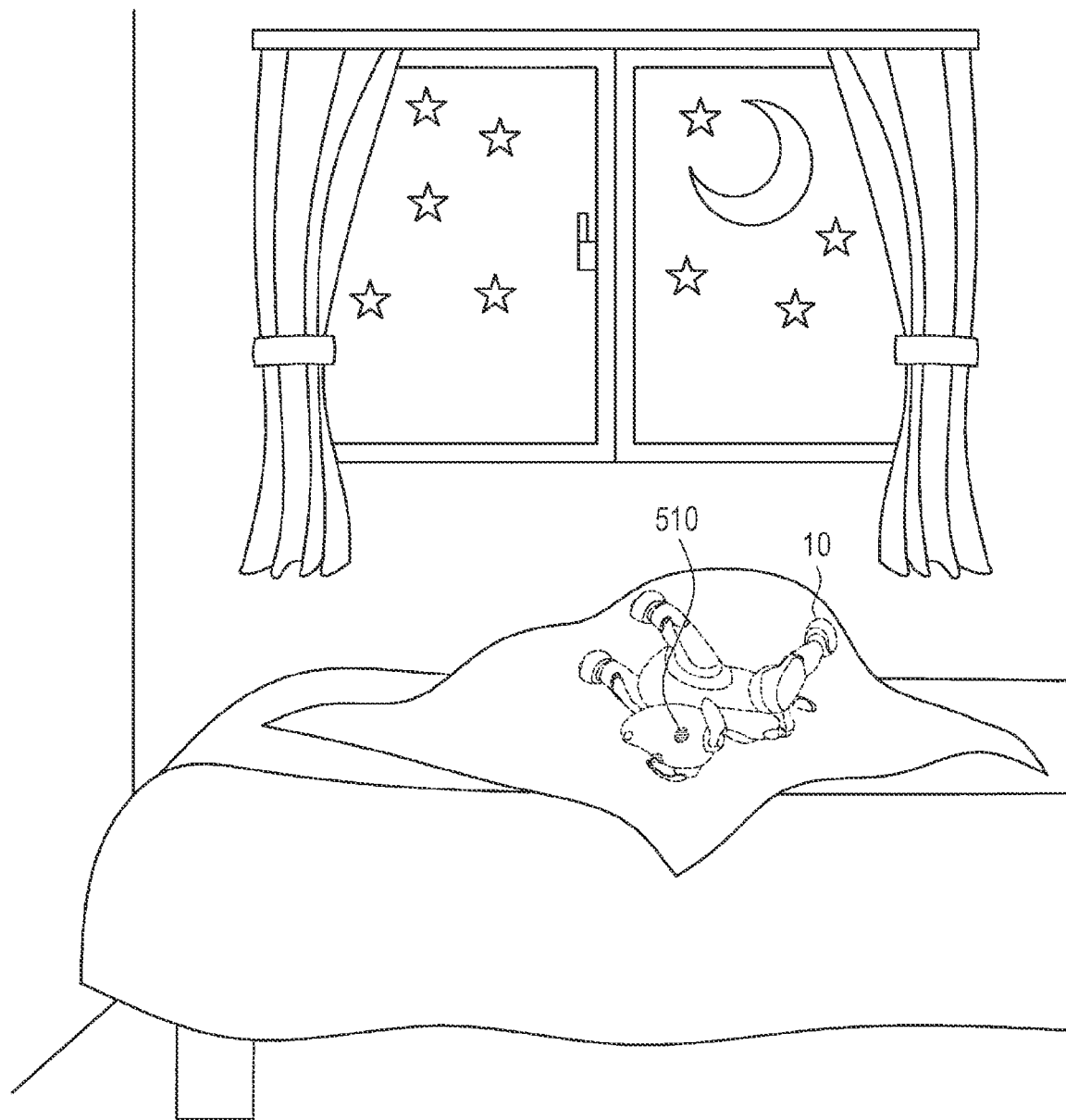
FIG. 27 is a view illustrating an example of an action plan based on a change in an environmental state according to the embodiment.

FIGS. 25 to 27 are views illustrating an example of an action plan based on a change in an environmental state, according to the present embodiment. FIG. 25 illustrates the autonomous mobile body 10 accommodated in a box, a carry bag, or the like by the user U2. At this time, the action planning unit 140 according to the present embodiment may plan an action for autonomously turning off the power on the basis of the recognition unit 120 detecting the accommodation of the autonomous mobile body 10 by the user U2.

The function described above provided to the action planning unit 140 makes it possible to satisfy the self-preservation desire related to charging power and function maintenance, and simultaneously satisfy the approval desire by executing an action considering a user's intention.

Note that the recognition unit 120 can recognize the action of accommodating the autonomous mobile body 10 by the user U2 on the basis of, for example, a sudden decrease of the illuminance, restriction on an operation of the actuator 570 by an obstacle, and the like.

Furthermore, in a case where the user U2 accommodates the autonomous mobile body 10 in a tote bag or the like with the head put out, for example, the action planning unit 140 may make an action plan so as not to operate the actuator of the torso or the leg while maintaining output of visual information regarding the eye movement by the display 510, and the movement of the head, the ears, and the mouth.

Furthermore, FIGS. 26 and 27 illustrate an action of the autonomous mobile body 10 when being covered with a blanket or the like by the user. At this time, the action planning unit 140 according to the present embodiment may make an action plan that satisfies at least one of the self-preservation desire or the approval desire on the basis of detection of a sudden change in the illumination environment. Furthermore, at this time, the action planning unit 140 may determine the priority related to the self-preservation desire and the approval desire, on the basis of a surrounding environment and a user's state.

For example, in a case of the example illustrated in FIG. 26, the action planning unit 140 makes an action plan of trying to escape from the blanket on the basis of the fact that it is still an early time for the user to go to bed or user's laughing voice or the like is detected. The action planning unit 140 may plan an action so as to move the autonomous mobile body 10 in a brighter direction.

In this way, the action planning unit 140 according to the present embodiment can realize an action that meets expectations of the user by planning a reaction like a real dog, in a case where the user's prank is estimated from a state including the user's reaction, the surrounding environment, and the like.

Whereas, in a case of the example illustrated in FIG. 27, the action planning unit 140 plans an action of sleeping with the user, on the basis of the fact that it is the time for the user to go to bed, the user wears a nightclothes, and the like. Specifically, the action planning unit 140 may make an action plan for turning off the power after the autonomous mobile body 10 is in a supine state.

In this way, in a case where it is estimated that the user is going to sleep together from the user's state, the surrounding environment, and the like, the action planning unit 140 according to the present embodiment can satisfy both the approval desire and the self-preservation desire by performing an action for suppressing power consumption while meeting user expectations.

Furthermore, the action planning unit 140 according to the present embodiment can also make an action plan based on a control mode of the autonomous mobile body 10, for example. Examples of the control mode described above include, for example, a silent mode and the like in which no sound is outputted.

FIG. 28 is a view for explaining an action plan based on a control mode of the autonomous mobile body 10 according to the present embodiment. A left side of FIG. 28 exemplifies an action of the autonomous mobile body 10 in a case where the control mode of the autonomous mobile body 10 is a normal mode. At this time, the action planning unit 140 according to the present embodiment may plan an action of outputting animal sound and opening a mouth in response to user's call or the like.

Whereas, a right side of FIG. 28 exemplifies an action of the autonomous mobile body 10 in a case where the control mode of the autonomous mobile body 10 is the silent mode. At this time, the action planning unit 140 according to the present embodiment may make an action plan so as not to output animal sound in accordance with the silent mode, and not to open the mouth.

According to the function described above provided to the action planning unit 140 according to the present embodiment, it is possible to realize a more natural movement by closing the mouth when animal sound is not outputted, and can effectively reduce power consumption at the same time, by not opening the mouth.

Furthermore, at this time, the action planning unit 140 may realize a response to the user by planning a change of output of visual information regarding an eye movement by the display 510 and a non-verbal action by the tail, instead of the movement of the mouth.

In this way, the action planning unit 140 according to the present embodiment makes it possible to realize an action that achieves both the self-preservation desire and the approval desire.

Note that the silent mode according to the present embodiment may be set as a part of the action plan of the action planning unit 140, in addition to being set by the user. For example, in a case where it is detected that the user is having a conversation with another person and the like, the action planning unit 140 can autonomously plan transition to the silent mode.

<<3.3. Control Flow>>

Figure 29:
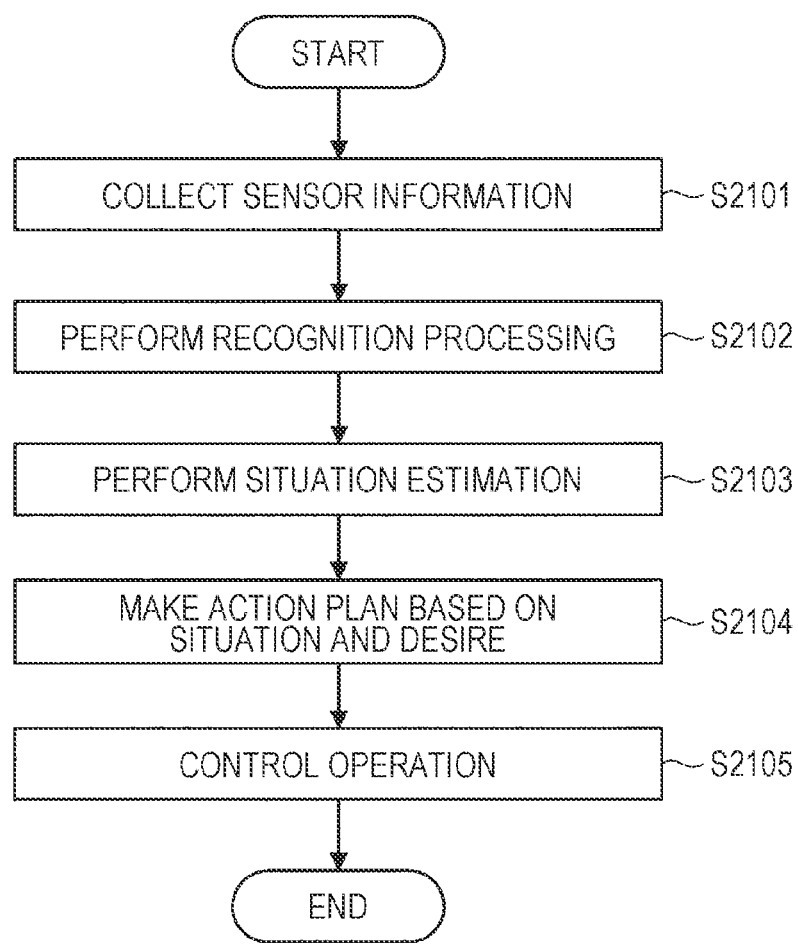
FIG. 29 is a flowchart showing a flow of an action plan according to the embodiment.

Next, a flow of an action plan of the autonomous mobile body 10 according to the present embodiment will be described in detail. FIG. 29 is a flowchart showing a flow of an action plan according to the present embodiment.

Referring to FIG. 29, first, the input unit 110 collects sensor information (S2101).

Next, the recognition unit 120 executes various kinds of recognition processing on the basis of the sensor information collected in step S2101 (S2102).

Furthermore, the recognition unit 120 performs comprehensive situation estimation on the basis of various events recognized in step S2102 (S2103).

Note that the sensor information collection, the recognition processing, and the situation estimation in steps S2101 to 2103 may be executed constantly and continuously.

Next, the action planning unit 140 makes an action plan to be executed by the autonomous mobile body 10, on the basis of the situation estimated in step S2103 and the self-preservation desire and the approval desire (S2104).

Next, on the basis of the action plan determined in step S2104, the operation control unit 150 controls operations of the driving unit 160 and the output unit 170, and the action is executed (S2105).

4. THIRD EMBODIMENT

<<4.1. Overview>>

Next, a third embodiment of the present disclosure will be described. In the first embodiment and the second embodiment described above, the action planning function and the operation control function provided to the autonomous mobile body 10 have been mainly described. Whereas, in the third embodiment of the present disclosure, a description will be given while focusing on functions provided to an information processing server 20.

As described above, an autonomous mobile body 10 according to an embodiment of the present disclosure has a situation estimation function, the action planning function, and the operation control function, and can perform an autonomous action. That is, it can be said that the autonomous mobile body 10 is a device that can perform a movement independently. Whereas, in a case where the autonomous mobile body 10 performs a movement completely independently, learning is performed on the basis only of the movement executed by itself, and it is difficult to share the result of learning with other autonomous mobile bodies 10.

Furthermore, although it is possible to increase actions that may be taken through user's teaching even in a case where the autonomous mobile body 10 performs a movement independently, there is room for further improvement in order to collect more actions that interest a user.

The information processing server 20 according to the present embodiment is conceived focusing on the points described above. The information processing server 20 enables each autonomous mobile body 10 to perform more appropriate actions, by providing collective intelligence based on an action history collected from a plurality of autonomous mobile bodies 10.

For this purpose, the information processing server 20 includes an action recommendation unit 220 configured to present a recommended action recommended to the autonomous mobile body 10, for the autonomous mobile body 10 that performs an action plan based on situation estimation. Furthermore, one feature of the action recommendation unit 220 is to determine the recommended action described above, on the basis of an action history collected from a plurality of autonomous mobile bodies 10 and a situation summary received from the autonomous mobile body 10 that is a target of the recommendation (also referred to as a target autonomous mobile body).

Hereinafter, description will be given in detail to functions provided to the information processing server 20 according to the present embodiment and effects produced by the functions.

<<4.2. Presentation of Recommended Action>>

First, a recommended action presentation function by the action recommendation unit 220 according to the present embodiment will be described. As described above, the autonomous mobile body 10 according to the present embodiment can independently perform an action plan based on situation estimation. However, depending on the situation, there may be a case where reliability related to the action plan is not sufficient or the plan tends to be uniform. These may become factors that deteriorates user's satisfaction and a degree of enthusiasm for the autonomous mobile body 10.

For this reason, the information processing server 20 according to the present embodiment can support the target autonomous mobile body to perform a more appropriate movement, by presenting a recommended action to the target autonomous mobile body on the basis of the action history collected from the plurality of autonomous mobile bodies 10.

Figure 30:
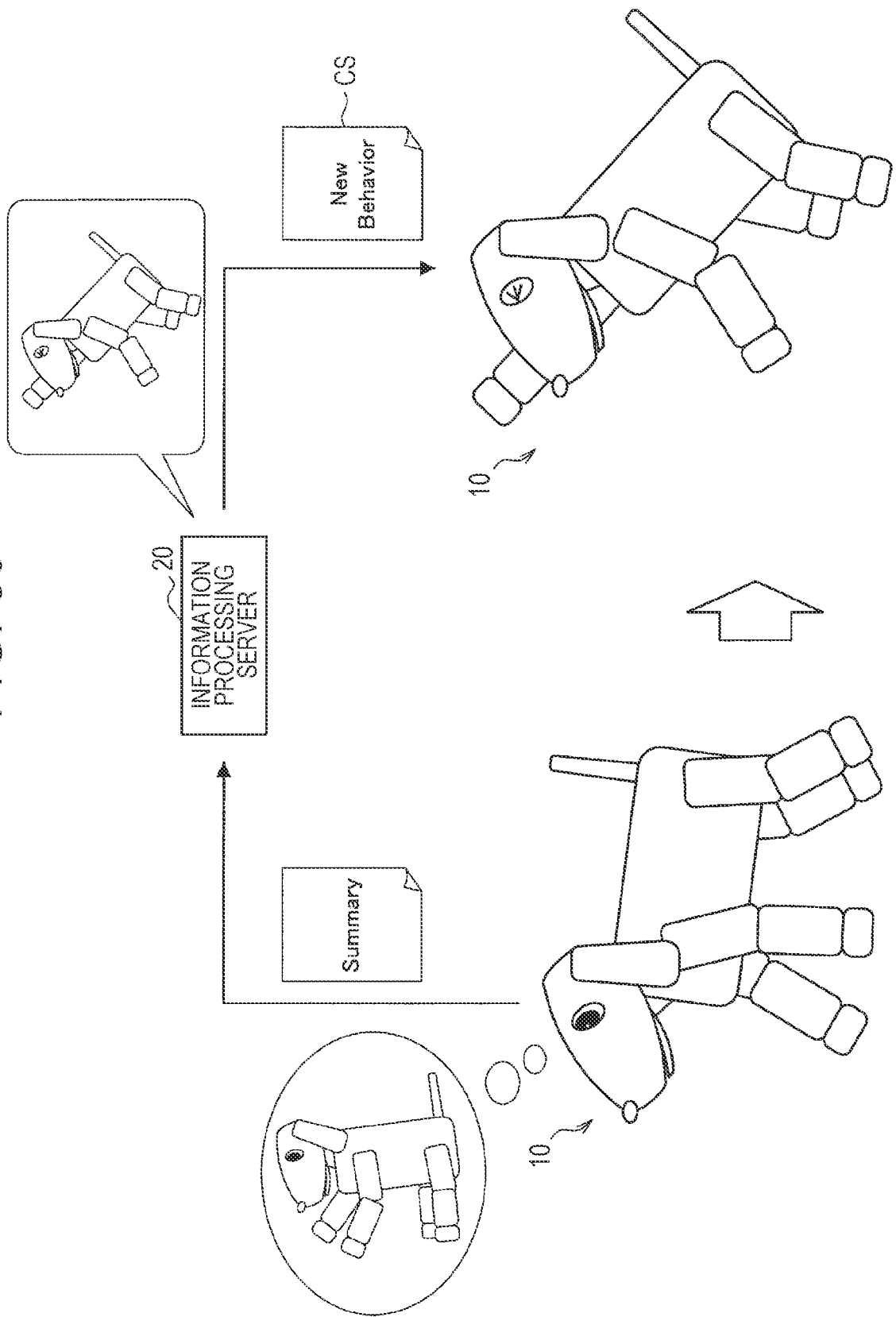
FIG. 30 is a view for explaining presentation of a recommended action according to a third embodiment of the present disclosure.

FIG. 30 is a view for explaining presentation of a recommended action according to the present embodiment. FIG. 30 illustrates the autonomous mobile body 10 as the target autonomous mobile body, and the information processing server 20. Note that FIG. 30 illustrates two autonomous mobile bodies 10 for explanation, but the two autonomous mobile bodies 10 are the same target autonomous mobile body.

A left side of FIG. 30 shows an example of a case where the autonomous mobile body 10 as the target autonomous mobile body performs an action plan independently on the basis of situation estimation. At this time, the autonomous mobile body 10 may plan, for example, a movement indicated by a left balloon in the figure.

Whereas, the action recommendation unit 220 of the information processing server 20 according to the present embodiment can determine a recommended action to be recommended to the target autonomous mobile body, on the basis of summary information (also referred to as a situation summary) related to the situation estimation received from the autonomous mobile body 10 as the target autonomous mobile body, and present the recommended action to the target autonomous mobile body. Note that the recommended action recommended by the action recommendation unit 220 may be a movement indicated by a balloon on the upper right in the figure.

Furthermore, at this time, one feature of the action recommendation unit 220 according to the present embodiment is to provide control sequence data CS for realizing a movement corresponding to the recommended action, to the target autonomous mobile body via a terminal communication unit 250.

In this way, the action recommendation unit 220 according to the present embodiment can present a recommended action and control sequence data related to the recommended action to the target autonomous mobile body, and allows the target autonomous mobile body to execute a new action that is predicted to cause a good user response.

Figure 31:
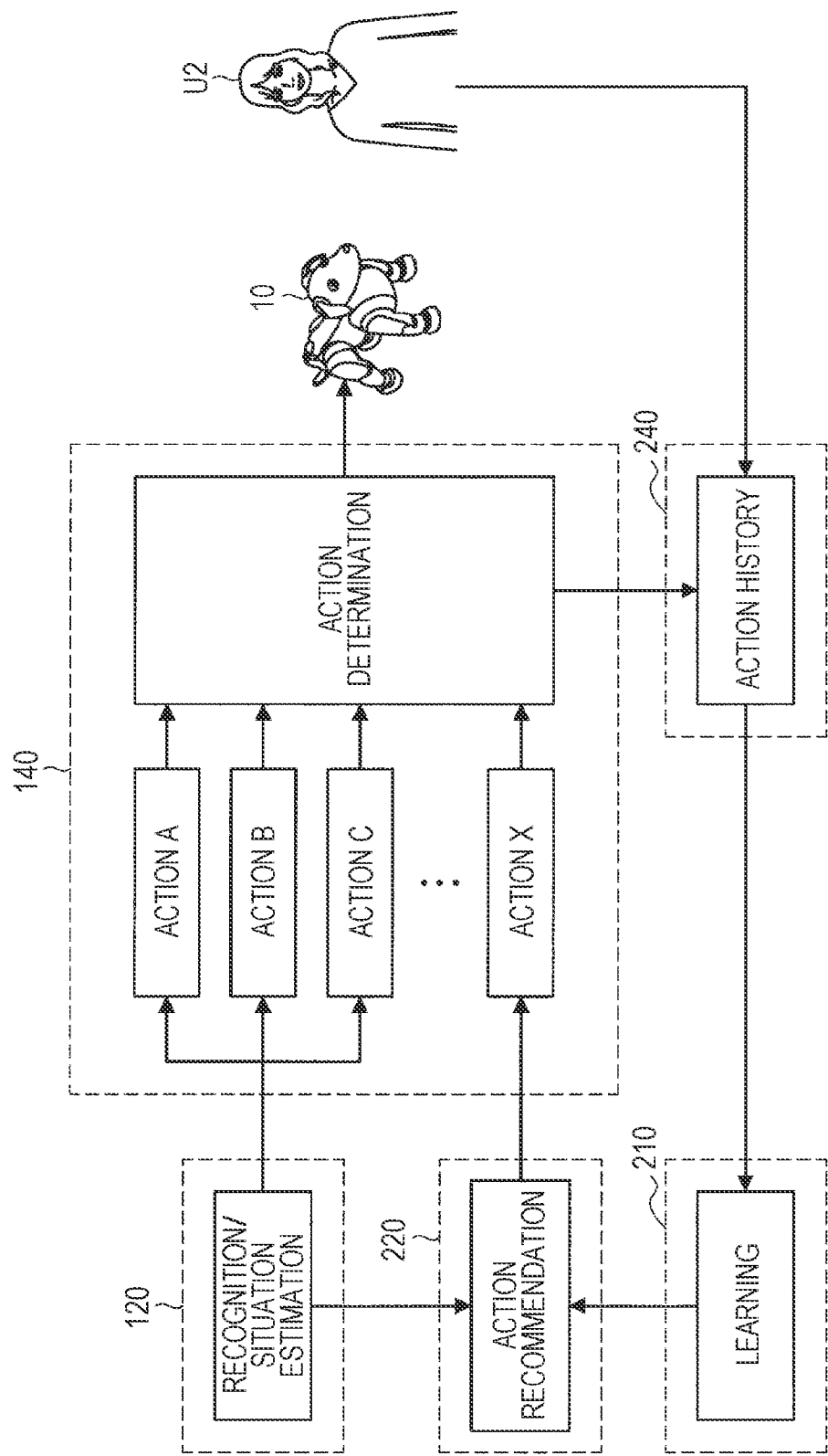
FIG. 31 is a conceptual diagram describing an action plan based on a recommended action according to the embodiment.

Subsequently, description will be given in detail to presentation of the recommended action by the action recommendation unit 220 according to the present embodiment and a flow of the action plan of the autonomous mobile body 10. FIG. 31 is a conceptual diagram describing an action plan based on a recommended action according to the present embodiment.

First, a recognition unit 120 of the autonomous mobile body 10 executes various kinds of recognition and situation estimation on the basis of sensor information collected by an input unit 110. At this time, the recognition unit 120 delivers a situation estimation result to an action planning unit 140, and transmits a situation summary to the action recommendation unit 220 of the information processing server 20.

Next, the action recommendation unit 220 according to the present embodiment uses the situation summary received from the recognition unit 120 and knowledge as collective intelligence that a learning unit 210 has regarding the plurality of autonomous mobile bodies 10, to determine a recommended action and present information regarding the recommended action to the action planning unit 140.

Next, the action planning unit 140 according to the present embodiment determines an action to be actually executed, on the basis of a plurality of action candidates based on the situation estimation by the recognition unit 120, and on the basis of the recommended action recommended by the action recommendation unit 220. At this time, the action planning unit 140 may make a final action determination on the basis of reliability of each action candidate and the like. Thus, the action planning unit 140 according to the present embodiment does not necessarily adopt the recommended action.

Subsequently, the operation control unit 150 controls a driving unit 160 and an output unit 170 on the basis of the action plan determined by the action planning unit 140, to realize a movement by the autonomous mobile body 10.

At this time, the action planning unit 140 associates the situation estimation by the recognition unit 120, the determined action plan, and a reaction (feedback) of a user U2 for the executed movement, and transmits to the information processing server 20.

The information described above is stored as an action history in a storage unit 240 of the information processing server 20, and is used for learning by the learning unit 210. Note that feedback of the user U2 may be stored in a state of being quantified through analysis by an analysis unit 230. The analysis unit 230 can quantify whether the user's reaction is good or bad on the basis of, for example, user's facial expression or utterance.

Thus, the information processing system according to the present embodiment enables effective learning of a movement that further attracts user's interest, through situation estimation, presentation of a recommended action, action plan, operation control, action history correction, and repeated execution.

Note that, in the present embodiment, the action recommendation unit 220 may present the recommended action on the basis of, for example, a degree of user's enthusiasm for the target autonomous mobile body. FIG. 32 is a view for explaining presentation of a recommended action based on a degree of user's enthusiasm according to the present embodiment.

FIG. 32 illustrates the user U2 with a lowered degree of enthusiasm for the autonomous mobile body 10 that is the target autonomous mobile body. At this time, the action recommendation unit 220 according to the present embodiment may present a recommended action and provide the control sequence data CS to the autonomous mobile body 10, on the basis of the analysis unit 230 having analyzed that the degree of enthusiasm of the user U2 has decreased.

Note that, for example, the analysis unit 230 can analyze the degree of enthusiasm described above on the basis of the feedback of the user U2 to the movement executed by the autonomous mobile body 10, the number of contacts to the autonomous mobile body 10 by the user U2, the number of calls, an activation time of the autonomous mobile body 10, and the like.

Furthermore, the degree of enthusiasm may be analyzed by the autonomous mobile body 10. In this case, the autonomous mobile body 10 requests the information processing server 20 for a recommended action, on the basis of the fact that the degree of user's enthusiasm is decreasing. Furthermore, the action recommendation unit 220 can present the recommended action to the autonomous mobile body 10 on the basis of a situation request.

According to the function described above provided to the information processing server 20 and the autonomous mobile body 10 according to the present embodiment, it is possible to efficiently increase new actions that may be executed by the autonomous mobile body 10, and to prevent a decrease of a degree of user's enthusiasm.

Figure 33:
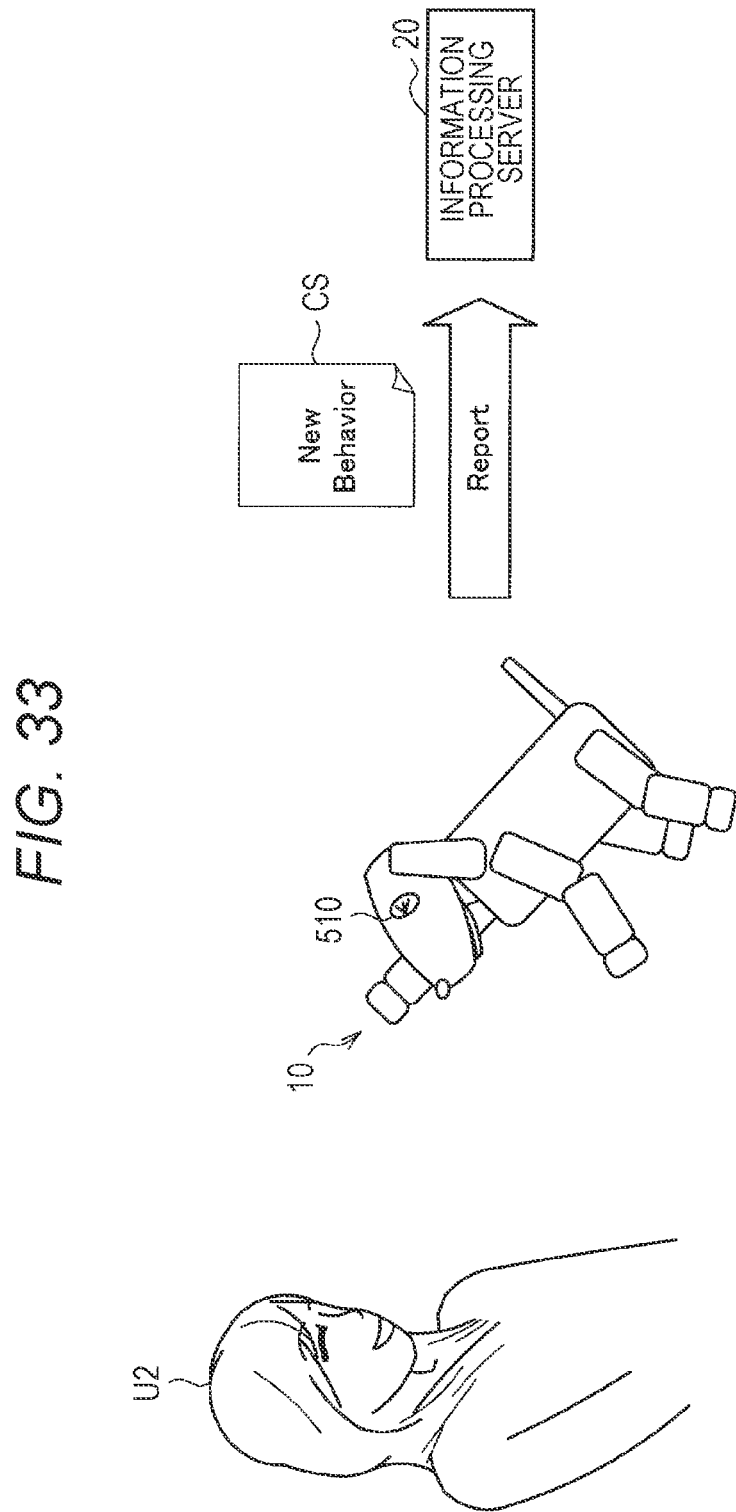
FIG. 33 is a view for explaining collection of control sequence data according to the embodiment.

Next, a mechanism in which the action recommendation unit 220 according to the present embodiment collects control sequence data from a plurality of autonomous mobile bodies 10 will be described. FIG. 33 is a view for explaining collection of control sequence data according to the present embodiment.

FIG. 33 illustrates the autonomous mobile body 10 that executes a movement and the user U2 that performs positive feedback on the movement. Thus, in a case where user's feedback on the executed movement is positive, the autonomous mobile body 10 may transmit the situation summary, the control sequence data CS relating to the executed movement, and the user's feedback, to the information processing server 20 as an action history.

As described above, the action recommendation unit 220 according to the present embodiment can efficiently collect control sequence data corresponding to a movement for which the user has shown positive feedback, from the plurality of autonomous mobile bodies 10. According to the mechanism described above, control sequence data collected from another autonomous mobile body 10 can be provided to the target autonomous mobile body, and the movement assumed to be effective for the user can be shared among the plurality of autonomous mobile bodies 10.

Furthermore, download and upload of the control sequence data according to the present embodiment can be optionally performed by the user via a client application, for example. At this time, the user may be able to limit a range for disclosing the control sequence data, for example, to a group such as friends or a workplace. This function makes it possible to spread and share favorite movements within the group, and an effect of promoting communication between users is also expected.

Figure 34:
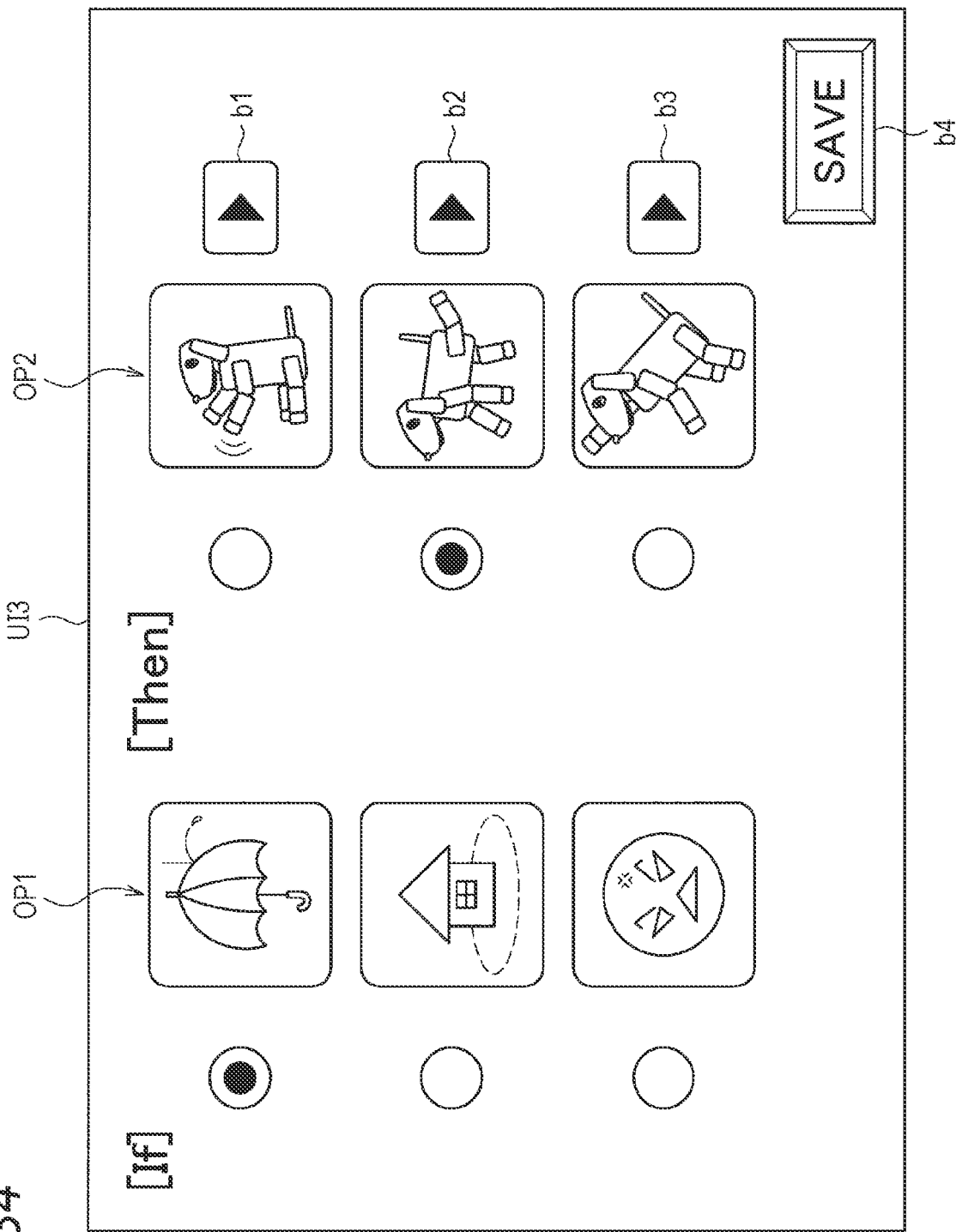
FIG. 34 is a view illustrating an example of a user interface of a client application according to the embodiment.

Furthermore, together with the download described above, the user can also set an incentive situation described in the first embodiment via the client application. FIG. 34 is a view illustrating an example of a user interface of the client application according to the present embodiment.

FIG. 34 illustrates a user interface UI3 that enables setting of an incentive situation and downloading of control sequence data. For example, in the user interface UI3, the user may be able to respectively select an incentive situation and a corresponding movement from options OP1 and OP2.

In a case of the example illustrated in FIG. 34, the user can select an incentive situation such as "when it rains", "when the user returns home", or "when the autonomous mobile body 10 is in a bad mood" from the option OP1. Note that, as for the incentive situation, for example, a field and the like for specifying a more detailed situation may be provided.

Furthermore, the user can specify any given movement to be associated with the incentive situation from the option OP2. At this time, the user may be able to check a preview of the movement by pressing buttons b1 to b3, for example. The user can download control sequence data of the movement associated with the incentive condition to the autonomous mobile body 10, by selecting any given movement and pressing a button b4 while checking the movement preview.

<<4.3. Additional Registration to Recognition Dictionary>>

Next, description will be given to an additional registration function for a recognition dictionary included in the action recommendation unit 220 according to the present embodiment. The action recommendation unit 220 according to the present embodiment may have an additional registration function for new data for an object recognition dictionary and a voice recognition dictionary included in the autonomous mobile body 10, in addition to presentation of the recommended action to the autonomous mobile body 10.

Figure 35:
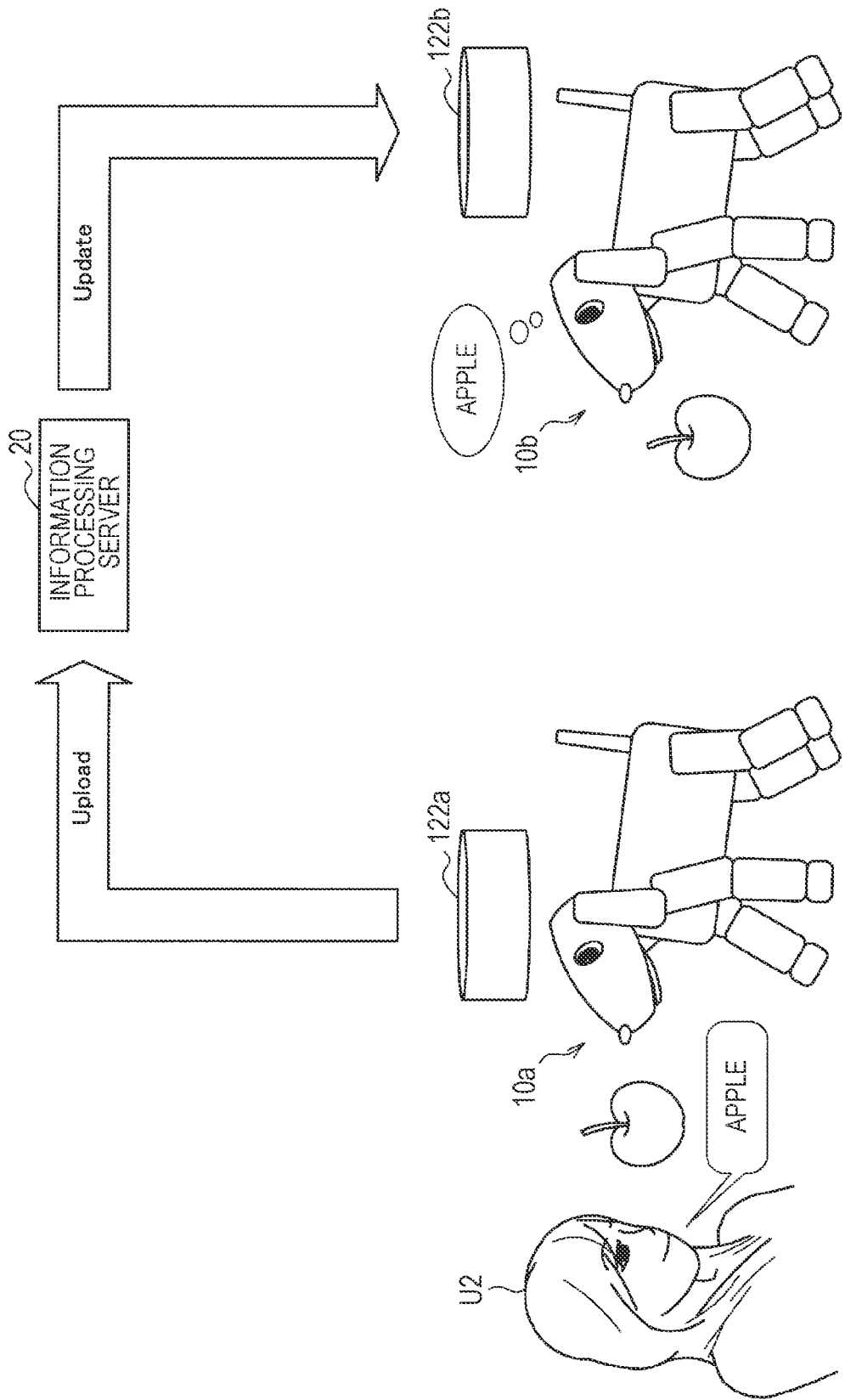
FIG. 35 is a view for explaining additional registration to an object recognition dictionary according to the embodiment.

FIG. 35 is a view for explaining additional registration to the object recognition dictionary according to the present embodiment. A left side of FIG. 35 shows the user U2 who causes the autonomous mobile body 10 to newly learn object recognition related to an apple.

In a case where a voice recognition result and image data related to "apple" are associated and registered in an object recognition dictionary 122a included in the autonomous mobile body 10 by the action described above, the action recommendation unit 220 according to the present embodiment may collect data newly registered in the object recognition dictionary 122a, and may additionally register the data in an object recognition dictionary 122b of the autonomous mobile body 10b as the target autonomous mobile body.

According to the function described above provided to the action recommendation unit 220 according to the present embodiment, it is possible to efficiently enrich the contents of the object recognition dictionary 122 included in the autonomous mobile body 10, and to improve generalization performance related to object recognition.

Figure 36:
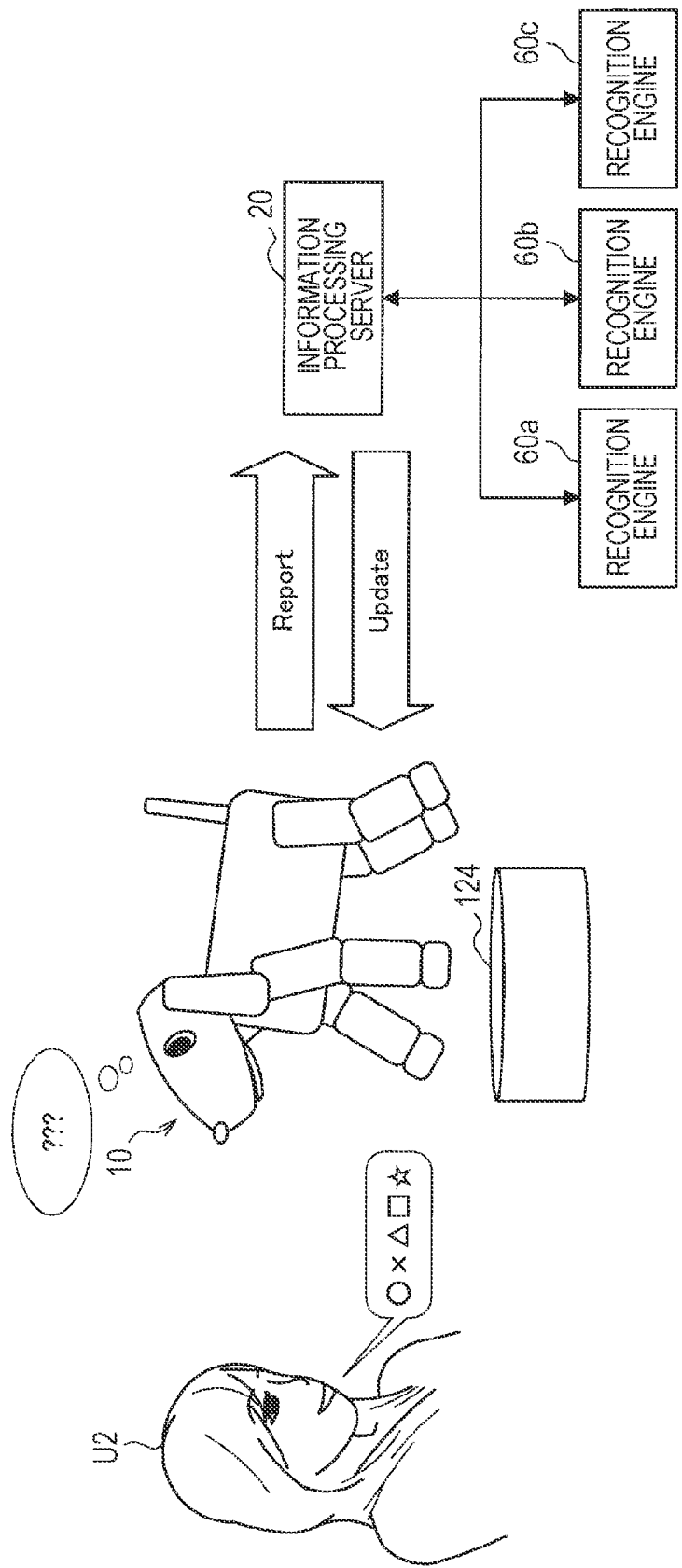
FIG. 36 is a view for explaining additional registration to a voice recognition dictionary according to the embodiment.

Furthermore, FIG. 36 is a view for explaining additional registration to the voice recognition dictionary according to the present embodiment. A left side of FIG. 36 shows the autonomous mobile body 10 that has failed in voice recognition of utterance made by the user U2. At this time, the action recommendation unit 220 according to the present embodiment collects a recognition failure log related to the utterance made by the user U2, from the autonomous mobile body 10. Note that the recognition failure log includes voice data including the utterance of the user U2.

Subsequently, the action recommendation unit 220 causes plurality of recognition engines 60a to 60c to recognize user's utterance voice included in the collected recognition failure log, and acquires a recognition result. Here, in a case where plausible data is obtained from a plurality of acquired recognition results, the action recommendation unit 220 may additionally register the data into the voice recognition dictionary 124 included in the autonomous mobile body 10.

According to the function described above provided to the action recommendation unit 220 according to the present embodiment, it is possible to efficiently enrich the contents of the voice recognition dictionary 124 included in the autonomous mobile body 10, and to improve generalization performance related to object recognition.

<<4.4. Maintenance Recommendation>>

Next, a maintenance recommendation function provided to the action recommendation unit 220 according to the present embodiment will be described. The action recommendation unit 220 according to the present embodiment may have a recommendation function related to maintenance of the autonomous mobile body 10, in addition to the presentation of a recommended action to the autonomous mobile body 10.

Figure 37:
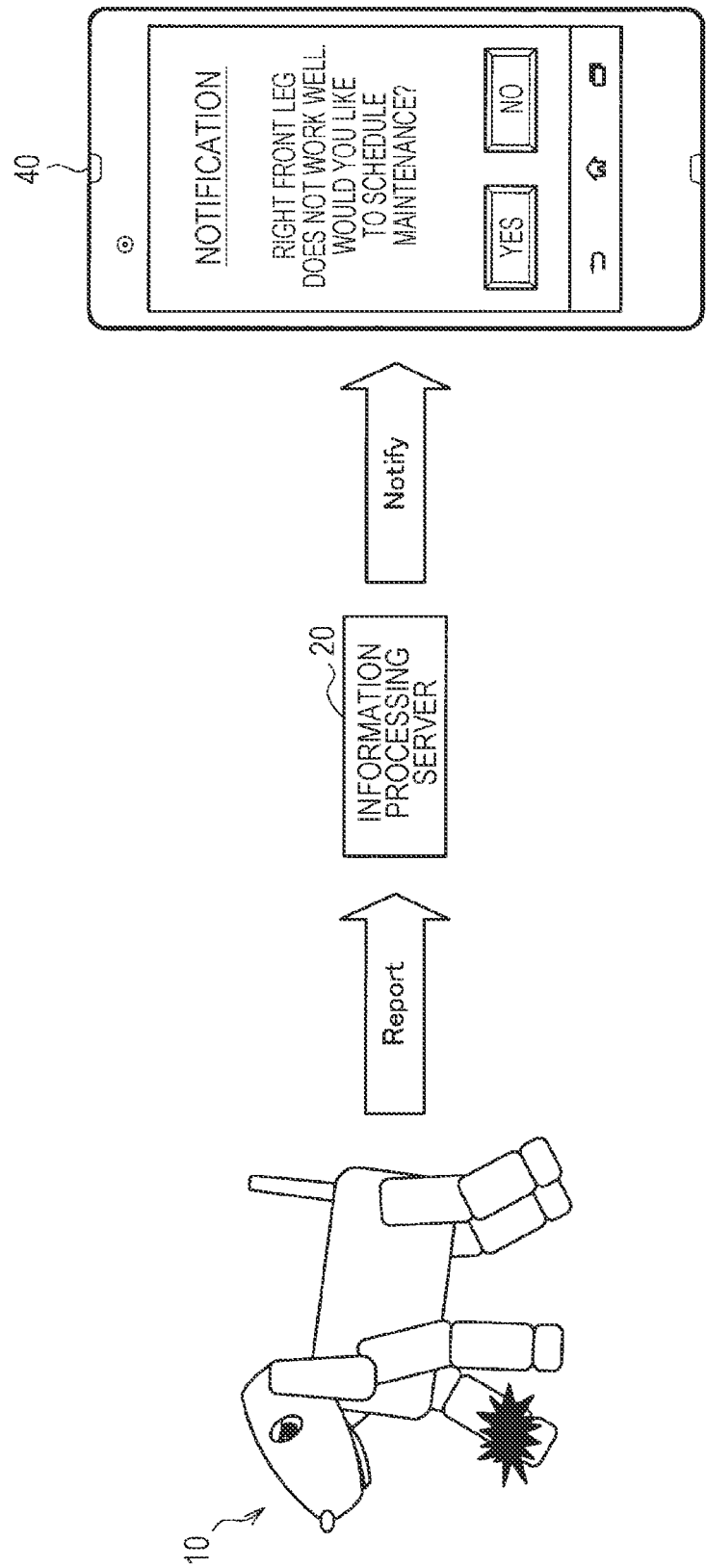
FIG. 37 is a view for explaining a maintenance recommendation function according to the embodiment.

FIG. 37 is a view for explaining the maintenance recommendation function according to the present embodiment. A left side of FIG. 37 shows the autonomous mobile body 10 in which a malfunction has occurred in an actuator 570 of the right front leg. At this time, the action recommendation unit 220 according to the present embodiment can transmit a notification for recommending maintenance to the user, on the basis of an analysis result of an operation state of the autonomous mobile body 10 by the analysis unit 230.

For example, on the basis of information regarding an operation state of a component part such as the actuator 570 received from the autonomous mobile body 10, the analysis unit 230 can detect or predict deterioration or a malfunction of the component part. Here, examples of the information regarding the operation state described above include, for example, an action failure log related to the component part in addition to an accumulated operation count and an accumulated operation time. The action failure log described above includes a log such as an error notification that is outputted when a component part does not operate as controlled by the operation control unit 150.

For example, in a case where a malfunction and the like of the component part is estimated from the action failure log, the action recommendation unit 220 according to the present embodiment may transmit a notification for recommending maintenance of the component part to an information processing terminal 40 owned by the user. Furthermore, the action recommendation unit 220 may transmit the notification described above via the client application as described above.

Furthermore, the action recommendation unit 220 according to the present embodiment can also automatically place an order and the like for a component part in a case where a malfunction of the component part is detected or predicted.

Thus, the action recommendation unit 220 and the analysis unit 230 according to the present embodiment make it possible to detect a malfunction of a component part of the autonomous mobile body 10 at an early stage, and use the autonomous mobile body 10 in a safe state for a long period of time.

<<4.5. Control Flow>>

Figure 38:
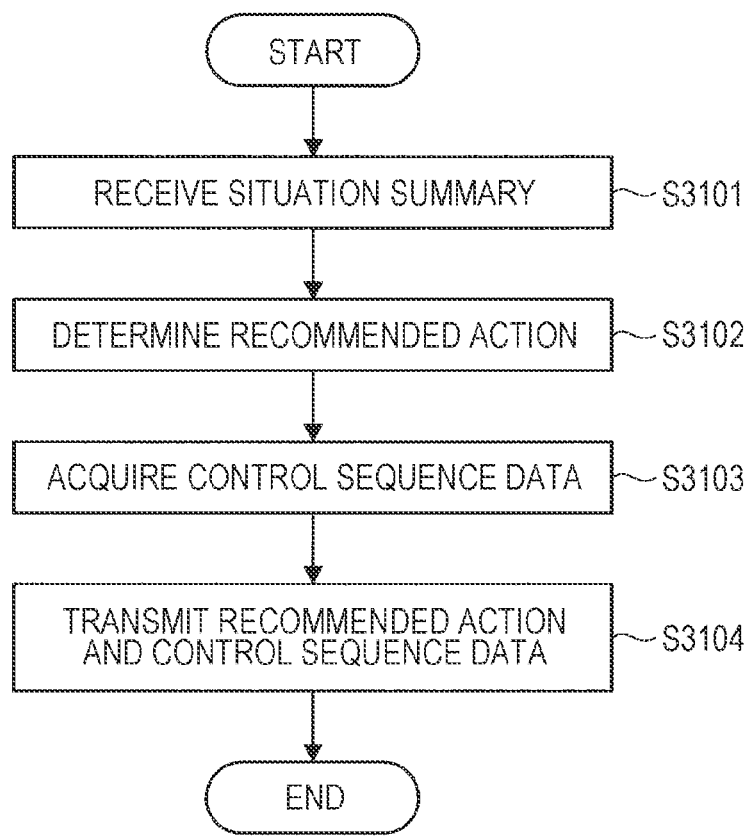
FIG. 38 is a flowchart showing a flow of presentation of a recommended action by an information processing server according to the embodiment.

Next, a flow of presentation of a recommended action by the information processing server 20 according to the present embodiment will be described in detail. FIG. 38 is a flowchart showing a flow of presentation of a recommended action by the information processing server 20 according to the present embodiment.

Referring to FIG. 38, first, the terminal communication unit 250 receives a situation summary from the target autonomous mobile body (S3101).

Next, the action recommendation unit 220 determines a recommended action on the basis of the situation summary received in step S3101 and knowledge as collective intelligence that the learning unit 210 has (S3102).

Subsequently, the action recommendation unit 220 acquires control sequence data corresponding to the recommended action determined in step S3102, from the storage unit 240 (S3103).

Subsequently, the action recommendation unit 220 transmits information regarding the recommended action determined in step S3102 and the control sequence data acquired in step S3103, to the target autonomous mobile body via the terminal communication unit 250 (S3104).

5. HARDWARE CONFIGURATION EXAMPLE

Figure 39:
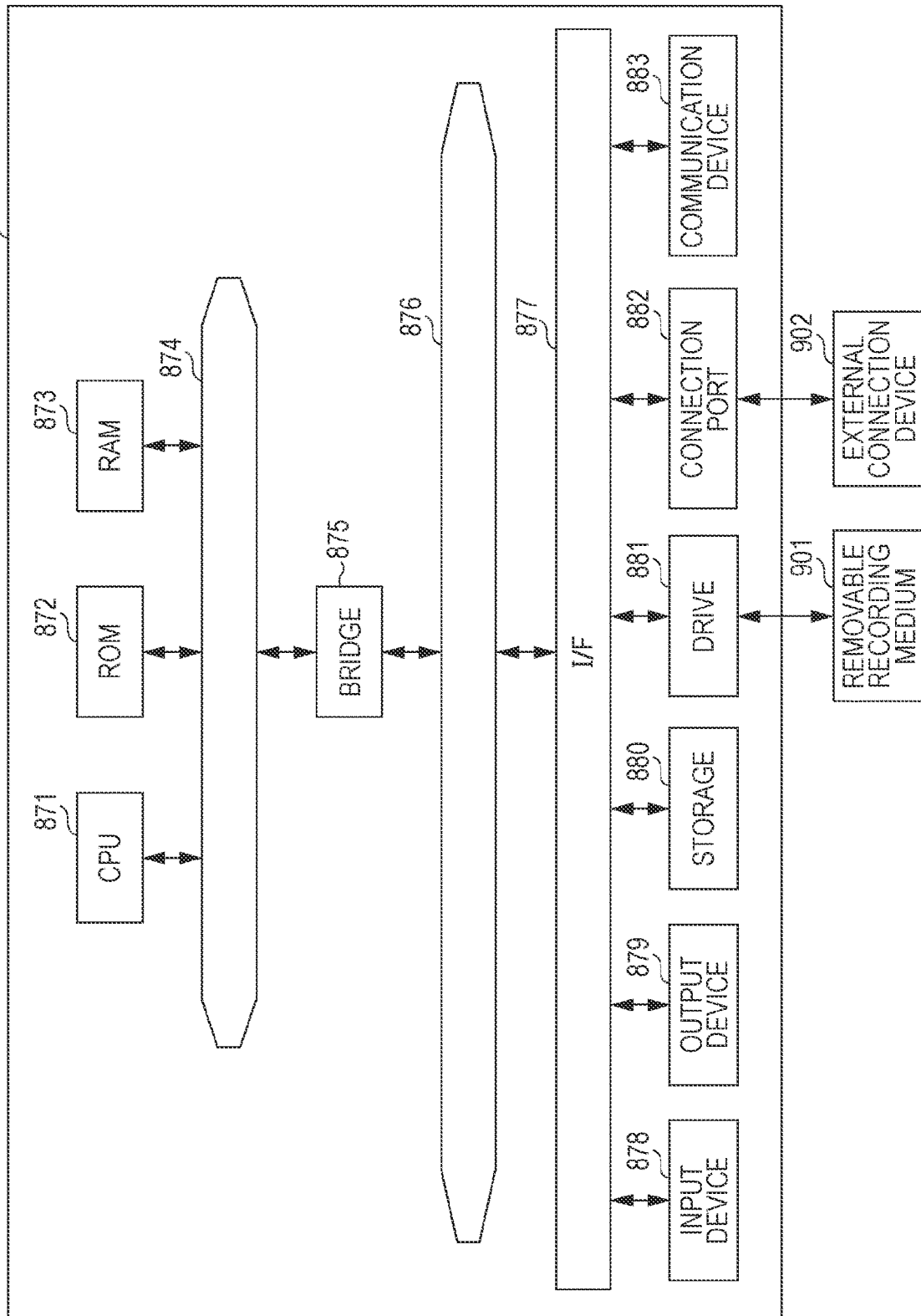
FIG. 39 is a diagram illustrating a hardware configuration example of an information processing server according to an embodiment of the present disclosure.

Next, a hardware configuration example of the information processing server 20 according to an embodiment of the present disclosure will be described. FIG. 39 is a block diagram illustrating a hardware configuration example of the information processing server 20 according to an embodiment of the present disclosure. Referring to FIG. 39, the information processing server 20 includes, for example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the components may be omitted. Furthermore, components other than the components illustrated here may be further included.

(CPU871)

The CPU 871 functions as, for example, an arithmetic processing device or a control device, and controls the all of or a part of an operation of each component on the basis of various programs recorded in the ROM 872, RAM 873, the storage 880, or a removable recording medium 901.

(ROM872, RAM873)

The ROM 872 is means that stores a program to be read by the CPU 871, data to be used for calculation, and the like. The RAM 873 temporarily or permanently stores, for example, a program to be read into the CPU 871 and various parameters that change as appropriate when the program is executed, and the like.

(Host Bus 874, Bridge 875, External Bus 876, Interface 877)

The CPU 871, the ROM 872, and the RAM 873 are connected to each other via, for example, the host bus 874 capable of high-speed data transmission. Whereas, the host bus 874 is connected to the external bus 876 having a relatively low data transmission speed via the bridge 875, for example. Furthermore, the external bus 876 is connected to various components via the interface 877.

(Input Device 878)

As the input device 878, for example, a mouse, a keyboard, a touch panel, a button, a switch, a lever, and the like are used. Moreover, as the input device 878, a remote controller capable of transmitting a control signal (hereinafter referred to as a remote controller) by using infrared rays or other radio waves may be used. Furthermore, the input device 878 includes a voice input device such as a microphone.

(Output Device 879)

The output device 879 is, for example, a device capable of visually or audibly notifying a user of acquired information, such as a display device such as a cathode ray tube (CRT), an LCD, or an organic EL, an audio output device such as a speaker or a headphone, a printer, a mobile phone, or a facsimile. Furthermore, the output device 879 according to the present disclosure includes various vibration devices that can output a tactile stimulus.

(Storage 880)

The storage 880 is a device to store various data. As the storage 880, for example, there is used a magnetic storage device such as a hard disk drive (HDD), a semiconductor storage device, an optical storage device, a magneto-optical storage device, or the like.

(Drive 881)

The drive 881 is a device that reads information recorded on the removable recording medium 901 such as a magnetic disk, an optical disk, a magneto-optical disk, or a semiconductor memory, for example, or writes information to the removable recording medium 901.

(Removable Recording Medium 901)

The removable recording medium 901 is, for example, DVD media, Blu-ray (registered trademark) media, HD DVD media, various semiconductor storage media, and the like. Of course, the removable recording medium 901 may be, for example, an IC card mounted with a non-contact IC chip, an electronic device, or the like.

(Connection Port 882)

For example, the connection port 882 is a port to connect an external connection device 902 such as a universal serial bus (USB) port, an IEEE1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device to connect to a network, and for example, a communication card for wired or wireless LAN, Bluetooth (registered trademark) or wireless USB (WUSB), a router for optical communication, a router for asymmetric digital subscriber line (ADSL), a modem for various communications, or the like.

6. CONCLUSION

As described above, one feature of the autonomous mobile body 10 according to an embodiment of the present disclosure is to generate, on the basis of the teaching movement, control sequence data for executing an autonomous movement corresponding to the teaching movement. Furthermore, the autonomous mobile body 10 according to an embodiment of the present disclosure can execute an autonomous movement corresponding to the control sequence data described above on the basis of an action plan determined by situation estimation. According to this configuration, a movement pattern of the autonomous mobile body can be increased more easily.

The preferred embodiments of the present disclosure have been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Furthermore, the individual steps related to the processing of the autonomous mobile body 10 and the information processing server 20 in the present disclosure are not necessarily processed in time series in the order described in the flowchart. For example, the individual steps related to the processing of the autonomous mobile body 10 and the information processing server 20 may be processed in an order different from the order described in the flowchart, or may be processed in parallel.

Note that the following configurations are also within the technical scope of the present disclosure.

(1)

An information processing apparatus including: an operation control unit configured to control an operation of a driving unit, in which the operation control unit generates, on the basis of a teaching movement, control sequence data for causing a driving unit of an autonomous mobile body to execute an autonomous movement corresponding to the teaching movement, and causes the driving unit to execute the autonomous movement corresponding to the control sequence data, on the basis of an action plan determined by situation estimation.

(2)

The information processing apparatus according to (1), in which the driving unit includes a plurality of joint parts, and the operation control unit generates the control sequence data including at least information regarding a change in a rotational position of each of the joint parts in time series, on the basis of the teaching movement.

(3)

The information processing apparatus according to (2), in which the teaching movement includes a physical bending and stretching movement of each of the joint parts by a user, and the operation control unit generates the control sequence data on the basis of the physical bending and stretching movement.

(4)

The information processing apparatus according to (2) or (3), in which the operation control unit generates the control sequence data in which a change in the rotational position is recorded in time series, on the basis of the rotational position of each of the joint parts detected by a rotational position sensor.

(5)

The information processing apparatus according to any one of (2) to (4), in which the operation control unit causes the driving unit to execute a relaxation operation related to each of the joint parts in accordance with a start of a physical bending and stretching movement of each of the joint parts by a user.

(6)

The information processing apparatus according to (5), in which the operation control unit controls a resistance coefficient for a rotational motion of an actuator included in each of the joint parts, and causes the driving unit to execute the relaxation operation.

(7)

The information processing apparatus according to any one of (2) to (6), in which the teaching movement includes a motion of a mobile body having a joint, and the operation control unit generates the control sequence data on the basis of an imaged motion of the mobile body.

(8)

The information processing apparatus according to (7), in which on the basis of an estimated position of a joint of the mobile body, the operation control unit acquires each of the joint parts of the driving unit corresponding to the joint, and generates the control sequence data.

(9)

The information processing apparatus according to (8), in which the operation control unit generates, on the basis of magnitude of a bending and stretching motion related to the joint of the mobile body, the control sequence data in which a rotational position of each of the joint parts of the driving unit corresponding to the joint is recorded.

(10)

The information processing apparatus according to (8) or (9), in which the operation control unit dynamically trims a part of a bending and stretching motion related to the joint of the mobile body, and generates the control sequence data in which a rotational position of each of the joint parts of the driving unit is recorded.

(11)

The information processing apparatus according to (10), in which in a case where a bending and stretching motion related to the joint of the mobile body exceeds a range of motion of each of the joint parts corresponding to the joint, the operation control unit dynamically trims a part of the bending and stretching motion exceeding the range of motion.

(12)

The information processing apparatus according to any one of (7) to (11), in which the operation control unit generates the control sequence data based on a motion of the mobile body regardless of presence or absence of an explicit instruction from a user.

(13)

The information processing apparatus according to any one of (1) to (12), in which
the operation control unit associates and stores the generated control sequence data and an incentive situation that induces an autonomous movement corresponding to the control sequence data.

(14)

The information processing apparatus according to (13), in which
the incentive situation is estimated on the basis of collected sensor information.

(15)

The information processing apparatus according to any one of (1) to (14), in which
the operation control unit generates the control sequence data including position information of the autonomous mobile body.

(16)

The information processing apparatus according to (15), in which
the operation control unit generates the control sequence data including relative position information regarding a plurality of the autonomous mobile bodies.

(17)

The information processing apparatus according to any one of (1) to (16), further including:
an action planning unit configured to make an action plan based on situation estimation.

(18)

The information processing apparatus according to any one of (1) to (17), in which
the information processing apparatus is an autonomous mobile body including the driving unit.

(19)

An information processing method including:
controlling, by a processor, an operation of a driving unit, in which
the controlling further includes
generating, on the basis of a teaching movement, control sequence data for causing a driving unit of an autonomous mobile body to execute an autonomous movement corresponding to the teaching movement; and
causing the driving unit to execute the autonomous movement according to the control sequence data, on the basis of an action plan determined by situation estimation.

(20)

A program for causing a computer to function as
an information processing apparatus including:
an operation control unit configured to control an operation of a driving unit, in which
the operation control unit generates, on the basis of a teaching movement, control sequence data for causing a driving unit of an autonomous mobile body to execute an autonomous movement corresponding to the teaching movement, and
causes the driving unit to execute the autonomous movement according to the control sequence data, on the basis of an action plan determined by situation estimation

REFERENCE SIGNS LIST

10 Autonomous mobile body
110 Input unit
120 Recognition unit
130 Learning unit
140 Action planning unit
150 Operation control unit
160 Driving unit
170 Output unit
510 Display
570 Actuator
20 Information processing server
210 Learning unit
220 Action recommendation unit
230 Analysis unit
240 Storage unit

The invention claimed is:

1. An information processing apparatus comprising: circuitry configured to
control an operation of a driving unit of an autonomous mobile body,
generate, on a basis of a teaching movement, control sequence data for causing the driving unit of the autonomous mobile body to execute an autonomous movement corresponding to the teaching movement, wherein the teaching movement includes at least one of a movement using the operation the driving unit and visual information by a display unit of the autonomous mobile body,
cause the driving unit to execute the autonomous movement corresponding to the control sequence data, on a basis of an action plan determined by situation estimation, and
transmit the control sequence data to another information processing apparatus different than the information processing apparatus,
wherein the control sequence data includes information including at least one of control signals related to time-series changes of the autonomous movement and sound input.

2. The information processing apparatus according to claim 1, wherein
the autonomous mobile body includes a plurality of joint parts, and
the circuitry is further configured to generate the control sequence data including at least information regarding a change in a rotational position of each joint part of the plurality of joint parts in time series, on a basis of the teaching movement.

3. The information processing apparatus according to claim 2, wherein
the teaching movement includes a physical bending and stretching movement of each joint part of the plurality of joint parts by a user, and
the circuitry is further configured to generate the control sequence data on a basis of the physical bending and stretching movement.

4. The information processing apparatus according to claim 2, wherein
the circuitry is further configured to generate the control sequence data in which a change in the rotational position is recorded in time series on a basis of the rotational position of each joint part of the plurality of joint parts detected by a rotational position sensor.

5. The information processing apparatus according to claim 2, wherein
the teaching movement includes a motion of a mobile body having a joint, and
the circuitry is further configured to generate the control sequence data on a basis of an imaged motion of the mobile body.

6. The information processing apparatus according to claim 5, wherein
on a basis of an estimated position of a joint of the mobile body, the circuitry is further configured to acquire each joint part of the plurality of joint parts of the driving unit corresponding to the joint, and generate the control sequence data.

7. The information processing apparatus according to claim 6, wherein
the circuitry is further configured to generate, on a basis of magnitude of a bending and stretching motion related to the joint of the mobile body, the control sequence data in which a rotational position of each joint part of the plurality of joint parts of the driving unit corresponding to the joint is recorded.

8. The information processing apparatus according to claim 6, wherein
the circuitry is further configured to dynamically trim a part of a bending and stretching motion related to the joint of the mobile body, and generate the control sequence data in which a rotational position of each joint part of the plurality of joint parts of the driving unit is recorded.

9. The information processing apparatus according to claim 8, wherein
in a case where a bending and stretching motion related to the joint of the mobile body exceeds a range of motion of each joint part of the plurality of joint parts corresponding to the joint, the circuitry is further configured to dynamically trim a part of the bending and stretching motion exceeding the range of motion.

10. The information processing apparatus according to claim 5, wherein
the circuitry is further configured to generate the control sequence data based on a motion of the mobile body regardless of presence or absence of an explicit instruction from a user.

11. The information processing apparatus according to claim 1, wherein
the autonomous mobile body includes a plurality of joint parts, and
the circuitry is further configured to
cause the driving unit to execute a relaxation operation related to each joint part of the plurality of joint parts in accordance with a start of a physical bending and stretching movement of each joint part of the plurality of joint parts by a user,
control a resistance coefficient for a rotational motion of an actuator included in each joint part of the plurality of joint parts, and
cause the driving unit to execute the relaxation operation.

12. The information processing apparatus according to claim 1, wherein
the circuitry is further configured to associate and store the generated control sequence data and an incentive situation that induces an autonomous movement corresponding to the control sequence data.

13. The information processing apparatus according to claim 12, wherein
the incentive situation is estimated on a basis of collected sensor information.

14. The information processing apparatus according to claim 1, wherein
the circuitry is further configured to generate the control sequence data including position information of the autonomous mobile body.

15. The information processing apparatus according to claim 14, wherein
the circuitry is further configured to generate the control sequence data including relative position information regarding a plurality of the autonomous mobile bodies.

16. The information processing apparatus according to claim 1,
wherein the circuitry is further configured to make an action plan based on situation estimation.

17. The information processing apparatus according to claim 1, wherein
the information processing apparatus is an autonomous mobile body including the driving unit, and
the another information processing apparatus is another autonomous mobile body different than the autonomous mobile body.

18. An information processing method comprising:
controlling, by a processor, an operation of a driving unit of an autonomous mobile body, wherein the controlling further includes
generating, on a basis of a teaching movement, control sequence data for causing the driving unit of the autonomous mobile body to execute an autonomous movement corresponding to the teaching movement, wherein the teaching movement includes at least one of a movement using the operation the driving unit and visual information by a display unit of the autonomous mobile body,
causing the driving unit to execute the autonomous movement corresponding to the control sequence data, on a basis of an action plan determined by situation estimation, and
transmitting the control sequence data to another information processing apparatus different than the information processing apparatus,
wherein the control sequence data includes information including at least one of control signals related to time-series changes of the autonomous movement and sound input.

19. A non-transitory computer-readable medium having embodied thereon a program, which when executed by a computer causes the computer to execute an information processing method, the method comprising:
controlling an operation of a driving unit of an autonomous mobile body, wherein the controlling further includes
generating, on a basis of a teaching movement, control sequence data for causing the driving unit of the autonomous mobile body to execute an autonomous movement corresponding to the teaching movement, wherein the teaching movement includes at least one of a movement using the operation the driving unit and visual information by a display unit of the autonomous mobile body,
causing the driving unit to execute the autonomous movement corresponding to the control sequence data, on a basis of an action plan determined by situation estimation, and
transmitting the control sequence data to another information processing apparatus different than the information processing apparatus,
wherein the control sequence data includes information including at least one of control signals related to time-series changes of the autonomous movement and sound input.

* * * * *